(12) United States Patent
De Rick et al.

(10) Patent No.: US 12,448,784 B2
(45) Date of Patent: Oct. 21, 2025

(54) DECORATIVE PANEL COMPRISING GROUT IMITATION

(71) Applicant: FLOORING INDUSTRIES LIMITED, SARL, Bertrange (LU)

(72) Inventors: Jan De Rick, Geraardsbergen (BE); Benny Schacht, Mamertinge (BE); Bryan Rollier, Kanegem (BE); Lieven Vangheluwe, Ronse (BE)

(73) Assignee: UNILIN BV, Wielsbeke (BE)

( * ) Notice: Subject to any disclaimer, the term of this patent is extended or adjusted under 35 U.S.C. 154(b) by 197 days.

(21) Appl. No.: 18/034,748

(22) PCT Filed: Nov. 4, 2021

(86) PCT No.: PCT/IB2021/060195
§ 371 (c)(1),
(2) Date: May 1, 2023

(87) PCT Pub. No.: WO2022/097052
PCT Pub. Date: May 12, 2022

(65) Prior Publication Data
US 2024/0093506 A1 Mar. 21, 2024

Related U.S. Application Data

(60) Provisional application No. 63/240,031, filed on Sep. 2, 2021, provisional application No. 63/229,292, filed
(Continued)

(51) Int. Cl.
*E04F 15/00* (2006.01)
*E04F 13/08* (2006.01)
(Continued)

(52) U.S. Cl.
CPC ...... *E04F 13/0894* (2013.01); *E04F 13/0866* (2013.01); *E04F 13/0871* (2013.01);
(Continued)

(58) Field of Classification Search
CPC .......... E04F 15/02016; E04F 15/02038; E04F 15/107; E04F 13/14; E04F 2201/042;
(Continued)

(56) References Cited

U.S. PATENT DOCUMENTS 10,442,152 B2 10/2019 Schulte
10,508,457 B2 12/2019 Hannig et al.
(Continued)

FOREIGN PATENT DOCUMENTS

CN 106193518 A 12/2016
DE 102005061645 A1 7/2007
(Continued)

OTHER PUBLICATIONS

International Search Report from corresponding PCT Application No. PCT/IB2021/060195, Feb. 11, 2022.

*Primary Examiner* — Chi Q Nguyen
(74) *Attorney, Agent, or Firm* — Workman Nydegger

(57) ABSTRACT

A panel including a substrate and a top layer. The top layer has a decor layer and a wear layer. The panel is provided with a first pair of opposite edges; and optionally with a second pair of opposite edges. At least one edge of the first pair of opposite edges is provided with a grout imitation.

22 Claims, 18 Drawing Sheets

Related U.S. Application Data on Aug. 4, 2021, provisional application No. 63/183,843, filed on May 4, 2021, provisional application No. 63/110,601, filed on Nov. 6, 2020.

(51) Int. Cl.
*E04F 15/02* (2006.01)
*E04F 15/10* (2006.01)

(52) U.S. Cl.
CPC .. *E04F 15/02033* (2013.01); *E04F 15/02038* (2013.01); *E04F 15/107* (2013.01); *E04F 2201/0115* (2013.01); *E04F 2201/0146* (2013.01)

(58) Field of Classification Search
CPC .......... E04F 2201/0107; E04F 2201/03; E04F 15/08; E04F 2201/0115; E04F 2201/0153; E04F 15/02033; E04F 2201/0552; E04F 2201/023; E04F 2201/0535; E04F 2201/0146; E04F 2201/043; E04F 2201/0547; E04F 2290/00; E04F 2201/0138; B32B 2471/00; B32B 3/06; B32B 7/12; B32B 19/04; B32B 2307/546; B32B 2419/04; B32B 2607/00
See application file for complete search history.

(56) References Cited

U.S. PATENT DOCUMENTS

| | | | |
|---|---|---|---|
| 10,926,509 B2 | 2/2021 | Schulte | |
| 11,306,487 B2* | 4/2022 | Kuritz | B32B 27/306 |
| 11,834,843 B2* | 12/2023 | Schacht | B32B 27/304 |
| 11,858,165 B2* | 1/2024 | De Rick | B27F 1/02 |
| 12,000,155 B2* | 6/2024 | De Rick | E04F 15/02033 |
| 2003/0208980 A1 | 11/2003 | Miller et al. | |
| 2004/0146695 A1 | 7/2004 | Hardwick | |
| 2009/0260313 A1 | 10/2009 | Segaert | |
| 2012/0240502 A1 | 9/2012 | Wilson et al. | |
| 2013/0104485 A1* | 5/2013 | Meersseman | B27N 7/00 428/53 |
| 2013/0104486 A1 | 5/2013 | Windmoller | |
| 2014/0360117 A1* | 12/2014 | Ko | E04F 15/02155 52/742.16 |
| 2016/0046144 A1 | 2/2016 | Thiers | |
| 2017/0016235 A1 | 1/2017 | Hannig et al. | |
| 2017/0165936 A1 | 6/2017 | Schulte | |
| 2018/0298621 A1* | 10/2018 | Courey | B32B 3/06 |
| 2020/0056380 A1 | 2/2020 | Dai et al. | |
| 2020/0094512 A1 | 3/2020 | Schulte | |
| 2020/0131783 A1* | 4/2020 | Liu | B32B 27/18 |
| 2024/0075730 A1* | 3/2024 | Larsson | B32B 38/0004 |
| 2025/0012097 A1* | 1/2025 | Meersseman | E04F 15/02022 |

FOREIGN PATENT DOCUMENTS

| | | | |
|---|---|---|---|
| EP | 1555141 | A1 | 7/2005 |
| EP | 2281975 | A2 | 2/2011 |
| EP | 3098071 | A1 | 11/2016 |
| WO | 2008053333 | A2 | 5/2008 |
| WO | 2011087704 | A1 | 7/2011 |
| WO | 2012004701 | A2 | 1/2012 |
| WO | 2015078444 | A1 | 6/2015 |
| WO | 2016050848 | A1 | 4/2016 |
| WO | 2017001976 | A1 | 1/2017 |
| WO | 2018037270 | A1 | 3/2018 |
| WO | 2018162992 | A1 | 9/2018 |
| WO | 2020034436 | A1 | 2/2020 |

* cited by examiner

DECORATIVE PANEL COMPRISING GROUT IMITATION

TECHNICAL FIELD

The invention relates to field of decorative panels that can be installed to form a floor, wall or ceiling covering.

BACKGROUND ART

Ceramic tiles or natural stone tiles can be installed into a floor covering. It is known technology to grout the joints between the tiles.

Panels are known that are made with a core comprising plastic material or wood fiber board; and that comprise a decorative top surface. Such panels are known that have a decorative top surface that simulates a ceramic tile or a natural stone tile. For a realistic simulation of a covering of ceramic or natural stone tiles, the grout between the joints remains a challenge.

US2012/0240502A1 describes vinyl floor tiles. The vinyl tiles comprise female and male coupling parts to enable a floating installation. A grouting channel is provided between vinyl floor tiles on the top surface of either the male or female coupling member. Grout is applied into the grouting channel to accomplish the installation of the vinyl floor tiles.

WO2011087704A1 describes surface covering tiles made using synthetic materials and that employ junction strips which enable the tiles to be connected to one another. The connections can be made with or without adhesive, When the tiles are connected, a space is left between adjacent decorative surfaces to permit the application of grout or simulated grout therein.

Several approaches to simulate a specific joint between panels have been described in patent literature.

EP2281975A2 discloses a method for making a decorative groove on a floorboard. The floorboard has a core and a surface layer arranged on the upper side of the core. The method comprises the steps of displacing the floorboard through milling machines while being fixed between chains and bands, making a decorative groove by at least partly removing in between joint edges of the floorboard, following parallel with the joint edges, the upper layer so that an underlying layer is uncovered and forms a surface portion of the groove which is essentially parallel to the upper side of the floorboard, removing by a rotating tool which is located between the chains, and the tool has a rotating axis which is horizontal to the floorboard.

US2004146695A1 relates to a process for manufacturing resilient floor and wall. The resilient tiles have been individually cut, routed and mechanically embossed on two adjacent edges to give the appearance that each individual tile has grout lines on two adjacent edges. When a series of these tiles are installed on a floor or wall, the seams between the individual tiles are less visible than when using resilient tiles of the prior art having grout lines on all edges of the tile. This is because the seams between the tiles of the present invention are not in the grout lines themselves but rather adjacent to the grout lines.

US2013/0104486A1 discloses a floor covering including panels having a core of a plastic material and at least one cover layer covering the upper side of the core. The panels being provided with complementary and mutually engaging locking profiles at their connected lateral edges. For forming a groove between two connected panels at least one of these panels is provided with a milled-out portion at the upper side of its lateral edge, with the cover layer excavated completely over the width of the milled-out portion such that the bottom of the milled-out portion is formed by the material of the core.

WO2020034436A1 discloses a chamfered plastic flooring, which is assembled by joining multiple panels. Provided on the upper surface of the panels at at least one side edge is a surface declining part, the surface declining part is arranged along the length direction of the edge of the panels. Adjacent panels are joined at the surface declining part to form a boundary area, which has an aesthetic appearance, an intense three-dimensional effect and is easy to clean. The surface of the boundary area is covered with a contamination-proof layer. The boundary area of the chamfered plastic flooring has an aesthetic appearance, an intense three-dimensional effect and is easy to clean.

WO2018037270A1 relates to a densified foam core tile having an imitation grout line. The flooring tile has a plurality of sides and comprises at least a top layer, a core layer and an exposed portion that extends outwardly along one side of the tile with a textured surface that imitates a grout line. The top layer of the tile can include a top surface defined by a wear layer, a polyvinyl chloride (PVC) layer having an optimal density and a dye or colorant (s), and a decorative layer. The core layer is made of a densified foam material. The exposed portion and textured surface may be formed on the PVC layer below the top surface of the tile at a depth of between about 0.9 to 2 millimeters, or more, so as to extend into the core layer, and will have a width of generally between 2 millimeters to 5 millimeters. The overall thickness of the tile preferably ranges from 4 to 8 millimeters.

WO2018162992A1 relates to a tile that may be used as a covering on a floor, wall, or ceiling surface. The tile comprises at least a top section and a core layer may be made from a densified foam material. The top section can comprise a polyvinyl chloride layer, and may also comprise a wear layer and/or a decorative layer. The tile includes a plurality of sides with an exposed portion (s) formed along at least one of the sides, and optionally also across a middle section of the tile. The exposed portion(s) may be formed on the polyvinyl chloride layer below the tile's top surface at a depth to closely resemble an actual grout line. The tile may further comprise an interconnecting mechanism that at least partially enables an efficient tile installation.

EP1555141A1 relates to a panel comprising a decorative layer with a decorative pattern, a support layer for supporting the decorative layer and a carrier for supporting the support layer and the decorative layer. The support layer is arranged at least partially between the decorative layer and the carrier. The decorative layer is at least partially absent, preferably removed, such that the support layer is visible.

CN106193518A describes a wood-plastic floor. The wood-plastic floor comprises a WPC layer, a middle material layer, a color film layer and a wear-resistant layer. The WPC layer, the middle material layer, the color film layer and the wear-resistant layer are sequentially arranged from bottom to top. A pair of first opposite edges and a pair of second opposite edges are arranged on the upper surface of the wood-plastic floor. At least one first edge and/or second edge are/is provided with dividing areas/a dividing area. The dividing areas extend along the first edges and/or the second edges, and protective films are arranged on the surfaces of the dividing areas. Via the dividing areas, dividing lines for distinguishing different floors can be achieved.

WO2015078444A1 does not relate to a ceramic or stone tile covering imitation, but to a floor panel having a carrier plate which has at top-side wood veneer. The carrier plate and the veneer are connected to each other by a resin. An edge strip is present at least on two side edges of the veneer. The edge strip consists of the resin with which the wood veneer is adhered to the carrier plate.

It is also known to provide decorative panels with chamfers and bevels, examples are e.g. provided in WO2016/050848 and in WO2012/004701.

DISCLOSURE OF THE INVENTION

The objective of the invention is to provide panels that comprise already in the panel a realistic grout imitation. It is meant that the grouting imitation is already available on the panels itself, such that no grouting operation needs to be performed after installing the panels on the surface that is to be covered by the panels. This objective is achieved in alternative ways by the several aspects of the invention.

The first aspect of the invention relates to a panel comprising a substrate and a top layer. The top layer comprises a decor layer and a wear layer. The panel is provided at a first pair of opposite edges with coupling parts, cooperating which each other, substantially in the form of male coupling parts and female coupling parts, for coupling two such panels at their first pair of opposite edges to each other in a floor, wall or ceiling covering. The male coupling part is provided at the male edge of the first pair of opposite edges. The female coupling part is provided at the female edge of the first pair of opposite edges. The coupling parts are provided with mechanical locking means which prevent the drifting apart of two coupled panels into the direction perpendicular to the surface of the coupled panels as well as into the direction perpendicular to the respective coupled edges in the plane parallel to the coupled panels. The surface of at least one of the male edge or the female edge is provided with a recess. Preferably, the recess extends deeper into the panel than the location of the decor layer. The recess is provided with a lacquer layer optionally comprising sand and/or particles preferably having a particle size larger than 20 μm. The lacquer layer of the recess is at least partially visible in coupled condition of the panel with another such panel at their respective first pair of opposite edges. Preferably, the thickness of the lacquer layer is less than 200 μm, more preferably less than 100 μm, even more preferably less than 60 μm.

The recess, with its lacquer layer, provides an imitation of grout.

Preferably, at least part of the side edges of the recess is provided with the lacquer layer; more preferably the lacquer layer extends at the side of the recess from the bottom of the recess up to closer to the panel surface than the location of the decor layer.

Preferably, the panel edge opposite to the edge comprising the recess is at least over a section provided with a lacquer layer; more preferably the lacquer layer at this edge extends from below the location of the decor layer up to a position above the location of the decor layer. More preferably, the lacquer layer at this edge is provided on a bevel provided at this edge. More preferably, all lacquer layers have the same composition and appearance. According to such embodiments, the decor layer is hidden from view at the side edge of the recess, as well as at the edge opposite to the edge comprising the recess. Such embodiments provide an even more realistic grout imitation of coupled panels, wherein the realistic grout imitation is already present in the panels, such that no grouting operation is required after installation of the panels.

When the lacquer comprises sand and/or particles preferably having a particle size larger than 20 μm, an imitation is realized of grout bound e.g. by cement and comprising sand or such particles.

In preferred embodiments of the first aspect of the invention, the surface of the lacquer layer comprises a section which is parallel with the surface of the panel. Such embodiments provide an even more realistic grout imitation.

In preferred embodiments of the first aspect of the invention, the recess extends into the substrate.

In preferred embodiments of the first aspect of the invention, the recess provided with the lacquer layer is configured for providing a grout imitation in a covering comprising a plurality of such panels.

In preferred embodiments of the first aspect of the invention, in installed condition of two such panels at their first pair of opposite edges, the visible width of the lacquer layer of the recess is at least 1.5 mm, preferably at least 2 mm, more preferably at least 3 mm, more preferably at least 3.5 mm; and preferably less than 5 mm. Such recess dimensions provide a grout imitation similar to what is used when installing and grouting tiles.

In preferred embodiments of the first aspect of the invention, the panel comprises a second pair of opposite edges, wherein the second pair of opposite edges comprises a third edge and a fourth edge. The third edge is provided for facing—and preferably for contacting—the fourth edge of a third such panel when installing a plurality of such panels in a covering. The surface of at least one of the third edge or the fourth edge is provided with a second recess. Preferably, the second recess extends deeper into the panel than the location of the decor layer. The second recess is provided with a lacquer layer optionally comprising sand and/or particles preferably having a particle size larger than 20 μm. The lacquer layer of the second recess is at least partially visible in installed condition of the panel with another such panel at their respective second pair of opposite edges. Preferably, the thickness of the lacquer layer of the second recess is less than 200 μm, more preferably less than 100 μm, even more preferably less than 60 μm.

The recess, with its lacquer layer, provides an imitation of grout.

Preferably, at least part of the side edges of the second recess is provided with the lacquer layer; more preferably the lacquer layer extends at the sides of the recess from the bottom of the recess up to closer to the panel surface than the location of the decor layer.

Preferably, the panel edge opposite to the edge comprising the second recess is at least over a section provided with a lacquer layer; more preferably the lacquer layer at this edge extends from below the location of the decor layer up to a position above the location of the decor layer. More preferably, the lacquer layer at this edge is provided on a bevel provided at this edge. More preferably, all lacquer layers have the same composition and appearance. According to such embodiments, the decor layer is hidden from view at the side edge of the recess, as well as at the panel edge opposite to the edge comprising the recess. Such embodiments provide an even more realistic grout imitation of installed panels, wherein the realistic grout imitation is already present in the panels, such that no grouting operation is required after installation of the panels.

When the lacquer comprises sand and/or particles preferably having a particle size larger than 20 μm, an imitation is realized of grout bound e.g. by cement and comprising sand or such particles.

In preferred embodiments of the first aspect of the invention, the surface of the lacquer layer comprises a section which is parallel with the surface of the panel. Such embodiments provide an even more realistic grout imitation.

In preferred embodiments of the first aspect of the invention, the recess extends into the substrate.

In preferred embodiments according to the first aspect of the invention, the panel comprises at its surface at least one central recess, provided parallel with the recess and parallel with the first pair of opposite edges. Preferably, the central recess is provided at the middle between the first pair of opposite edges. Preferably, the central recess extends deeper into the panel than the location of the decor layer. The central recess is provided with a lacquer layer optionally comprising sand and/or particles preferably having a particle size larger than 20 µm. Preferably, the thickness of the lacquer layer of the central recess is less than 200 µm, more preferably less than 100 µm, even more preferably less than 60 µm. Preferably, at least part of the side edges of the at least one central recess is provided with the lacquer layer. More preferably, the lacquer layer extends at the side edge of the at least one central recess from the bottom of the at least one central recess up to closer to the panel surface than the location of the decor layer. According to such embodiments, the decor layer is hidden from view at the side edges of the at least one central recess. Such embodiments provide an even more realistic grout imitation of installed panels, wherein the realistic grout imitation is already present in the panels, such that no grouting operation is required after installation of the panels.

Preferably, the lacquer layer of the central recess comprises a section which is parallel with the surface of the panel.

In preferred embodiments according to the first aspect of the invention, in coupled condition at the first pair of opposite edges of two such panels the visible width of the recess is the same as the visible width of the central recess. Such embodiments provide panels that—after installation of the panels—provide an appearance that the covering installed with the panels comprise more and smaller panels than in reality.

In preferred embodiments according to the first aspect of the invention, the female edge comprises a first closing plane, and the male edge comprises a second closing plane. In coupled condition of two such panels at their first pair of opposite edges the first closing plane of the first such panel contacts the second closing plane of the second such panel thereby providing a contact surface between the two coupled such panels, wherein the contact surface is substantially perpendicular to the surface of the coupled panels.

In preferred embodiments according to the first aspect of the invention, the lacquer layer comprises sand and/or particles preferably having a particle size larger than 20 µm; and at least part of the sand and/or of the particles are present at the surface of the lacquer layer; preferably thereby creating a rough surface of the recess. Such embodiments provide a realistic imitation of a typical grout comprising sand or other particles, e.g. of a typical grout bound by cement.

In preferred embodiments of the first aspect of the invention, the lacquer is an acrylate lacquer or a polyurethane lacquer or a polyurethane acrylate lacquer, preferably a UV-cured lacquer. Such embodiments provide a durable grout imitation.

In preferred embodiments of the first aspect of the invention, the recess provided with the lacquer layer is configured for providing a grout imitation in a covering comprising a plurality of such panels.

In preferred embodiments of the first aspect of the invention, the panel comprises a second pair of opposite edges. The panel is provided at the second pair of opposite edges with second coupling parts, cooperating which each other, substantially in the form of second male coupling parts and second female coupling parts, for coupling two such panels at their second pair of opposite edges to each other in a floor, wall or ceiling covering. The second male coupling part is provided at the second male edge of second pair of opposite edges; and the second female coupling part is provided at the second female edge of the panels. The second coupling parts are provided with second mechanical locking means which prevent the drifting apart of two such panels coupled at their second pair of opposite edges into the direction perpendicular to the surface of the coupled panels as well as into the direction perpendicular to the respective coupled edges in the plane parallel to the coupled panels. The surface of at least one of the second male edge or the second female edge is provided with a second recess. Preferably, the second recess extends deeper into the panel than the location of the decor layer. The second recess is provided with a lacquer layer optionally comprising sand and/or particles preferably having a particle size larger than 20 µm. The lacquer layer of the second recess is at least partially visible in installed condition of the panel with another such panel at their respective second pair of opposite edges. Preferably, the thickness of the lacquer layer of the second recess is less than 200 µm, more preferably less than 100 µm, even more preferably less than 60 µm.

The recess, with its lacquer layer, provides an imitation of grout.

Preferably, at least part of the side edges of the second recess is provided with the lacquer layer; more preferably the lacquer layer extends at the side of the second recess from the bottom of the second recess up to closer to the panel surface than the location of the decor layer.

Preferably, the panel edge opposite to the edge comprising the second recess is at least over a section provided with a lacquer layer; more preferably the lacquer layer at this edge extends from below the location of the decor layer up to a position above the location of the decor layer. More preferably, the lacquer layer at this edge is provided on a bevel provided at this edge. More preferably, all lacquer layers have the same composition and appearance. According to such embodiments, the decor layer is hidden from view at the side edge of the recess, as well as at the panel edge opposite to the edge comprising the second recess. Such embodiments provide an even more realistic grout imitation of installed panels, wherein the realistic grout imitation is already present in the panels, such that no grouting operation is required after installation of the panels.

When the lacquer comprises sand and/or particles preferably having a particle size larger than 20 µm, an imitation is realized of grout bound e.g. by cement and comprising sand or such particles.

In preferred embodiments of the first aspect of the invention, the surface of the lacquer layer of the second recess comprises a section which is parallel with the surface of the panel. Such embodiments provide an even more realistic grouting imitation.

In preferred embodiments of the first aspect of the invention, the surface of the lacquer layer of the recess and the surface of the lacquer layer of the second recess are provided at the same depth from the panel surface. Such embodiments provide an even more realistic grouting imitation.

In preferred embodiments of the first aspect of the invention, in installed condition at the first pair of opposite edges of two such panels the visible width of the recess is the same as the visible width of the second recess in coupled condition at the second pair of opposite edges of two such panels. Such embodiments provide for even more realistic grout imitations of installed panels.

In preferred embodiments of the first aspect of the invention, the panel comprises at its surface at least one second central recess, wherein the second central recess is provided parallel with the second recess and parallel with the second pair of opposite edges. Preferably, the second central recess is provided at the middle between the second pair of opposite edges. Preferably, the second central recess extends deeper into the panel than the location of the decor layer. The second central recess is provided with a lacquer layer optionally comprising sand and/or particles preferably having a particle size larger than 20 µm. Preferably, at least part of the side edges of the at least one second central recess is provided with the lacquer layer. More preferably, the lacquer layer extends at the side edge of the at least one second central recess from the bottom of the at least one second central recess up to closer to the panel surface than the location of the decor layer. According to such embodiments, the decor layer is hidden from view at the side edge of the at least one second central recess. Such embodiments provide an even more realistic grout imitation of installed panels, wherein the realistic grout imitation is already present in the panels, such that no grouting operation is required after installation of the panels.

In preferred embodiments according to the first aspect of the invention, the lacquer layer of the second central recess comprises a section which is parallel with the surface of the panel.

Preferably, in coupled condition at the second pair of opposite edges of two such panels the visible width of the second recess is the same as the visible width of the second central recess.

In preferred embodiments according to the first aspect of the invention, in coupled condition at the first pair of opposite edges of two such panels the visible width of the recess is the same as the visible width of the central recess. Such embodiments provide panels that—after installation of the panels—provide an appearance that the covering installed with the panels comprise more and smaller panels than in reality.

In preferred embodiments according to the first aspect of the invention, the panel edge where the recess is provided joins the panel edge where the second recess is provided in a joint. The lacquer layer of the recess continues in the joint without interruption into the lacquer layer of the second recess. Preferably, the lacquer layers of the recess and of the second recess have the same composition. Such embodiments provide a more realistic grout imitation.

The second aspect of the invention relates to a panel comprising a substrate and a top layer. The top layer comprises a decor layer and a wear layer. The panel comprises a first pair of opposite edges; wherein the first pair of opposite edges comprises a first edge and a second edge. The first edge is provided for facing—and preferably for contacting—the second edge of a second such panel when installing a plurality of such panels in a covering. Preferably, the panel is provided for being glued onto a surface to form a covering of the surface. The surface of at least one of the first edge or the second edge is provided with a recess.

Preferably, the recess extends deeper into the panel than the location of the decor layer. The recess is provided with a lacquer layer optionally comprising sand and/or particles preferably having a particle size larger than 20 µm. The lacquer layer of the recess is at least partially visible in installed condition of the panel with another such panel at their respective first pair of opposite edges. Preferably, the thickness of the lacquer layer is less than 200 µm, more preferably less than 100 µm, even more preferably less than 60 µm.

The recess, with its lacquer layer, provides an imitation of grout.

Preferably, at least part of the side edges of the recess is provided with the lacquer layer; more preferably the lacquer layer extends at the side of the recess from the bottom of the recess up to closer to the panel surface than the location of the decor layer.

Preferably, the panel edge opposite to the edge comprising the recess is at least over a section provided with a lacquer layer; more preferably the lacquer layer at this edge extends from below the location of the decor layer up to a position above the location of the decor layer. More preferably, the lacquer layer at this edge is provided on a bevel provided at this edge. More preferably, all lacquer layers have the same composition and appearance. According to such embodiments, the decor layer is hidden from view at the side edge of the recess, as well as at the edge opposite to the edge comprising the recess. Such embodiments provide an even more realistic grout imitation of installed panels, wherein the realistic grout imitation is already present in the panels, such that no grouting operation is required after installation of the panels.

When the lacquer comprises sand and/or particles preferably having a particle size larger than 20 µm, an imitation is realized of grout bound e.g. by cement and comprising sand or such particles.

In preferred embodiments of the second aspect of the invention, the surface of the lacquer layer comprises a section which is parallel with the surface of the panel. Such embodiments provide an even more realistic grout imitation.

In preferred embodiments of the second aspect of the invention, the recess extends into the substrate.

In preferred embodiments of the second aspect of the invention, the recess provided with the lacquer layer is configured for providing a grout imitation in a covering comprising a plurality of such panels.

In preferred embodiments of the second aspect of the invention, in installed condition of two such panels at their first pair of opposite edges, the visible width of the lacquer layer of the recess is at least 1.5 mm, preferably at least 2 mm, more preferably at least 3 mm, more preferably at least 3.5 mm; and preferably less than 5 mm. Such recess dimensions provide a grout imitation similar to what is used when installing and grouting tiles.

In preferred embodiments of the second aspect of the invention, the panel comprises a second pair of opposite edges, wherein the second pair of opposite edges comprises a third edge and a fourth edge. The third edge is provided for facing—and preferably for contacting—the fourth edge of a third such panel when installing a plurality of such panels in a covering. The surface of at least one of the third edge or the fourth edge is provided with a second recess. Preferably, the second recess extends deeper into the panel than the location of the decor layer. The second recess is provided with a lacquer layer optionally comprising sand and/or particles preferably having a particle size larger than 20 µm. The lacquer layer of the second recess is at least partially visible in installed condition of the panel with another such panel at their respective second pair of opposite edges. Preferably, the thickness of the lacquer layer of the second recess is less than 200 µm, more preferably less than 100 µm, even more preferably less than 60 µm.

The recess, with its lacquer layer, provides an imitation of grout.

Preferably, at least part of the side edge of the second recess is provided with the lacquer layer; more preferably the lacquer layer extends at the sides of the second recess from the bottom of the second recess up to closer to the panel surface than the location of the decor layer.

Preferably, the panel edge opposite to the edge comprising the second recess is at least over a section provided with a lacquer layer; more preferably the lacquer layer at this edge extends from below the location of the decor layer up to a position above the location of the decor layer. More preferably, the lacquer layer at this edge is provided on a bevel provided at this edge. More preferably, all lacquer layers have the same composition and appearance. According to such embodiments, the decor layer is hidden from view at the side edge of the recess, as well as at the panel edge opposite to the edge comprising the recess. Such embodiments provide an even more realistic grout imitation of installed panels, wherein the realistic grout imitation is already present in the panels, such that no grouting operation is required after installation of the panels.

When the lacquer comprises sand and/or particles preferably having a particle size larger than 20 µm, an imitation is realized of grout bound e.g. by cement and comprising sand or such particles.

In preferred embodiments of the second aspect of the invention, the surface of the lacquer layer of the second recess comprises a section which is parallel with the surface of the panel. Such embodiments provide an even more realistic grouting imitation.

In preferred embodiments of the second aspect of the invention, the surface of the lacquer layer of the recess and the surface of the lacquer layer of the second recess are provided at the same depth from the panel surface.

In preferred embodiments of the second aspect of the invention, in installed condition at the first pair of opposite edges of two such panels the visible width of the recess is the same as the visible width of the second recess in installed condition at the second pair of opposite edges of two such panels. Such embodiments provide for even more realistic grout imitations of installed panels.

In preferred embodiments of the second aspect of the invention, the panel comprises at its surface at least one second central recess, wherein the second central recess is provided parallel with the second recess and parallel with the second pair of opposite edges. Preferably, the second central recess is provided at the middle between the second pair of opposite edges. Preferably wherein the second central recess extends deeper into the panel than the location of the decor layer. The second central recess is provided with a lacquer layer optionally comprising sand and/or particles preferably having a particle size larger than 20 µm. Preferably, at least part of the side edges of the at least one second central recess is provided with the lacquer layer. More preferably, the lacquer layer extends at the side edge of the at least one second central recess from the bottom of the at least one second central recess up to closer to the panel surface than the location of the decor layer. According to such embodiments, the decor layer is hidden from view at the side edges of the at least one second central recess. Such embodiments provide an even more realistic grout imitation of installed panels, wherein the realistic grout imitation is already present in the panels, such that no grouting operation is required after installation of the panels.

In preferred embodiments according to the second aspect of the invention, the lacquer layer of the second central recess comprises a section which is parallel with the surface of the panel.

Preferably, in installed condition at the second pair of opposite edges of two such panels the visible width of the second recess is the same as the visible width of the second central recess.

In preferred embodiments according to the second aspect of the invention, the panel comprises at its surface at least one central recess, provided parallel with the recess and parallel with the first pair of opposite edges. Preferably, the central recess is provided at the middle between the first pair of opposite edges. Preferably, the central recess extends deeper into the panel than the location of the decor layer. The central recess is provided with a lacquer layer optionally comprising sand and/or particles preferably having a particle size larger than 20 µm. Preferably, the thickness of the lacquer layer of the central recess is less than 200 µm, more preferably less than 100 µm, even more preferably less than 60 µm. Preferably, at least part of the side edges of the at least one central recess is provided with the lacquer layer. More preferably, the lacquer layer extends at the side edge of the at least one central recess from the bottom of the at least one central recess up to closer to the panel surface than the location of the decor layer. According to such embodiments, the decor layer is hidden from view at the side edges of the at least one central recess. Such embodiments provide an even more realistic grout imitation of installed panels, wherein the realistic grout imitation is already present in the panels, such that no grouting operation is required after installation of the panels.

Preferably, the lacquer layer of the central recess comprises a section which is parallel with the surface of the panel.

In preferred embodiments according to the second aspect of the invention, in installed condition at the first pair of opposite edges of two such panels the visible width of the recess is the same as the visible width of the central recess. Such embodiments provide panels that—after installation of the panels—provide an appearance that the covering installed with the panels comprise more and smaller panels than in reality.

In preferred embodiments according to the second aspect of the invention, the panel edge where the recess is provided joins the panel edge where the second recess is provided in a joint. The lacquer layer of the recess continues in the joint without interruption into the lacquer layer of the second recess. Preferably, the lacquer layers of the recess and of the second recess have the same composition. Such embodiments provide a more realistic grout imitation.

In preferred embodiments according to the second aspect of the invention, the first edge comprises a first closing plane, and the second edge comprises a second closing plane. In installed condition of two such panels at their first pair of opposite edges the first closing plane of the first such panel contacts the second closing plane of the second such panel thereby providing a contact surface between the two coupled such panels, wherein the contact surface is substantially perpendicular to the surface of the installed panels.

In preferred embodiments according to the second aspect of the invention, the first edge and the second edge are devoid of coupling parts that would provide a mechanical locking of two such panels when installed in a covering.

In preferred embodiments according to the second aspect of the invention, the lacquer layer comprises sand and/or particles preferably having a particle size larger than 20 μm; and at least part of the sand and/or of the particles are present at the surface of the lacquer layer; preferably thereby creating a rough surface of the recess. Such embodiments provide a realistic imitation of a typical grout comprising sand or other particles, e.g. of a typical grout bound by cement.

In preferred embodiments of the second aspect of the invention, the lacquer is an acrylate lacquer or a polyurethane lacquer or a polyurethane acrylate lacquer, preferably a UV-cured lacquer. Such embodiments provide a durable grout imitation.

The third aspect of the invention relates to a panel comprising a substrate and a top layer. The top layer comprises a decor layer and a wear layer. The panel is provided at a first pair of opposite edges with coupling parts, cooperating which each other, substantially in the form of male coupling parts and female coupling parts, for coupling two such panels at their first pair of opposite edges to each other in a floor, wall or ceiling covering. The male coupling part is provided at the male edge of the first pair of opposite edges. The female coupling part is provided at the female edge of the first pair of opposite edges. The coupling parts are provided with mechanical locking means which prevent the drifting apart of two coupled panels into the direction perpendicular to the surface of the coupled panels as well as into the direction perpendicular to the respective coupled edges in the plane parallel to the coupled panels. The surface of at least one of the male edge or the female edge is provided with a recess extending deeper into the panel than the location of the decor layer. The recess comprises a polymer filling material, wherein the polymer filling material fills the recess at least partially, wherein the polymer filling material extends vertically from the position below the location of the decor layer to the location vertically above the location of the decor layer in the panel. Preferably, the thickness of the polymer filling material is more than 400 μm, more preferably more than 500 μm, more preferably more than 700 μm. Panels according to the third aspect provide a realistic imitation of grout. As the polymer filling material extends to vertically above the location of the decor layer, the decor layer will not be visible at the male nor at the female edges of installed panels, as hidden by the polymer filling material.

In preferred embodiments of the third aspect of the invention, the surface of the polymer filling material is at least partially and preferably over its full surface parallel with the surface of the panel. Such embodiments provide a more realistic grouting imitation.

In preferred embodiments of the third aspect of the invention, the polymer filling material provides part of the panel edge on which the polymer filling material is provided, more preferably wherein the polymer filling material provides at least over a height of 0.1 mm—and preferably over a height of at least 0.5 mm—the edge on which the polymer filling material is provided. As the polymer filling material provides part of the edge, the polymer filling material forming part of the edge can contact the edge of the panel it faces. The polymer filling material will cover—and thus hide—the decor layer at this faced edge, contributing to a more realistic grout imitation.

More preferably, the part of the panel edges provided by the polymer filling materials is a cut or a milled edge. Such embodiments can be realized by providing a cutting or milling operation on the panel edge after applying the polymer filling material in order to determine the distal edge of the polymer filling material in the recess.

In preferred embodiments of the third aspect of the invention, the recess comprising the polymer filling material is configured for providing a grout imitation in a covering comprising a plurality of such panels.

In preferred embodiments of the third aspect of the invention, the width of the recess provided with polymer filling material is at least 1.5 mm, preferably at least 2 mm, more preferably at least 3 mm, more preferably at least 3.5 mm; and preferably less than 5 mm. Such recess dimensions provide a grout imitation similar to what is used when installing and grouting tiles.

In preferred embodiments of the third aspect of the invention, the panel comprises at its surface at least one central recess extending deeper into the panel than the location of the decor layer. The central recess is provided parallel with the recess and parallel with the first pair of opposite edges. Preferably, the central recess is provided at the middle between the first pair of opposite edges. The central recess comprises a third polymer filling material. The third polymer filling material fills the central recess at least partially. The third polymer filling material extends vertically from the position below the location of the decor layer to the location vertically above the location of the decor layer in the panel. Preferably, the composition of the third polymer filling material is the same as the composition of the polymer filling material. Preferably, the thickness of the second polymer filling material is more than 400 μm, more preferably more than 500 μm, more preferably more than 700 μm. Such embodiments provide panels that—after installation of the panels—provide an appearance that the covering installed with the panels comprise more and smaller panels than in reality.

In preferred embodiments of the third aspect of the invention, the female edge comprises a first closing plane, and the male edge comprises a second closing plane. In coupled condition of two such panels at their first pair of opposite edges the first closing plane of the first such panel contacts the second closing plane of the second such panel thereby providing a contact surface between the two coupled such panels, wherein the contact surface is substantially perpendicular to the surface of the coupled panels.

In preferred embodiments of the third aspect of the invention, the polymer filling material comprises a thermoset polymer or an elastomeric polymer, e.g. an epoxy, or the polymer filling material comprises an acrylate binder.

Preferably, the polymer filling material comprises pigments, preferably to provide the polymer filling material in coupled panels as a grout imitation. The pigments allow to provide the polymer filling material with the required color. The color can be selected taking the decoration of the decor layer into account. This way, realistic grout imitations can be provided.

In preferred embodiments of the third aspect of the invention, the polymer filling material comprises sand and/or particles preferably having a particle size larger than 20 μm. Preferably, the sand and/or the particles provides the polymer filling material with a rough surface. Preferably, at least of the sand and/or particles are provided at the surface of the polymer filling material. Such embodiments provide a realistic imitation of a typical grout comprising sand or other particles, e.g. of a typical grout bound by cement.

In preferred embodiments of the third aspect of the invention, the panel comprises a second pair of opposite edges. The panel is provided at the second pair of opposite edges with second coupling parts, cooperating which each other, substantially in the form of second male coupling parts and second female coupling parts, for coupling two such panels at their second pair of opposite edges to each other in a floor, wall or ceiling covering. The second male coupling part is provided at the second male edge of the panels. The second female coupling part is provided at the second female edge of the panels. The second coupling parts are provided with second mechanical locking means which prevent the drifting apart of two such panels coupled at their second pair of opposite edges into the direction perpendicular to the surface of the coupled panels as well as into the direction perpendicular to the respective coupled edges in the plane parallel to the coupled panels. The surface of at least one of the second male edge or the second female edge is provided with a second recess extending deeper into the panel than the location of the decor layer. The second recess comprises a second polymer filling material, wherein the second polymer filling material fills the second recess at least partially. The second polymer filling material extends vertically from the position below the location of the decor layer to the location vertically above the location of the decor layer in the panel. Preferably, the thickness of the second polymer filling material is more than 400 µm, more preferably more than 500 µm, more preferably more than 700 µm. As the second polymer filling material extends to vertically above the location of the decor layer, the decor layer will not be visible at the third and fourth edges of installed panels, as hidden by the polymer filling material.

In preferred embodiments of the third aspect of the invention, the second polymer filling material provides part of the panel edge on which the second polymer filling material is provided, preferably wherein the second polymer filling material provides over a height of at least 0.1 mm—and preferably over a height of at least 0.5 mm—the edge on which the second polymer filling material is provided. As the second polymer filling material provides part of the edge, the second polymer filling material forming part of the edge can contact the edge of the panel it is coupled with. The second polymer filling material will cover—and thus hide—the decor layer at this coupled edge, contributing to a more realistic grout imitation.

More preferably, the part of the panel edge provided by the second polymer filling materials is a cut or a milled edge. Such embodiments can be realized by providing a cutting or milling operation on the panel edge after applying the second polymer filling material in order to determine the distal edge of the second polymer filling material in the second recess.

In preferred embodiments of the third aspect of the invention, the polymer filling material and the second polymer filling material extend up to the same distance from the panel surface. Such embodiments provide a more realistic grout imitation.

In preferred embodiments of the third aspect of the invention, the panel edge where the recess is provided joins the panel edge where the second recess is provided in a joint. The polymer filling material continues in the joint without interruption into the second polymer filling material; preferably wherein the polymer filling material and the second polymer filling material have the same composition. Such embodiments provide a more realistic grout imitation.

Preferably, in installed condition at the first pair of opposite edges of two such panels the visible width of the polymer filling material is the same as the visible width of the second polymer filling material in coupled condition at the second pair of opposite edges of two such panels. Such embodiments provide a more realistic grout imitation.

Preferably, the composition of the second polymer filling material is the same as the composition of the polymer filling material.

In preferred embodiments of the third aspect of the invention, the panel comprises at its surface at least one second central recess extending deeper into the panel than the location of the decor layer. The at least one second central recess is provided parallel with the second recess and parallel with the second pair of opposite edges. Preferably, the at least one second central recess is provided at the middle between the second pair of opposite edges. The at least one second central recess comprises a fourth polymer filling material. The fourth polymer filling material fills the at least one second central recess at least partially. The fourth polymer filling material extends vertically from the position below the location of the decor layer to the location vertically above the location of the decor layer in the panel. Preferably, the composition of the fourth polymer filling material is the same as the composition of the polymer filling material. Such embodiments provide panels that—after installation of the panels—provide an appearance that the covering installed with the panels comprise more and smaller panels than in reality.

The fourth aspect of the invention relates to a panel. The panel comprises a substrate and a top layer. The top layer comprises a decor layer and a wear layer. The panel comprises a first pair of opposite edges; wherein the first pair of opposite edges comprises a first edge and a second edge. The first edge is provided for facing—and preferably for contacting—the second edge of a second such panel when installing a plurality of such panels in a covering. Preferably wherein the panel is provided for being glued onto a surface to form a covering of the surface. The surface of at least one of the first edge or the second edge is provided with a recess extending deeper into the panel than the location of the decor layer. It is not excluded that the first edge and the second edge are provided with such recess; however, it is also possible that only one of the first edge or the second edge is provided with such recess. The recess comprises a polymer filling material, wherein the polymer filling material fills the recess at least partially. The polymer filling material extends vertically from the position below the location of the decor layer to the location vertically above the location of the decor layer in the panel. Preferably, the thickness of the polymer filling material is more than 400 µm, more preferably more than 500 µm, more preferably more than 700 µm.

Panels according to the fourth aspect provide a realistic imitation of grout. As the polymer filling material extends to vertically above the location of the decor layer, the decor layer will not be visible at the first and second edges of installed panels, as hidden by the polymer filling material.

In preferred embodiments of the fourth aspect of the invention, the surface of the polymer filling material is at least partially and preferably over its full surface parallel with the surface of the panel. Such embodiments provide a more realistic grouting imitation.

In preferred embodiments of the fourth aspect of the invention, the polymer filling material provides part of the panel edge on which the polymer filling material is provided, more preferably wherein the polymer filling material provides at least over a height of 0.1 mm—and preferably over a height of at least 0.5 mm—the edge on which the polymer filling material is provided. As the polymer filling material provides part of the edge, the polymer filling material forming part of the edge can contact the edge of the panel it faces. The polymer filling material will cover—and thus hide—the decor layer at this faced edge, contributing to a more realistic grout imitation.

More preferably, the part of the panel edges provided by the polymer filling materials is a cut or a milled edge. Such embodiments can be realized by providing a cutting or milling operation on the panel edge after applying the polymer filling material in order to determine the distal edge of the polymer filling material in the recess.

In preferred embodiments of the fourth aspect of the invention, the recess comprising the polymer filling material is configured for providing a grout imitation in a covering comprising a plurality of such panels.

In preferred embodiments of the fourth aspect of the invention, the width of the recess provided with polymer filling material is at least 1.5 mm, preferably at least 2 mm, more preferably at least 3 mm, more preferably at least 3.5 mm; and preferably less than 5 mm. Such recess dimensions provide a grout imitation similar to what is used when installing and grouting tiles.

In preferred embodiments of the fourth aspect of the invention, the panel comprises a second pair of opposite edges. The second pair of opposite edges comprises a third edge and a fourth edge; wherein the third edge is provided for facing—and preferably for contacting—the fourth edge of a third such panel when installing a plurality of such panels in a covering. Preferably the panel is provided for being glued onto a surface to form a covering of the surface. The surface of at least one of the third edge or the fourth edge is provided with a second recess extending deeper into the panel than the location of the decor layer. The second recess comprises a second polymer filling material. The second polymer filling material fills the second recess at least partially. The second polymer filling material extends vertically from the position below the location of the decor layer to the location vertically above the location of the decor layer in the panel. Preferably the thickness of the second polymer filling material is more than 400 μm, more preferably more than 500 μm, more preferably more than 700 μm.

In preferred embodiments of the fourth aspect of the invention, the second polymer filling material provides part of the panel edge on which the second polymer filling material is provided, preferably wherein the second polymer filling material provides over a height of at least 0.1 mm—and preferably over a height of at least 0.5 mm—the edge on which the second polymer filling material is provided. As the second polymer filling material provides part of the edge, the second polymer filling material forming part of the edge can contact the edge of the panel it faces. The second polymer filling material will cover—and thus hide—the decor layer at this faced edge, contributing to a more realistic grout imitation.

More preferably, the part of the panel edge provided by the second polymer filling materials is a cut or a milled edge. Such embodiments can be realized by providing a cutting or milling operation on the panel edge after applying the second polymer filling material in order to determine the distal edge of the second polymer filling material in the second recess.

In preferred embodiments of the fourth aspect of the invention, the polymer filling material and the second polymer filling material extend up to the same distance from the panel surface. Such embodiments provide a more realistic grout imitation.

In preferred embodiments of the fourth aspect of the invention, the panel edge where the recess is provided joins the panel edge where the second recess is provided in a joint. The polymer filling material continues in the joint without interruption into the second polymer filling material; preferably wherein the polymer filling material and the second polymer filling material have the same composition. Such embodiments provide a more realistic grout imitation.

Preferably, in installed condition at the first pair of opposite edges of two such panels the visible width of the polymer filling material is the same as the visible width of the second polymer filling material in coupled condition at the second pair of opposite edges of two such panels. Such embodiments provide a more realistic grout imitation.

Preferably, the composition of the second polymer filling material is the same as the composition of the polymer filling material.

In preferred embodiments of the fourth aspect of the invention, the panel comprises at its surface at least one central recess extending deeper into the panel than the location of the decor layer. The central recess is provided parallel with the recess and parallel with the first pair of opposite edges. Preferably, the central recess is provided at the middle between the first pair of opposite edges. The central recess comprises a third polymer filling material. The third polymer filling material fills the central recess at least partially. The third polymer filling material extends vertically from the position below the location of the decor layer to the location vertically above the location of the decor layer in the panel. Preferably, the composition of the third polymer filling material is the same as the composition of the polymer filling material. Preferably, the thickness of the second polymer filling material is more than 400 μm, more preferably more than 500 μm, more preferably more than 700 μm. Such embodiments provide panels that—after installation of the panels—provide an appearance that the covering installed with the panels comprise more and smaller panels than in reality.

In preferred embodiments of the fourth aspect of the invention, the panel comprises at its surface at least one second central recess extending deeper into the panel than the location of the decor layer. The at least one second central recess is provided parallel with the second recess and parallel with the second pair of opposite edges. Preferably, the at least one second central recess is provided at the middle between the second pair of opposite edges. The at least one second central recess comprises a fourth polymer filling material. The fourth polymer filling material fills the at least one second central recess at least partially. The fourth polymer filling material extends vertically from the position below the location of the decor layer to the location vertically above the location of the decor layer in the panel. Preferably, the composition of the fourth polymer filling material is the same as the composition of the polymer filling material. Such embodiments provide panels that—after installation of the panels—provide an appearance that the covering installed with the panels comprise more and smaller panels than in reality.

In preferred embodiments of the fourth aspect of the invention, the first edge comprises a first closing plane, and the second edge comprises a second closing plane, wherein in installed condition of two such panels at their first pair of opposite edges the first closing plane of the first such panel contacts the second closing plane of the second such panel thereby providing a contact surface between the two coupled such panels, wherein the contact surface is substantially perpendicular to the surface of the installed panels.

In preferred embodiments of the fourth aspect of the invention, the first edge and the second edge are devoid of coupling parts that would provide a mechanical locking of two such panels when installed in a covering.

In preferred embodiments of the fourth aspect of the invention, the polymer filling material comprises a thermoset polymer or an elastomeric polymer, e.g. an epoxy, or the polymer filling material comprises an acrylate binder.

Preferably, the polymer filling material comprises pigments, preferably to provide the polymer filling material in coupled panels as a grout imitation. The pigments allow to provide the polymer filling material with the required color. The color can than be selected taking the decoration of the decor layer into account. This way, realistic grout imitations can be provided.

In preferred embodiments of the fourth aspect of the invention, the polymer filling material comprises sand and/or particles preferably having a particle size larger than 20 µm. Preferably, the sand and/or the particles provides the polymer filling material with a rough surface. Preferably, at least of the sand and/or particles are provided at the surface of the polymer filling material. Such embodiments provide a realistic imitation of a typical grout comprising sand or other particles, e.g. of a typical grout bound by cement.

The fifth aspect of the invention relates to a panel, comprising a substrate and a top layer. The top layer comprises a decor layer and a wear layer. The panel is provided at a first pair of opposite edges with coupling parts, cooperating which each other, substantially in the form of male coupling parts and female coupling parts, for coupling two such panels at their first pair of opposite edges to each other in a floor, wall or ceiling covering. The male coupling part is provided at the male edge of the first pair of opposite edges. The female coupling part is provided at the female edge of the first pair of opposite edges. The coupling parts are provided with mechanical locking means which prevent the drifting apart of two coupled panels into the direction perpendicular to the surface of the coupled panels as well as into the direction perpendicular to the respective coupled edges in the plane parallel to the coupled panels. The male edge, preferably the male coupling part, comprises a section the upper surface of which is provided below the surface of the floor panel and below the location of the decor layer, more preferably wherein the upper surface of the section is provided with a substantially uniform color. Preferably, the visual appearance of the upper surface of the section differs over its full surface from the visual appearance of the decor layer. In coupled condition of a first such panel coupled at its male edge onto the female edges of a second such panel, the female edge overlaps part of the upper surface of the section of the male edge of the first such panel such that part of the upper surface of the section of the male edge of the first such panel is hidden from view whereas part of the upper surface of the section is visible in the view perpendicular to the surface of the coupled panels. Preferably, the part of the upper surface of the section that is visible in the view perpendicular to the surface of the coupled panels is at least 1.5 mm wide, more preferably at least 2 mm wide, more preferably at least 3 mm wide, more preferably more than 3.5 mm wide, and preferably less than 5 mm wide.

Such embodiments provide for a grout imitation, while the overlap allows that manufacturing variations, e.g. because of adjoining panel edges of rectangular or square panels not being orthogonal to each other are hidden by the overlap.

In a preferred embodiment of the fifth aspect of the invention, at least part of the—and preferably the complete—upper surface of the section which is visible in the view perpendicular to the surface of the coupled panels is parallel with the surface of the floor panel. Such embodiments contribute to a more realistic grout imitation.

In a preferred embodiment of the fifth aspect of the invention, the male edge and the female edge each comprise a bevel. More preferably, the bevels at the male edge and at the female edge are convex bevels, preferably wherein the bevel edges are partially or fully curved. Such embodiments contribute to a more realistic grout imitation.

Preferably, the bevel at the male edge is substantially the mirror image of the bevel at the female edge. Such embodiments contribute to a more realistic grout imitation.

Preferably, the bevels have along the edge an irregular cross section. Such embodiments allow to provide a realistic imitation of a covering comprising tiles, as tiles can show beveled edges having an irregular cross section.

In a preferred embodiment of the fifth aspect of the invention, the female edge of the second such panel contacts the upper surface of the section of the male edge of the first such panel which is provided below the surface of the floor panel and below the location of the decor layer in a first zone of the upper surface of the male coupling part. The upper surface of the male edge, preferably of the male coupling part, comprises a second zone less distal than the first zone, wherein the female edge of the second such panel overlaps the second zone without contacting it but such that the second zone is hidden from view. In such embodiments, allow to provide panels comprising a lacquer in the second zone. There is no risk that this lacquer is damaged or removed during installation of the panels, increasing the quality of the grouting imitation.

More preferably, the second zone is distanced more from the surface of the floor panel than the first zone.

In a preferred embodiment of the fifth aspect of the invention, at least one recess is provided on the surface of the panel parallel with the first pair of opposite edges, wherein the at least one recess is bordered at both sides parallel with the first pair of opposite edges by surface of the panel, wherein the bottom of the recess has substantially the same color as the part of the upper surface of the section of the male edge which is visible in the view perpendicular to the surface of the coupled panels. Such embodiments contribute to a more realistic grout imitation.

More preferably, the depth of the at least one recess is substantially the same as the distance from the surface of the panel of the section of the male edge. Such embodiments contribute to a more realistic grout imitation.

Preferably, the male edge and the female edge each comprise a bevel. The sides of the at least one recess parallel with the first pair of opposite edges are provided with bevels that substantially have the same configuration as the bevels of respectively the male edge and the female edge. Such embodiments contribute to a more realistic grout imitation.

In preferred embodiments of the fifth aspect of the invention, at least part of the section of the male edge the upper surface of which is provided below the surface of the floor panel and below the location of the decor layer, is provided with a lacquer layer. Preferably, when the male edge and the female edge of the first pair of opposite edges are provided with bevels, the bevels are at least partly provided with a same lacquer layer. More preferably, the lacquer layer on the bevels extends from below the decor layer—more preferably from the bottom of the bevels—to a position above the decor layer. Such embodiments provide an even more realistic grout imitation.

Preferably, the lacquer layer comprises sand and/or particles preferably having a particle size larger than 20 µm.

Such embodiments provide a realistic imitation of a typical grout comprising sand or other particles, e.g. of a typical grout bound by cement.

More preferably, at least part of the sand and/or of the particles are present at the surface of the lacquer layer; more preferably thereby creating a rough surface of the recess. Such embodiments provide an even more realistic imitation of a grout as used with ceramic tiles.

Preferably, the lacquer is an acrylate lacquer, a polyurethane lacquer or a polyurethane acrylate lacquer, preferably a UV-cured lacquer.

In preferred embodiments wherein a first zone is provided, preferably, the first zone does not comprise the lacquer layer. Such embodiments are particularly preferred as there is no risk that the lacquer layer is damaged when coupling the panels at their first pair of opposite edges.

In preferred embodiments of the fifth aspect of the invention, the coupling parts at the first pair of opposite edges are configured such that in coupled condition of the panel with another such panel at their respective edges of the first pair of opposite edges, the mechanical locking means which prevent the drifting apart of the locked panels in the direction perpendicular to the coupled edges and parallel with the surface of the coupled panels prevent the drifting apart while allowing a play in that direction of at least 0.2 mm; and preferably of less than 0.5 mm. Such embodiments allow to compensate for manufacturing tolerances during panel installation. For instance when the panels have besides the first pair of opposite edges of a second pair of opposite edges having a 90° angle with the first pair of opposite edges. Due to manufacturing tolerances, this angle can be different from 90°. The play allows to compensate for such variations. Such embodiments are especially of interest when the panels are square, e.g. width sides larger than 300 mm, or even larger than 400 mm or even larger than 500 mm.

In preferred embodiments, the allowing the play is at least in part made possible by an elastic deformation of at least one of the coupling parts, preferably of the female coupling part; or alternatively the play does not require an elastic deformation of at least one of the coupling parts.

Preferably, the allowing a play is at least in part made possible by the relative position in the direction perpendicular to the first pair of opposite edges parallel with the surface of the panels coupled at their first pair of opposite edges of the overlap of the female edge of the upper surface of the section of the male edge. More preferably, the overlapped section of the male edge is parallel with the surface of the panel.

In preferred embodiments of the fifth aspect of the invention, the part of the upper surface of the section which is visible in the view perpendicular to the surface of the coupled panels is configured for providing a grout imitation in a covering comprising as plurality of such panels.

In preferred embodiments of the fifth aspect of the invention, the panel comprises a second pair of opposite edges. The panel is provided at the second pair of opposite edges with second coupling parts, cooperating which each other, substantially in the form of second male coupling parts and second female coupling parts, for coupling two such panels at their second pair of opposite edges to each other in a floor, wall or ceiling covering. The second male coupling part is provided at the second male edge of second pair of opposite edges. The second female coupling part is provided at the second female edge of the panels. The second coupling parts are provided with second mechanical locking means which prevent the drifting apart of two such panels coupled at their second pair of opposite edges into the direction perpendicular to the surface of the coupled panels as well as into the direction perpendicular to the respective coupled edges in the plane parallel to the coupled panels. The second male edge, preferably the second male coupling part, comprises a section the upper surface of which is provided below the surface of the floor panel and below the location of the decor layer. Preferably the upper surface of the section of the second male edge is provided with a substantially uniform color. Preferably wherein the visual appearance of the upper surface of the section of the second male edge differs over its full surface from the visual appearance of the decor layer. In coupled condition of the first such panel coupled at its second male edge onto the second female edge of a third such panel, the second female edge of the third such panel overlaps part of the upper surface of the section of the second male edge of the first such panel, such that part of the upper surface of the section of the second male edge of the first such panel is hidden from view whereas part of the upper surface of the section of the second male edge of the first such panel is visible in the view perpendicular to the surface of the coupled panels. Preferably wherein the part of the upper surface of the section of the second male edge that is visible in the view perpendicular to the surface of the coupled panels is at least 1.5 mm wide, more preferably at least 2 mm wide, more preferably at least 3 mm wide, more preferably more than 3.5 mm wide, and preferably less than 5 mm wide. Such embodiments provide a realistic grout imitation.

Preferably, at least part of the—and preferably the complete—upper surface of the section of the second male edge which is visible in the view perpendicular to the surface of the coupled first and third such panels is parallel with the surface of the panel. Such embodiments provide a more realistic grout imitation.

Preferably, the second male edge and the second female edges each comprise a bevel. More preferably, the bevels of the second male edge and of the second female edge are convex bevels, preferably wherein the bevel edges are partially or fully curved.

Preferably, the bevel at the second male edge is substantially the mirror image of the bevel of the second female edge.

Preferably, the bevels have along the edge an irregular cross section.

Each of the embodiments wherein bevels are provided, provide a more realistic imitation of a grout.

Preferably, the distance from the surface of the panel of the section of the male coupling edge is substantially the same as the distance from the surface of the panel of the section of the second male edge. Such embodiments contribute to a more realistic grout imitation.

In preferred embodiments of the fifth aspect of the invention, the part of the upper surface of the section of the male edge which is visible in the view perpendicular to the surface of the coupled panels has substantially the same color as the part of the upper surface of the section of the second male edge which is visible in the view perpendicular to the surface of the coupled panels. Such embodiments contribute to a more realistic grout imitation.

In preferred embodiments of the fifth aspect of the invention, the second female edge of the third such panel contacts the upper surface of the section of the second male edge of the first such panel which is provided below the surface of the floor panel and below the location of the decor layer in a first zone of the upper surface of the second male edge. The upper surface of the second male edge, preferably of the second male coupling part, comprises a second zone less distal than the first zone, wherein the second female edge of the third such panel overlaps the second zone without contacting it but such that the second zone is hidden from view.

Preferably, the second zone of the second male edge is distanced more from the surface of the floor panel than the first zone of the second male coupling part.

In preferred embodiments of the fifth aspect of the invention, the coupling parts at the second pair of opposite edges are configured such that in coupled condition of the panel with another such panel at their respective edges of the second pair of opposite edges, the mechanical locking means which prevent the drifting apart of the locked panels in the direction perpendicular to the second pair of opposite edges and parallel with the surface of the coupled panels prevent the drifting apart while allowing a play in that direction of at least 0.2 mm; and preferably of less than 0.5 mm.

Preferably, the allowing the play in the direction perpendicular to the second pair of opposite edges and parallel with the surface of the coupled panels is at least in part made possible by an elastic deformation of at least one of the second coupling parts, preferably of the second female coupling part. Alternatively, wherein the play does not require an elastic deformation of at least one of the coupling parts.

In preferred embodiments of the fifth aspect of the invention, the allowing the play in the direction perpendicular to the second pair of opposite edges and parallel with the surface of the coupled panels is at least in part made possible by the relative position in the direction perpendicular to the first pair of opposite edges parallel with the surface of the panels coupled at their second pair of opposite edges of the overlap of the second female edge of the upper surface of the section of the second male edge.

In the same manner as when allowing play at the first pair of opposite edges, play at the second pair of opposite edges allows to cope during installation with manufacturing tolerances, especially with respect to angles between the first and the second pair of opposite edges.

In a preferred embodiment of the fifth aspect of the invention, instead of the male edge, the female edge, preferably the female coupling part, comprises a section of the upper surface of which is provided below the surface of the floor panel and below the location of the decor layer. More preferably, the upper surface of the section is provided with a substantially uniform color. In coupled condition of a first such panel coupled at its male edge onto the female edge of a second such panel, instead of the female edge overlapping, it is the male edge that overlaps part of the upper surface of the section of the female edge of the first such panel such that part of the upper surface of the section of the female edge of the first such panel is hidden from view whereas part of the upper surface of the section is visible in the view perpendicular to the surface of the coupled panels. Such embodiments provide for a grout imitation, while the overlap allows that manufacturing variations, e.g. because of adjoining panel edges of rectangular or square panels not being orthogonal to each other are hidden by the overlap.

In a first option for the first pair of opposite edges for any embodiment of the first, third or fifth aspect of invention, the male edge comprises a tongue—preferably extending in the direction parallel with the panel surface—providing the male coupling parts. The female edge comprises a groove providing the female coupling part, wherein the groove is bordered by an upper lip and a lower lip, preferably wherein the lower lip extends further than the upper lip.

In a preferred embodiment according to this first option, the lower lip comprises a locking element. The bottom of the tongue comprises a locking element. In coupled condition of two such panels at their first pair of opposite edges, the locking element of the lower lip contacts the locking element of the tongue thereby establishing a locking of the coupled panels at their first pair of opposite edges in the direction perpendicular to the coupled edges and parallel with the surface of the coupled panels; preferably wherein the locking is established with pretension.

More preferably, the locking element of the lower lip is provided distally from the distal end of the upper lip.

In a preferred embodiment according to this first option, in coupled condition of two such panels at their first pair of opposite edges, the bottom of the tongue makes contact with the upper surface of the lower lip at at least two different sections separated by a gap.

In a preferred embodiment according to this first option, the coupling parts of the first pair of opposite edges are configured such that a first such panel can be coupled with its male edge into the female edge of a second such panel by means of an angling movement and/or by means of a substantially horizontal sliding movement with snap action. Such embodiments provide for an easy way of coupling the panels for a floating installation.

In a preferred embodiment according to this first option, the recess is provided at the male edge; wherein the recess extends in the direction parallel with the surface of the panel and perpendicular to the first pair of opposite edges in proximal direction to at least half of the distance between on the one hand the distal end of the recess and on the other hand the middle of the section of the locking element of the lower lip that will contact the locking element of the tongue in coupled condition of two such panels at their first pair of opposite edges. More preferably the recess extends in the direction parallel with the surface of the panel and perpendicular to the first pair of opposite edges in proximal direction to at least vertically above the locking element of the lower lip that will contact the locking element of the tongue in coupled condition of two such panels at their first pair of opposite edges. Such embodiments provide for a recess the width of which is well suited to provide a grouting imitation after installation of the panels.

In a preferred embodiment according to this first option, the recess is provided at the female edge. The recess extends in the direction parallel with the surface of the panel and perpendicular to the first pair of opposite edges in proximal direction to at least half of the distance between on the one hand the distal end of the recess and on the other hand the proximal end of the groove. More preferably, the recess extends in the direction parallel with the surface of the panel and perpendicular to the first pair of opposite edges in proximal direction to beyond the proximal end of the groove. Such embodiments provide for a recess the width of which is well suited to provide a grouting imitation after installation of the panels.

In a preferred embodiment according to this first option, the part of the upper surface of the section of the male edge that is visible in the view perpendicular to the surface of the coupled panels extends in the direction parallel with the surface of the panel and perpendicular to the first pair of opposite edges in proximal direction to at least half of the distance between on the one hand the distal end of the tongue and on the other hand the middle of the section of the locking element of the lower lip that will contact the locking element of the tongue in coupled condition of two such panels at their first pair of opposite edges. More preferably, the part of the upper surface of the section of the male edge that is visible in the view perpendicular to the surface of the coupled panels extends in the direction parallel with the surface of the panel and perpendicular to the first pair of opposite edges in proximal direction to at least vertically above the locking element of the lower lip that will contact the locking element of the tongue in coupled condition of two such panels at their first pair of opposite edges. Such embodiments provide for a recess the width of which is well suited to provide a grouting imitation after installation of the panels.

In a second option for the first pair of opposite edges for any embodiment of the first, third or fifth aspect of invention, the male edge comprises a downward-directed upper hook-shaped part; wherein the downward-directed upper hook-shaped part comprises—and preferably consists of—a lip with a downward-directed locking element which forms the male coupling part. The female edge comprises an upward-directed lower hook-shaped part; wherein the upward-directed lower hook-shaped part comprises—and preferably consists of—a lip with an upward-directed locking element, which, proximally thereof, defines the female coupling part in the form of a coupling recess. The male coupling part and the female coupling part are configured such that a first and a second such panel can be coupled to each other at their respective first pair of opposite edges by means of a movement substantially perpendicular to the surface of the first and the second such panels. Such embodiments provide for an easy panel installation in a floating covering, e.g. a floating floor covering.

In a preferred embodiment according to this second option, the edges of the first pair of opposite edges are provided with mechanical locking means such that in coupled condition of a first such panel to a second such panel at their first pair of opposite edges, a locking perpendicularly to the surface of the panels is provided at the distal end of the downward-directed locking element of the panel.

In a preferred embodiment according to this second option, the locking means comprise an undercut at the female edge, wherein the undercut is provided for interacting with the downward-directed locking element of the coupled panel—preferably for interacting with the distal end of the downward-directed locking elements—thereby establishing a locking perpendicularly to the surface of the panels at the distal end of the downward-directed locking element of the panel. Such embodiments provide for an effective locking of coupled panels.

In a preferred embodiment according to this second option, the first pair of opposite edges are configured such that in coupled condition of two such panels at their first pair of opposite edges, no locking in the direction perpendicular to the surface of the coupled panels is provided at the distal end of the upward-directed locking element.

In a preferred embodiment according to this second option, no locking in the direction perpendicular to the surface of the panels coupled at their first pair of opposite edges is provided at the proximal end of the upward-directed locking element nor at the proximal end of the downward-directed locking element.

In a preferred embodiment according to this second option, the proximal end of the downward-directed locking element comprises a first inclined contact surface; wherein the proximal end of the upward-directed locking element comprises a second inclined contact surface; wherein in coupled condition of two such panels at their first pair of opposite edges, the first inclined contact surface of the first such panel contacts the second inclined contact surface of the second such panel; thereby establishing a locking of the coupled panels in the direction perpendicular to the surface of the coupled panels. Preferably wherein the locking is established with pretension.

In a preferred embodiment according to this second option, the first pair of opposite edges are configured such that in coupled condition of two such panels at their first pair of opposite edges, a locking in the direction perpendicular to the surface of the coupled panels is provided at the distal end of the upward-directed locking element; wherein the locking is provided with or without contact.

More preferably, the distal end of the upward-directed locking element comprises an undercut or a bulge, wherein the bottom surface of the undercut or of the bulge is provided for establishing a locking in the direction perpendicular to the surface of the coupled panels.

In a preferred embodiment according to this second option, the upward-directed locking element contacts the proximal end of the edge of the panel with which it is coupled at the distal end of the upward-directed locking element; and/or the distal end of the upward-directed locking element comprises an undercut and the upward-directed locking element contacts the proximal end of the edge of the panel with which it is coupled at the undercut of the upward-directed locking element. In both alternatives a locking in the direction perpendicular to the surface of the coupled panels is established.

In a preferred embodiment according to this second option, the proximal end of the male edge comprises a corresponding hook, wherein the corresponding hook is provided for interacting with the upward-directed locking element of the coupled panel for establishing a locking in the direction perpendicular to the surface of the coupled panels.

In a preferred embodiment according to this second option, the first pair of opposite edges are configured such that in coupled condition of two such panels at their first pair of opposite edges, no locking in the direction perpendicular to the surface of the coupled panels is provided at the distal end of the upward-directed locking element.

In a preferred embodiment according to this second option, the recess is provided at the male edge. The recess extends in the direction parallel with the surface of the panel and perpendicular to the first pair of opposite edges in proximal direction to at least half of the distance between on the one hand the distal end of the recess and on the other hand the middle of the section of the proximal end of the downward-directed locking element that will in coupled condition contact the proximal end of the upward-directed locking element. More preferably, the recess extends in the direction parallel with the surface of the panel and perpendicular to the first pair of opposite edges in proximal direction to beyond the proximal end of the downward-directed locking element. Such embodiments provide for a recess the width of which is well suited to provide a grouting imitation after installation of the panels.

In a preferred embodiment according to this second option, the recess is provided at the female edge. The width of the recess is at least 30% of the thickness of the panel, preferably at least 40% of the thickness of the panel, more preferably at least 60% of the thickness of the panel; and preferably less than 100% of the thickness of the panel. Such embodiments provide for a recess the width of which is well suited to provide a grouting imitation after installation of the panels.

In a preferred embodiment according to this second option, the part of the upper surface of the section of the male edge that is visible in the view perpendicular to the surface of the coupled panels extends in the direction parallel with the surface of the panel and perpendicular to the first pair of opposite edges in proximal direction to at least half of the distance between on the one hand the distal end of the recess and on the other hand the middle of the section of the proximal end of the downward-directed locking element that will in coupled condition contact the proximal end of the upward-directed locking element. More preferably wherein the part of the upper surface of the section of the male edge that is visible in the view perpendicular to the surface of the coupled panels extends in the direction parallel with the surface of the panel and perpendicular to the first pair of opposite edges in proximal direction to beyond the proximal end of the downward-directed locking element. Such embodiments provide for a recess the width of which is well suited to provide a grouting imitation after installation of the panels.

In a first option for the second pair of opposite edges for any embodiment of the first, third or fifth aspect of invention, the second male edge comprises a second tongue—preferably extending in the direction parallel with the panel surface—providing the second male coupling parts. The second female edge comprises a second groove providing the second female coupling part, wherein the second groove is bordered by a second upper lip and a second lower lip, preferably wherein the second lower lip extends further than the second upper lip.

In a preferred embodiment according to this first option, the second lower lip comprises a second locking element, and the bottom of the second tongue comprises a second locking element, wherein in coupled condition of two such panels at their second pair of opposite edges, the second locking element of the second lower lip contacts the second locking element of the second tongue thereby establishing a locking of the coupled panels at their second pair of opposite edges in the direction perpendicular to the coupled edges and parallel with the surface of the coupled panels; more preferably wherein the locking is established with pretension.

Preferably, the second locking element of the second lower lip is provided distally from the distal end of the second upper lip.

In a preferred embodiment according to this first option, in coupled condition of two such panels at their second pair of opposite edges, the bottom of the second tongue makes contact with the upper surface of the second lower lip at at least two different sections separated by a gap.

In a preferred embodiment according to this first option, the coupling parts of the second pair of opposite edges are configured such that a first such panel can be coupled with its second male edge into the second female edge of a third such panel by means of an angling movement and/or by means of a substantially horizontal sliding movement with snap action.

In a second option for the second pair of opposite edges for any embodiment of the first, third or fifth aspect of invention, the second male edge comprises a second downward-directed upper hook-shaped part; wherein the second downward-directed upper hook-shaped part comprises—and preferably consists of—a lip with a second downward-directed locking element which forms the second male coupling part. The second female edge comprises a second upward-directed lower hook-shaped part; wherein the second upward-directed lower hook-shaped part comprises—and preferably consists of—a lip with a second upward-directed locking element, which, proximally thereof, defines the second female coupling part in the form of a second coupling recess. The second male coupling part and the second female coupling part are configured such that two such panels can be coupled to each other at their respective second pair of opposite edges by means of a movement substantially perpendicular to the surface of the two such panels being coupled. Such embodiments provide for an easy installation of the panels.

In preferred embodiments according to this second option, the edges of the second pair of opposite edges are provided with mechanical locking means such that in coupled condition of a first such panel to a third such panel at their second pair of opposite edges, a locking perpendicularly to the surface of the panels is provided at the distal end of the second downward-directed locking element of the panel. Such embodiments provide for an effective locking of the installed panels.

In preferred embodiments according to this second option, the locking means comprise a second undercut at the second female edge, wherein the second undercut is provided for interacting with the second downward-directed locking element of the coupled panel, —preferably for interacting with a locking element at the distal end of the second downward-directed locking element—thereby establishing a locking perpendicularly to the surface of the panels at the distal end of the second downward-directed locking element of the panel. Such embodiments provide for an effective locking of the installed panels.

In preferred embodiments according to this second option, the second pair of opposite edges are configured such that in coupled condition of two such panels at their second pair of opposite edges, no locking in the direction perpendicular to the surface of the coupled panels is provided at the distal end of the second upward-directed locking element.

In preferred embodiments according to this second option, no locking in the direction perpendicular to the surface of the panels between panels coupled at their second pair of opposite edges is provided at the proximal end of the second upward-directed locking element nor at the proximal end of the second downward-directed locking element.

In preferred embodiments according to this second option, the proximal end of the second downward-directed locking element comprises a third inclined contact surface; wherein the proximal end of the second upward-directed locking element comprises a fourth inclined contact surface; wherein in coupled condition of two such panels coupled at their second pair of opposite edges, the third inclined contact surface of the first such panel contacts the fourth inclined contact surface of the third such panel; thereby establishing a locking of the coupled panels in the direction perpendicular to the surface of the coupled panels; preferably wherein the locking is established with pretension. Such embodiments provide for an effective locking of the installed panels.

In preferred embodiments according to this second option, the second pair of opposite edges are configured such that in coupled condition of two such panels at their second pair of opposite edges, a locking in the direction perpendicular to the surface of the coupled panels is provided at the distal end of the second upward-directed locking element; wherein the locking is provided with or without contact. Such embodiments provide for an effective locking of the installed panels.

More preferably, the distal end of the second upward-directed locking element comprises a second undercut or a second bulge, wherein the bottom surface of the second undercut or of the second bulge is provided for establishing a locking in the direction perpendicular to the surface of the coupled panels.

In preferred embodiments according to this second option, the second upward-directed locking element contacts the proximal end of the edge of the panel with which it is coupled at the distal end of the second upward-directed locking element; and/or the distal end of the second upward-directed locking element comprises a second undercut and the second upward-directed locking element contacts the proximal end of the edge of the panel with which it is coupled at the second undercut of the second upward-directed locking element. Both alternatives establish a locking in the direction perpendicular to the surface of the coupled panels.

More preferably, the proximal end of the second male edge comprises a second corresponding hook, wherein the second corresponding hook is provided for interacting with the second upward-directed locking element of the coupled panel for establishing a locking in the direction perpendicular to the surface of the coupled panels.

In preferred embodiments according to this second option, the second pair of opposite edges are configured such that in coupled condition of two such panels at their first pair of opposite edges, no locking in the direction perpendicular to the surface of the coupled panels is provided at the distal end of the upward-directed locking element.

In a preferred embodiment of the first, third or fifth aspect of the invention, the coupling parts of the first pair of opposite edges and the coupling parts of the second pair of opposite edges are configured such that a plurality of such panels can be installed into a covering by means of the fold-down method of installation. This way, a very easy and efficient installation of panels in a floating floor covering can be realized, in which no grouting is required after panel installation, while obtaining a realistic grouting imitation.

A sixth aspect of the invention relates to a panel, comprising a substrate and a top layer. The top layer comprises a decor layer and a wear layer. The panel is provided at a first pair of opposite edges with coupling parts, cooperating which each other, substantially in the form of a tongue and a groove, for coupling two such panels at their first pair of opposite edges to each other in a floor, wall or ceiling covering. The tongue is provided at the male edge of the first pair of opposite edges; preferably wherein the tongue extends at the male edge in the direction parallel with the panel surface. The groove is provided at the female edge of the first pair of opposite edges; wherein the groove is bordered by an upper lip and a lower lip, preferably wherein the lower lip extends further than the upper lip. The coupling parts are provided with mechanical locking means which prevent the drifting apart of two coupled panels into the direction perpendicular to the respective coupled edges in the plane parallel to the coupled panels as well as in the direction perpendicular to the panel surface. The surface of the male edge is provided with a recess, preferably wherein the recess extends deeper into the panel than the location of the decor layer. Preferably, the width of the recess is at least 1.5 mm, more preferably at least 2 mm, more preferably at least 3 mm, more preferably at least 3.5 mm; and preferably less than 5 mm.

The panel comprises a second pair of opposite edges; wherein the panel is provided at the second pair of opposite edges with second coupling parts, cooperating which each other, substantially in the form of second male coupling parts and second female coupling parts, for coupling two such panels at their second pair of opposite edges to each other in a floor, wall or ceiling covering. The second male coupling part is provided at the second male edge of second pair of opposite edges; wherein the second female coupling part is provided at the second female edge of the panels. The second coupling parts are provided with second mechanical locking means which prevent the drifting apart of two such panels coupled at their second pair of opposite edges into the direction perpendicular to the surface of the coupled panels as well as into the direction perpendicular to the respective coupled edges in the plane parallel to the coupled panels. The second male edge comprises a downward-directed upper hook-shaped part; wherein the downward-directed upper hook-shaped part comprises—and preferably consists of—a lip with a downward-directed locking element which forms the second male coupling part. The second female edge comprises an upward-directed lower hook-shaped part; wherein the upward-directed lower hook-shaped part comprises—and preferably consists of—a lip with an upward-directed locking element, which, proximally thereof, defines the second female coupling part in the form of a coupling recess. The second male coupling part and the second female coupling part are configured such that two such panels can be coupled to each other at their respective second pair of opposite edges by means of a movement substantially perpendicular to the surface of the two such panels being coupled.

The coupling parts of the first pair of opposite edges and of the second coupling parts of the second pair of opposite edges are configured such that a plurality of such panels can be coupled into a covering using the fold-down method of installation. The surface of the second female edge or the surface of the second male edge is provided with a second recess, preferably wherein the second recess extends deeper into the panel than the location of the decor layer. The width of the second recess is preferably at least 1.5 mm, more preferably at least 2 mm, more preferably at least 3 mm, more preferably at least 3.5 mm; and preferably less than 5 mm. Preferably, the width of the second recess is substantially the same as the width of the recess.

It is a benefit of the sixth aspect of the invention that panels can be provided that provide a realistic imitation of grouting, while no grouting is required. The recess and the second recess provide the imitation of a grouting, already present in the panels before installation of the panels in a covering. The panels can be floatingly installed in a floor covering; and need no additional operation after the mechanical coupling to show the realistic imitation of grouting.

In an embodiment of the sixth aspect of the invention, the lower lip comprises a locking element, and the bottom of the tongue comprises a locking element, wherein in coupled condition of two such panels at their first pair of opposite edges, the locking element of the lower lip contacts the locking element of the tongue thereby establishing a locking of the coupled panels at their first pair of opposite edges in the direction perpendicular to the coupled edges and parallel with the surface of the coupled panels; preferably wherein the locking is established with pretension. Such panels can be installed floatingly, wherein an excellent locking of the panels is obtained.

In a preferred embodiment of the sixth aspect of the invention, the locking element of the lower lip is provided distally from the distal end of the upper lip. The recess extends in the direction parallel with the surface of the panel and perpendicular to the first pair of opposite edges in proximal direction to at least half of the distance between on the one hand the distal end of the recess and on the other hand the middle of the section of the locking element of the lower lip that will contact the locking element of the tongue in coupled condition of two such panels at their first pair of opposite edges. More preferably the recess extends in the direction parallel with the surface of the panel and perpendicular to the first pair of opposite edges in proximal direction to at least vertically above the locking element of the lower lip that will contact the locking element of the tongue in coupled condition of two such panels at their first pair of opposite edges. Such embodiments provide an even more realistic grouting imitation, because of the width of the recesses.

In a preferred embodiment of the sixth aspect of the invention, in coupled condition of two such panels at their first pair of opposite edges, the bottom of the tongue makes contact with the upper surface of the lower lip at at least two different sections separated by a gap.

In a preferred embodiment of the sixth aspect of the invention, the coupling parts of the first pair of opposite edges are configured such that a first such panel can be coupled with its male edge into the female edge of a second such panel by means of an angling movement. Such applications facilitate the installation of the panels.

In a preferred embodiment of the sixth aspect of the invention, the proximal end of the second female edge of the second pair or opposite edges comprises a third closing plane, wherein the distal end of the second male edge of the second pair of opposite edges comprises a fourth closing plane, wherein in coupled condition of two such panels at their second pair of opposite edges the third closing plane of the first such panel contacts the fourth closing plane of the third such panel thereby providing a contact surface between the two coupled such panels, wherein the contact surface is substantially perpendicular to the surface of the coupled panels. The edges of the second pair of opposite edges are provided with mechanical locking means such that in coupled condition of a first such panel to a third such panel at their second pair of opposite edges, a contact zone is established between the mechanical locking means thereby providing a locking perpendicularly to the surface of the panels at the distal end of the downward-directed locking element of the panel; preferably the extension of the contact surface intersects the contact zone between the mechanical locking means (which improves the locking of the panels and thus prevents that gaps occur in coupled condition of the panels which would be detrimental for a good looking grout imitation). More preferably, the locking means comprise an undercut at the second female edge, wherein the undercut interacts with the downward-directed locking element of the coupled panel—and preferably interacts with a locking element 81 at the distal end of the second downward-directed locking element 66, thereby establishing a locking perpendicularly to the surface of the panels at the distal end of the downward-directed locking element of the panel.

In a preferred embodiment of the sixth aspect of the invention, no locking in the direction perpendicular to the surface of the coupled panels is established at the second pair of opposite edges between the distal end of the second male edge and the proximal end of the second female edge.

In a preferred embodiment of the sixth aspect of the invention, no locking in the direction perpendicular to the surface of the panels coupled at their second pair of opposite edges is provided at the proximal end of the upward-directed locking element nor at the proximal end of the downward-directed locking element.

In a preferred embodiment of the sixth aspect of the invention, the proximal end of the downward-directed locking element comprises a first inclined contact surface; wherein the proximal end of the upward-directed locking element comprises a second inclined contact surface; wherein in coupled condition of two such panels at their second pair of opposite edges, the first inclined contact surface of the first such panel contacts the second inclined contact surface of the third such panel; thereby establishing a locking of the coupled panels in the direction perpendicular to the surface of the coupled panels; preferably wherein the locking is established with pretension.

In a preferred embodiment of the sixth aspect of the invention, the second pair of opposite edges are configured such that in coupled condition of two such panels at their second pair of opposite edges, a locking in the direction perpendicular to the surface of the coupled panels is provided at the distal end of the upward-directed locking element; wherein the locking is provided with or without contact. More preferably, the distal end of the upward-directed locking element comprises an undercut or a bulge, wherein the bottom surface of the undercut or of the bulge is provided for establishing a locking in the direction perpendicular to the surface of the coupled panels.

In a preferred embodiment of the sixth aspect of the invention, the upward-directed locking element contacts the proximal end of the edge of the panel with which it is coupled at the distal end of the upward-directed locking element; and/or the distal end of the upward-directed locking element comprises an undercut and the upward-directed locking element contacts the proximal end of the edge of the panel with which it is coupled at the undercut of the upward-directed locking element. In each of these options, an efficient and effective locking in the direction perpendicular to the surface of the coupled panels is established.

In a preferred embodiment of the sixth aspect of the invention, the proximal end of the second male edge comprises a corresponding hook, wherein the corresponding hook is provided for interacting with the upward-directed locking element of the coupled panel for establishing a locking in the direction perpendicular to the surface of the coupled panels.

In a preferred embodiment of the sixth aspect of the invention, the second pair of opposite edges are configured such that in coupled condition of two such panels at their second pair of opposite edges, no locking in the direction perpendicular to the surface of the coupled panels is provided at the distal end of the upward-directed locking element.

In a preferred embodiment of the sixth aspect of the invention, the recess and the second recess are provided with a lacquer layer, wherein the lacquer layer of the recess is at least partially visible in coupled condition of the panel with another such panel at their respective first pair of opposite edges, and wherein the lacquer layer of the second recess is at least partially visible in coupled condition of the panel with another such panel at their respective second pair of opposite edges. Preferably the thickness of both lacquer layers is less than 200 μm, more preferably less than 100 μm, even more preferably less than 60 μm.

Preferably at least part of the side edges of the recess and of the second recess is provided with the lacquer layer; more preferably the lacquer layer extends at the sides of the recess and of the second recess from the bottom of the recess up to closer to the panel surface than the location of the decor layer.

Preferably the panel edge opposite to the edge comprising the recess and the panel edge opposite to the edge comprising the second recess are at least over a section provided with a lacquer layer; more preferably the lacquer layers at these edges extend from below the location of the decor layer up to a position above the location of the decor layer. More preferably, the lacquer layer at these edges is provided on bevels provided at these edges. More preferably, all lacquer layers have the same composition and appearance. According to such embodiments, the decor layer is hidden from view at the side edges of the recess and of the second recess, as well as at the edges opposite to the edges comprising respectively the recess and the second recess. Such embodiments provide an even more realistic grout imitation of coupled panels, wherein the realistic grout imitation is already present in the panels, such that no grouting operation is required after installation of the panels.

In a preferred embodiment of the sixth aspect of the invention wherein lacquer layers are provided, the lacquer layers of the recess and of the second recess comprise sand and/or particles preferably having a particle size larger than 20 µm.

In a preferred embodiment of the sixth aspect of the invention, the first pair of opposite edges and/or the second pair of opposite edges are provided with bevels.

In a preferred embodiment of the sixth aspect of the invention, the proximal end of the female edge of the first pair of opposite edges comprises a first closing plane, wherein the distal end of the male edge of the first pair of opposite edges comprises a second closing plane, wherein in coupled condition of two such panels at their first pair of opposite edges the first closing plane of the first such panel contacts the second closing plane of the second such panel thereby providing a contact surface between the two coupled such panels, wherein the contact surface is substantially perpendicular to the surface of the coupled panels.

In a preferred embodiment of the sixth aspect of the invention, the proximal end of the second female edge of the second pair or opposite edges comprises a third closing plane, wherein the distal end of the second male edge of the second pair of opposite edges comprises a fourth closing plane, wherein in coupled condition of two such panels at their second pair of opposite edges the third closing plane of the first such panel contacts the fourth closing plane of the third such panel thereby providing a contact surface between the two coupled such panels, wherein the contact surface is substantially perpendicular to the surface of the coupled panels.

In a preferred embodiment of the sixth aspect of the invention, a polymer filling material fills the recess and the second recess at least partially, wherein the polymer filling materials extend vertically from the position below the location of the decor layer to the location vertically above the location of the decor layer in the panel. Such embodiments provide a realistic grout imitation already present on the panels before installation, such that no grouting operation is required after panel installation while obtaining a realistic grouting imitation. Preferably the thickness of the polymer filling material is more than 400 µm, even more preferably more than 500 µm, even more preferably more than 700 µm.

More preferably, the surface of the polymer filling materials in the recess and in the second recess are at least partially and preferably over its full surface parallel with the surface of the panel.

More preferably, the polymer filling materials provide part of the panel edge on which the polymer filling materials are provided. More preferably the polymer filling materials provide at least over 0.1 mm (and preferably over at least 0.5 mm) the edge on which the polymer filling material is provided. Even more preferably, the part of the panel edges provided by the polymer filling materials is a cut or a milled edge. Such embodiments can be realized by providing a cutting or milling operation on the panel edge after applying the polymer filling material in order to determine the distal edge of the polymer filling material in the recess and/or in the second recess.

Preferably, in embodiments of the sixth aspect of the invention wherein a polymer filling material is used, the polymer filling materials comprises a thermoset polymer or an elastomeric polymer, e.g. an epoxy; or the polymer filling materials comprise an acrylate binder.

Preferably, polymer filling material comprises sand bound by a polymer binder, e.g. by means of an epoxy or an acrylate binder.

Preferably, the polymer filling material comprises pigments, preferably to provide the polymer filling material in coupled panels as a grout imitation. Such embodiments allow to set the color of the filling material, and hence of the grouting imitation, such that not only a realistic grouting imitation can be achieved but the color can be set taking into account the decoration of the decor layer.

Preferably, the polymer filling materials comprise at least at its visible surface sand and/or particles preferably having a particle size larger than 20 µm. More preferably, the sand and/or the particles provide the polymer filling materials with a rough surface. Such embodiments provide an even more realistic grouting imitation.

In preferred embodiments of the sixth aspect of the invention, the recess comprises a bottom—preferably a flat bottom—and a flank proximally from the bottom.

In preferred embodiments of the sixth aspect of the invention, the second recess comprises a bottom—preferably a flat bottom—and a flank proximally from the bottom.

In preferred embodiments of the sixth aspect of the invention, the cross section of the recess perpendicularly to the panel edge where the recess is provided is substantially the same as the cross section of the second recess perpendicularly to the panel edge where the second recess is provided. Such embodiments provide an even more realistic grouting imitation.

In preferred embodiments of the sixth aspect of the invention, the panel edge where the recess is provided joins the panel edge where the second recess is provided in a joint; wherein in the joint the recess continues without interruption into the second recess. Such embodiments provide an even more realistic grouting imitation.

The seventh aspect of the invention relates to a panel. The panel comprises a substrate and a top layer. The top layer comprises a decor layer and a wear layer. Preferably, the decor layer comprises a printed film. The panel is provided at a first pair of opposite edges with coupling parts, cooperating which each other, substantially in the form of male coupling parts and female coupling parts, for coupling two such panels at their first pair of opposite edges to each other in a floor, wall or ceiling covering; The male coupling part is provided at the male edge of the first pair of opposite edges. The coupling parts are provided with mechanical locking means which prevent the drifting apart of two coupled panels into the direction perpendicular to the surface of the coupled panels as well as into the direction perpendicular to the respective coupled edges in the plane parallel to the coupled panels. The female coupling part is provided at the female edge of the first pair of opposite edges. The male coupling part comprises a tongue. The female coupling part comprises a groove bordered by an upper lip and a lower lip. Preferably, the lower lip extends more distal than the upper lip. The lower lip comprises a locking element and the bottom of the tongue comprises a locking element, wherein in coupled condition of two such panels at their first pair of opposite edges, the locking element of the lower lip contacts the locking element of the tongue thereby establishing a locking of the coupled panels at their first pair of opposite edges in the direction perpendicular to the coupled edges and parallel with the surface of the coupled panels. Preferably this locking is established with pretension. In coupled condition of the male edge with the female edge of another such panel, the upper surface of the tongue contacts the bottom of the upper lip. Preferably, this contact is substantially parallel with the panel surface or this contact makes an angle of less than 5° with the panel surface; such embodiments are beneficial as relative sliding of the panel edges is facilitated, allowing to accommodate expansion and shrinkage of the panels after their installation.

The surface of the male edge is provided with a recess, preferably comprising at least a section parallel with the panel surface. The upper lip comprises a distal portion extending from the panel edge. This distal portion can preferably be provided as a nose. The bottom surface of the distal portion is preferably provided in the substrate. In coupled condition of the female edge to the male edge of another such panel the distal portion of the upper lip of the female edge at least partially overlaps the recess at the surface of the male edge. Preferably, this overlap is provided with contact between the bottom of the distal portion and the recess, more preferably this contact is provided with pretension. This contact has the benefit that moisture is prevented from penetrating between the coupled edges of installed panels. This benefit is more outspoken when this contact is provided with pretension. This pretension can be obtained by providing overlapping profile designs.

Preferably, the overlap is provided with a gap between the bottom of the distal portion and the bottom of the recess; more preferably the gap between the bottom of the distal portion and the bottom of the recess is at least 0.1 mm and more preferably less than 0.3 mm and more preferably at maximum 0.2 mm. Such embodiments have the benefit that production tolerances can be taken up during installation of the panels.

The overlap between the distal portion and the recess at the surface of the male edge is provided at a vertical distance from the contact between the upper surface of the tongue and the bottom surface of the upper lip. The vertical distance between on the one hand the overlap between the distal portion and the recess at the surface of the male edge and on the other hand the contact between the upper surface of the tongue and the bottom surface of the upper lip is preferably at least 0.7 mm.

Panels according to the seventh aspect of the invention provide a very realistic grout imitation by the recess. As the distal portion at least partially overlaps the recess in coupled condition of the panels, the grout imitation appears as a continuous grout, no junction line is visible as with other grout imitations already present in the panels before installing the panels. The panels according to the seventh aspect of the invention can be coupled easily for floating installation of the panels.

Optionally, the panel of the seventh aspect of the invention is a panel according to any one non-contradictory embodiment of any one of the first aspect, the second aspect, the third aspect, the fourth aspect, the fifth aspect or the sixth aspect of the invention.

Optionally, a gap is provided in horizontal direction between the distal end of the tongue and the proximal end of the female edge.

In preferred embodiments of the seventh aspect of the invention, the distal portion comprises a bevel. The bevel can be a rounded bevel, convex or concave. The bevel can comprise a rounded section, convex or concave. Such embodiments have the benefit that an even more realistic imitation of grout is provided to the installed panels.

In preferred embodiments of the seventh aspect of the invention, the male edge comprises a bevel proximal from the recess. The bevel can be a rounded bevel, convex or concave. The bevel can comprise a rounded section, convex or concave. Such embodiments have the benefit that an even more realistic imitation of grout is provided to the installed panels.

In preferred embodiments of the seventh aspect of the invention, the recess is provided with a lacquer layer. In embodiments wherein the distal portion comprises a bevel, this bevel is preferably at least partially provided with a lacquer layer such that in coupled condition of two such panels at their first pair of opposite edges the lacquer layer of the recess visually continues into the lacquer layer of the bevel of the distal portion. In embodiments wherein the male edge comprises a bevel proximal from the recess, the lacquer layer of the recess preferably extends at least partially onto said bevel. Such embodiments provide an even more realistic imitation of grout. The lacquer layer can be colored, to provide the grout imitation with a color at will, such that an even more realistic grout imitation is obtained.

In embodiments wherein a lacquer layer is provided, preferably the lacquer layer comprises sand and/or particles preferably having a particle size larger than 20 μm. Such embodiments provide a grout imitation which shows a certain roughness, as is provided by real cement grout.

In embodiments wherein a lacquer layer is provided, preferably the lacquer layer is less than 200 μm thick, more preferably less than 100 μm thick, even more preferably less than 60 μm thick.

In preferred embodiments of the seventh aspect of the invention, the recess has a width of at least 2 mm, and more preferably of at least 2.3 mm. Such embodiments provide an even more realistic imitation of grout.

In preferred embodiments of the seventh aspect of the invention, the recess has in the coupled panels a visible width of at least 1.5 mm, more preferably of at least 2 mm. Such embodiments provide an even more realistic imitation of grout.

In preferred embodiments of the seventh aspect of the invention, the distal edge of the distal portion extends over at least a horizontal distance 0.25 mm and preferably of at least 0.7 mm from the female edge. Such embodiments provide an even more realistic imitation of grout.

In preferred embodiments of the seventh aspect of the invention, the recess extends into the substrate. Such embodiments allow to provide an improved panel. The color of the grout imitation can be provided by the substrate, or by a lacquer applied onto it. The depth of the recess can be selected such that it imitates the grout of a covering with ceramic tiles.

In preferred embodiments of the seventh aspect of the invention, in coupled condition of the female edge to the male edge of another such panel, a gap is provided which horizontally extends between the male edge and the female edge and vertically between the distal portion and the upper surface of the tongue. Preferably a gap is provided in horizontal direction between the distal end of the tongue and the proximal end of the female edge.

In preferred embodiments of the seventh aspect of the invention, in coupled condition of the female edge to the male edge of another such panel, the distal end of the upper lip below the distal portion contacts the male edge of the another such panel at least over part of the surface of the distal end of the upper lip below said distal portion; preferably this contact of the distal end of the upper lip below the distal portion is provided at a section of this distal end of the upper lip substantially perpendicular to the surface of the panel. Such embodiments are beneficial, as gaps at the corners of the panels of a covering comprising a multiple of such panels are better prevented.

In more preferred embodiments, the contact is made between the distal end of the upper lip below the distal portion and a lip protruding from the male edge of the another such panel. More preferably, the male edge and the female edge are configured such that when coupling two such panels, the protruding lip overlaps the female edge in the direction parallel with the panel surface and perpendicular to the coupled edges over at least 0.05 mm—and preferably over at least 0.10 mm—, such that in coupled condition the protruding lip contacts the female edge with pretension. It means that protruding lip will contact the female edge, while the protruding lip will be somewhat bulged and/or bent. This ensures a better contact between the protruding lip and the female edge. This ensure that gaps between the panel edges are better prevented, resulting in a more realistic grout imitation by the recess in coverings (e.g. floor coverings) comprising such panels. If is a further benefit of such embodiments—especially for panels of which the edge with the shortest length is rather long (e.g. longer than 300 mm) and/or (whether or not large) square panels that deviations from the squareness due to manufacturing tolerances can be compensated; ensuring a nice visual covering with a realistic grout simulation.

In preferred embodiments of the seventh aspect of the invention, the substrate comprises a first layer and a second layer, wherein the second layer is provided closer to the surface of the panel than the first layer. The composition of the first layer differs from the composition of the second layer. The tongue is provided in the first layer. The second layer is preferably made out of a more supple material than the first layer. Such embodiments allow to provide a more realistic grout imitation, e.g. by adapting the color of the layer into which the recess extends when producing this layer (e.g. by extrusion). A tongue provided in the more rigid second layer results in a sturdy coupling between the panel edges.

In embodiments wherein a lip is provided protruding from the male edge, it is preferred that this lip protruding from the male edge is provided in the second layer. Such embodiment is particularly beneficial when the second layer is made out of a more supple material than the first layer, as it allows to prevent better the occurrence of gaps at the coupled edges by means of pretension. As the second layer is more supple, the protruding lip will contact the female edge and bulge or bend through the pretension caused by the overlapping profiles of the male and the female edge of the panels.

Preferably the first layer and/or the second layer comprise thermoplastic material, e.g. polyvinyl chloride, and fillers, optionally the fillers comprise inorganic fillers, e.g. chalk or lime.

In preferred embodiments of the seventh aspect of the invention, the recess extends into the second layer, but preferably not into the first layer. Such embodiments allow to provide a more realistic grout imitation, e.g. by adapting the color of the second layer when producing this second layer.

In preferred embodiments of the seventh aspect of the invention, the recess extends into the substrate, and the proximal border of the recess extends substantially perpendicularly through the decor layer. It is a benefit of such embodiments that the cut through the decor layer is virtually not visible in a covering with such panels, as the exposed side edge is minimal and to a large extent hidden from view.

Preferably, the proximal border of the recess extends substantially perpendicularly through the panel over a distance less than the thickness of the decor layer plus 0.15 mm; and preferably over a distance less than 0.25 mm. This way, the cut through the decor is virtually not visible, even when tool wear or production tolerances occur; and a nice grout imitation is obtained in coverings comprising such panels.

In preferred embodiments of the seventh aspect of the invention, the bottom surface of the distal portion is provided in the substrate, and the distal border of the distal portion extends substantially perpendicularly through the decor layer. It is a benefit of such embodiments that the cut through the decor layer is virtually not visible in a covering with such panels, as the exposed side edge is minimal and to a large extent hidden from view.

Preferably, the distal border of the distal portion extends substantially perpendicularly through the panel over a distance of less than the thickness of the decor layer plus 0.15 mm; and preferably over a distance less than 0.25 mm. This way, the cut through the decor is virtually not visible, even when tool wear or production tolerances occur; and a nice grout imitation is obtained in coverings comprising such panels.

In preferred embodiments of the seventh aspect of the invention, the depth of the recess relative to the surface of the panel is at least 0.4 mm, more preferably at least 0.5 mm. Such embodiments provide an even more realistic grout imitation.

In preferred embodiments of the seventh aspect of the invention, the depth of the recess relative to the surface of the panels is less than 2 mm, more preferably less than 1.5 mm. Such embodiments provide an even more realistic grout imitation.

In preferred embodiments of the seventh aspect of the invention, the panel can be coupled to another such panel at their first pair of opposite edges, with its male edge onto the female edge of another such panel by means of an angling movement of the tongue of the panel into the groove of the another such panel; and/or by a displacement with snap effect of the tongue of the panel into the groove of the another such panel.

In a preferred embodiment of the seventh aspect of the invention, in coupled condition of two such panels at their first pair of opposite edges the minimum distance at the female edge proximal from the distal border of the distal portion perpendicular to the panel surface between the lower lip and the tongue is at least 0.1 mm; and more preferably at least 0.2 mm and more preferably at maximum 0.3 mm. Such embodiments are beneficial as possible production tolerances, especially milling tolerances of the coupling parts, will not cause difficulties when installing the panels.

In a preferred embodiment of the seventh aspect of the invention, the panel comprises a second pair of opposite edges, wherein the second pair of opposite edges are configured as described for the first pair of opposite edges in any embodiment of the seventh aspect of the invention.

The eighth aspect of the invention relates to a panel. The panel comprises a substrate and a top layer. The top layer comprises a decor layer and a wear layer. The decor layer preferably comprises a printed film. The panel is provided at a first pair of opposite edges with coupling parts, cooperating which each other, substantially in the form of male coupling parts and female coupling parts, for coupling two such panels at their first pair of opposite edges to each other in a floor, wall or ceiling covering. The male coupling part is provided at the male edge of the first pair of opposite edges. The coupling parts are provided with mechanical locking means which prevent the drifting apart of two coupled panels into the direction perpendicular to the surface of the coupled panels as well as into the direction perpendicular to the respective coupled edges in the plane parallel to the coupled panels. The female coupling part is provided at the female edge of the first pair of opposite edges. The male coupling part comprises a tongue. The female coupling part comprises a groove bordered by an upper lip and a lower lip, wherein the lower lip extends more distal than the upper lip. The lower lip comprises a locking element. The bottom of the tongue comprises a locking element, wherein in coupled condition of two such panels at their first pair of opposite edges, the locking element of the lower lip contacts the locking element of the tongue thereby establishing a locking of the coupled panels at their first pair of opposite edges in the direction perpendicular to the coupled edges and parallel with the surface of the coupled panels. This locking is preferably established with pretension. The panel can be coupled with its male edge onto the female edge of another such panel by means of an angling movement of the tongue of the panel into the groove of the another such panel. The lower lip comprises at its upper side a protrusion, wherein the highest point of the protrusion is provided proximal from the locking element and distal from the most distal point of the upper lip. The lower lip comprises at its upper surface a concave section, wherein the concave section is concave from more proximal than the most distal point of the upper lip to more distal to the most distal point of the upper lip. The concave section is provided proximal from the highest point of the protrusion.

The concave section is sufficiently large and configured such that the distal end of the tongue can dive into and subsequently emerge from the concave section when coupling the male edge of the panel by means of said angling movement.

Panels according to the eighth aspect of the invention have the benefit that the concave section provides an easy entry for the tongue into the groove when the panels are coupled by means of an angling movement of the tongue of a first such panel into the groove of a second such panel. This facilitates the installation of the panels.

Optionally, the panel of the eighth aspect of the invention is a panel according to any non-contradictory embodiment of any one of the first aspect, the second aspect, the third aspect, the fourth aspect, the fifth aspect, the sixth aspect or the seventh aspect of the invention.

Panels that are provided according to any embodiment of the seventh aspect and to any embodiment of the eighth aspect of the invention are very beneficial, as the features of the eighth aspect facilitate the coupling operation of panels according to the seventh aspect of the invention, as the concave section allows to insert the tongue in the groove in a way such that the risk during coupling of damage of the distal portion of the overlapping lip is minimized.

In preferred embodiments of the eighth aspect of the invention, the concave section comprises a distal flank having an angle with the bottom of the panel over at least 50% of the distal flank of at least 10°, and preferably of at least 15° and preferably of less than 25°. Such embodiments are preferred because during the angling movement, the tongue can slide along this distal flank. This way, the tongue is guided and lead towards the correct coupled position.

In preferred embodiments of the eighth aspect of the invention, the concave section comprises a distal flank having an angle with the bottom of the panel of at least 10°, and preferably of at least 15° and preferably less than 25°, wherein said distal flank extends from proximal from to distal of the most distal end of the upper lip. Such embodiments are preferred because during the angling movement, the tongue can slide along this distal flank. This way, the tongue is guided and lead towards the correct coupled position.

The ninth aspect of the invention relates to a panel comprising a substrate and a top layer. The layer comprises a decor layer and a wear layer. Preferably, the decor layer comprises a printed film. The panel is provided at a first pair of opposite edges with coupling parts, cooperating which each other, substantially in the form of male coupling parts and female coupling parts, for coupling two such panels at their first pair of opposite edges to each other in a floor, wall or ceiling covering. The male coupling part is provided at the male edge of the first pair of opposite edges. The coupling parts are provided with mechanical locking means which prevent the drifting apart of two coupled panels into the direction perpendicular to the surface of the coupled panels as well as into the direction perpendicular to the respective coupled edges in the plane parallel to the coupled panels. The female coupling part is provided at the female edge of the first pair of opposite edges. The male coupling part comprises a tongue. The female coupling part comprises a groove bordered by an upper lip and a lower lip, wherein the lower lip extends more distal than the upper lip. The lower lip comprises a locking element. The bottom of the tongue comprises a locking element. In coupled condition of two such panels at their first pair of opposite edges, the locking element of the lower lip contacts the locking element of the tongue thereby establishing a locking of the coupled panels at their first pair of opposite edges in the direction perpendicular to the coupled edges and parallel with the surface of the coupled panels; preferably this locking is established with pretension. The panel can be coupled with its male edge onto the female edge of another such panel by means of an angling movement of the tongue of the panel into the groove of the another such panel; and/or by a displacement with snap effect of the male edge parallel with the panel surface.

The locking element of the lower lip comprises a first contact surface, wherein the first contact surface is provided at the proximal side of the locking element and wherein the first contact surface has an included angle between 20° and 35°—and preferably between 23° and 30°
with the bottom of the panel.

The lower lip comprises an inclined surface, wherein the inclined surface is inclined from the bottom of the panel upwards in proximal direction of the panel, wherein the inclined surface comprises a second contact surface; wherein the second contact surface has an included angle between 20° and 35°—and preferably between 23° and 30°—with the bottom of the panel.

The bottom of the tongue comprises a third contact surface, wherein the third contact surface has an angle between 20° and 35°—and preferably between 23° and 30°—with the bottom of the panel.

The bottom of the tongue comprises a fourth contact surface, wherein the third contact surface has an angle between 20° and 35°—and preferably between 23° and 30°—with the bottom of the panel.

The first contact surface is provided for contacting in coupled condition of the female edge to the male edge of another such panel the third contact surface of the another such panel. The second contact surface is provided for contacting in coupled condition of the female edge to the male edge of another such panel the fourth contact surface of the another such panel.

Panels according to the ninth aspect of the invention allow that shrinkage or expansion of the panel due to changes in temperature or humidity can be accommodated. When the panel wants to shrink or expand, the inclined contact surface establishing the contact between the first contact surface and the third contact surface on the one hand; or between the second contact surface and the fourth contact surface on the other hand will exert a force counteracting the shrinkage or the expansion of the panel. These forces can involve an elastic bending of the lower lip. When these forces are higher than a certain level, the tongue will slide over the lower lip along the contact surfaces; which can involve an elastic bending of the lower lip. When a gap is provided between the distal end of the male edge and the edge of the female edge, and a gap is provided between the distal end of the lower lip and the edge of the male edge; such expansion can be taken up by a sliding movement of the coupled panels relative to each other.

Optionally, the panel of the ninth aspect of the invention is a panel according to any non-contradictory embodiment of any one of the first aspect, the second aspect, the third aspect, the fourth aspect, the fifth aspect, the sixth aspect, the seventh or the eighth aspect of the invention.

The ninth aspect of the invention can beneficially be combined with the seventh aspect of the invention. Combining the seventh aspect of the invention with the ninth aspect of the invention that the floatingly installed panels can expand and shrink when temperature and/or humidity changes, while a realistic grout imitation is maintained.

In preferred embodiments of the ninth aspect of the invention, in coupled condition of the male edge of the panel to the female edge of another such panel, a gap is provided in horizontal direction between the distal end of the male edge and the edge of the female edge of the another such panel, such that an expansion of the male edge towards the female edge of the another such panel can be accommodated. Such embodiments can preferably be combined with any embodiment of the eighth aspect of the invention.

In preferred embodiments of the ninth aspect of the invention, in coupled condition of the male edge of the panel to the female edge of another such panel, a gap is provided in horizontal direction between the distal end of the female edge of the another such panel and the edge of the male edge of the panel, such that an expansion of the female edge of another such panel towards the male edge of the panel can be accommodated. Such embodiments can preferably be combined with any embodiment of the eighth aspect of the invention.

In preferred embodiments of the ninth aspect of the invention, the third contact surface and the fourth contact surface are provided at opposite sides of the locking element which protrudes downwards from the tongue. Such embodiments can preferably be combined with any embodiment of the eighth aspect of the invention.

In preferred embodiments of any embodiment of the seventh aspect, the eighth aspect of the ninth aspect of the invention, the panel comprises a second pair of opposite edges, wherein the second pair of opposite edges is provided with coupling parts, cooperating which each other, substantially in the form of male coupling parts and female coupling parts, for coupling two such panels at their second pair of opposite edges to each other in a floor, wall or ceiling covering. The coupling parts of the second pair of opposite edges are provided with mechanical locking means which prevent the drifting apart of two coupled panels into the direction perpendicular to the surface of the coupled panels as well as into the direction perpendicular to the respective coupled edges in the plane parallel to the coupled panels, preferably wherein in coupled condition of two such panels at their second pair of opposite edges, a grout imitation is provided at these coupled edges. Preferably, the panel is rectangular, oblong or square.

The tenth aspect of the invention relates to a panel comprising a substrate and a top layer. The top layer comprises a decor layer and a wear layer. The decor layer preferably comprises a printed film. The panel comprises a second pair of opposite edges. The panel is provided at the second pair of opposite edges with second coupling parts, cooperating which each other, substantially in the form of second male coupling parts and second female coupling parts, for coupling two such panels at their second pair of opposite edges to each other in a floor, wall or ceiling covering. The second male coupling part is provided at the second male edge of the second pair of opposite edges. The second female coupling part is provided at the second female edge of the panels. The second coupling parts are provided with second mechanical locking means which prevent the drifting apart of two such panels coupled at their second pair of opposite edges into the direction perpendicular to the surface of the coupled panels as well as into the direction perpendicular to the respective coupled edges in the plane parallel to the coupled panels. The second male edge comprises a downward-directed upper hook-shaped part; wherein the downward-directed upper hook-shaped part comprises—and preferably consists of—a lip with a downward-directed locking element which forms the second male coupling part. The second female edge comprises an upward-directed lower hook-shaped part; wherein the upward-directed lower hook-shaped part comprises—and preferably consists of—a lip with an upward-directed locking element, which, proximally thereof, defines the second female coupling part in the form of a coupling recess. The second male coupling part and the second female coupling part are configured such that two such panels can be coupled to each other at their respective second pair of opposite edges by means of a movement substantially perpendicular to the surface of the two such panels being coupled. The surface of the second female edge is provided with a recess, preferably wherein said recess comprises at least a section parallel with the panel surface. The downward-directed upper hook-shaped part comprises a distal portion extending from the second male edge. The bottom surface of the distal portion is preferably provided in the substrate. In coupled condition of the second female edge to the second male edge of another such panel the distal portion extending from the second male edge at least partially overlaps the recess at the surface of the second female edge. Preferably, this overlap is provided with contact between the bottom of the distal portion and the recess—more preferably wherein this contact is provided with pretension —; or preferably this overlap is provided with a gap between the bottom of the distal portion and the bottom of the recess—more preferably wherein the gap between the bottom of the distal portion and the recess is at least 0.1 mm and preferably less than 0.3 mm and more preferably at maximum 0.2 mm.

Panels according to the tenth aspect of the invention provide a very realistic grout imitation by the recess. As the distal portion at least partially overlaps the recess in coupled condition of the panels, the grout imitation appears as a continuous grout, no junction line is visible as with other grout imitations already present in the panels before installing the panels. The panels according to the tenth aspect of the invention can be coupled easily for floating installation of the panels. When combined with appropriate executions of the coupling parts at the first pair of opposite edges of the panels—e.g. as described in any embodiment of the seventh, eighth or ninth aspect of the invention—the panels can be installed into a covering by means of the fold-down method. The combination of embodiments of the seventh aspect of the invention with embodiments of the tenth aspect of the invention is of particular interest, as a very nice grouting imitation is obtained in the covering installed with these panels around the full circumference of the panels.

Optionally, the panel of the tenth aspect of the invention is a panel according to any one non-contradictory embodiment of any one of the first aspect, the second aspect, the third aspect, the fourth aspect, the fifth aspect, the sixth aspect, the seventh aspect, the eighth aspect of the ninth aspect of the invention.

In preferred embodiments of the tenth aspect of the invention, the distal portion extending from the second male edge comprises a bevel. The bevel can be a rounded bevel, convex or concave. The bevel can comprise a rounded section, convex or concave. Such embodiments have the benefit that an even more realistic imitation of grout is provided to the installed panels.

In preferred embodiments of the tenth aspect of the invention, the second female edge comprises a bevel proximal from the recess. The bevel can be a rounded bevel, convex or concave. The bevel can comprise a rounded section, convex or concave. Such embodiments have the benefit that an even more realistic imitation of grout is provided to the installed panels.

In preferred embodiments of the tenth aspect of the invention, the recess at the surface of the second female edge is provided with a lacquer layer. Preferably when the distal portion extending from the second male edge comprises a bevel, this bevel is at least partially provided with a lacquer layer such that in coupled condition of two such panels at their second pair of opposite edges the lacquer layer of the recess visually continues into the lacquer layer of the bevel of the distal portion; and/or preferably when the second female edge comprises a bevel proximal from the recess, the lacquer layer of the recess extends at least partially onto said bevel. Such embodiments provide an even more realistic imitation of grout. The lacquer layer can be colored, to provide the grout imitation with a color at will, such that an even more realistic grout imitation is obtained.

In preferred embodiments of the tenth aspect of the invention wherein a lacquer layer is provided, the lacquer layer comprises sand and/or particles preferably having a particle size larger than 20 µm. Such embodiments provide a grout imitation which shows a certain roughness, as is provided by real cement grout.

In preferred embodiments of the tenth aspect of the invention wherein a lacquer layer is provided, the lacquer layer is less than 200 µm thick, more preferably less than 100 µm thick, even more preferably less than 60 µm thick.

In preferred embodiments of the tenth aspect of the invention, the recess at the surface of the second female edge has a width of at least 2 mm—and preferably of at least 2.3 mm —; and/or wherein the recess at the surface of the second female edge has in the coupled panels a visible width of at least 1.5 mm, more preferably of at least 2 mm. Such embodiments provide an even more realistic imitation of grout.

In preferred embodiments of the tenth aspect of the invention, the distal edge of the distal portion extending from the second male edge extends in horizontal direction over at least a distance 0.25 mm and preferably of at least 0.7 mm from the second male edge. Such embodiments provide an even more realistic imitation of grout.

In preferred embodiments of the tenth aspect of the invention, the recess at the surface of the second female edge extends into the substrate. Such embodiments allow to provide an improved panel. The color of the grout imitation can be provided by the substrate, or by a lacquer applied onto it. The depth of the recess can be selected such that it imitates the grout of a covering with ceramic tiles.

In preferred embodiments of the tenth aspect of the invention, the substrate comprises a first layer and a second layer, wherein the second layer is provided closer to the surface of the panel than the first layer, wherein the composition of the first layer differs from the composition of the second layer. More preferably, the second layer is made out of a more supple material than the first layer.

Preferably the first layer and/or the second layer comprise thermoplastic material, e.g. polyvinyl chloride, and fillers, optionally the fillers comprise inorganic fillers, e.g. chalk or lime.

In preferred embodiments of the tenth aspect of the invention, the recess at the surface of the second female edge extends into the second layer, but more preferably not into the first layer. Such embodiments allow to provide a more realistic grout imitation, e.g. by adapting the color of the second layer when producing this second layer.

In preferred embodiments of the tenth aspect of the invention, the recess at the surface of the second female edge extends into the substrate, and the proximal border of the recess at the surface of the second female edge extends substantially perpendicularly through the decor layer. More preferably, the proximal border of the recess at the surface of the second female edge extends substantially perpendicularly through the panel over a distance less than the thickness of the decor layer plus 0.15 mm; and preferably over a distance less than 0.25 mm. This way, the cut through the decor is virtually not visible, even when tool wear or production tolerances occur; and a nice grout imitation is obtained in coverings comprising such panels.

In preferred embodiments of the tenth aspect of the invention, the bottom surface of the distal portion extending from the second male edge is provided in the substrate. It is a benefit of such embodiments that the cut through the decor layer is virtually not visible in a covering with such panels, as the exposed side edge is minimal and to a large extent hidden from view.

Preferably, the distal border of the distal portion extending from the second male edge extends substantially perpendicularly through the decor layer. More preferably, the distal border of the distal portion extending from the second male edge extends substantially perpendicularly through the panel over a distance of less than the thickness of the decor layer plus 0.15 mm; and more preferably over a distance less than 0.25 mm. This way, the cut through the decor is virtually not visible, even when tool wear or production tolerances occur; and a nice grout imitation is obtained in coverings comprising such panels.

In preferred embodiments of the tenth aspect of the invention, the depth of the recess at the surface of the second female edge relative to the surface of the panel is at least 0.4 mm, more preferably at least 0.5 mm. Such embodiments provide an even more realistic grout imitation.

In preferred embodiments of the tenth aspect of the invention, the depth of the recess at the surface of the second female edge relative to the surface of the panels is less than 2 mm, more preferably less than 1.5 mm. Such embodiments provide an even more realistic grout imitation.

In preferred embodiments of the tenth aspect of the invention, the second locking means comprises an undercut at the second female edge. The undercut is provided for interacting with the downward-directed locking element—preferably with a locking element at the distal end of the downward-directed locking element—of another such panel, for establishing a locking perpendicularly to the surface of the panels at the distal end of the downward-directed locking element of the another such panel.

In preferred embodiments of the tenth aspect of the invention, the second pair of opposite edges is configured such that no locking in the direction perpendicular to the surface of the coupled panels is established at the second pair of opposite edges between the distal end of the second male edge and the proximal end of the second female edge.

In preferred embodiments of the tenth aspect of the invention, the second pair of opposite edges is configured such that no locking in the direction perpendicular to the surface of the panels coupled at their second pair of opposite edges is provided at the proximal end of the upward-directed locking element nor at the proximal end of the downward-directed locking element.

In preferred embodiments of the tenth aspect of the invention, the proximal end of the downward-directed locking element comprises a first inclined contact surface. The proximal end of the upward-directed locking element comprises a second inclined contact surface. In coupled condition of two such panels at their second pair of opposite edges, the first inclined contact surface of the first such panel contacts or is close to the second inclined contact surface of the third such panel; thereby establishing a locking of the coupled panels in the direction perpendicular to the surface of the coupled panels. Preferably, this locking is established with pretension.

In preferred embodiments of the tenth aspect of the invention, the second pair of opposite edges is configured such that in coupled condition of two such panels at their second pair of opposite edges, a locking in the direction perpendicular to the surface of the coupled panels is provided at the distal end of the upward-directed locking element. This locking can be provided with or without contact.

More preferably, the distal end of the upward-directed locking element comprises an undercut or a bulge, wherein the bottom surface of the undercut or of the bulge is provided for establishing a locking in the direction perpendicular to the surface of the coupled panels.

In preferred embodiments of the tenth aspect of the invention, the upward-directed locking element contacts the proximal end of the panel edge with which it is coupled at the distal end of the upward-directed locking element; and/or the distal end of the upward-directed locking element comprises an undercut and the upward-directed locking element contacts the proximal end of the edge of the panel with which it is coupled at the undercut of the upward-directed locking element; thereby establishing a locking in the direction perpendicular to the surface of the coupled panels.

In preferred embodiments of the tenth aspect of the invention, the proximal end of the second male edge comprises a corresponding hook, wherein the corresponding hook is provided for interacting with the upward-directed locking element of the coupled panel for establishing a locking in the direction perpendicular to the surface of the coupled panels.

In preferred embodiments of the tenth aspect of the invention, the coupling parts of the first pair of opposite edges and of the second coupling parts of the second pair of opposite edges are configured such that a plurality of such panels can be coupled into a covering using the fold-down method of installation.

In a preferred embodiment of any one of the first, the second, the third, the fourth, the fifth, the sixth, the seventh, the eighth, the ninth or the tenth aspect of the invention, the decor layer is a printed decor layer, preferably a polymer film—e.g. a polyvinyl chloride film—comprising a printed image. More preferably the printed decor layer comprises or consists of a printed polyvinyl chloride film less than 0.1 mm thick. The printed decor layer can e.g. be 0.055 mm thick. Such embodiments allow to provide a natural stone or tile imitation.

In a preferred embodiment of any one of the first, the second, the third, the fourth, the fifth, the sixth, the seventh, the eighth, the ninth or the tenth aspect of the invention, the wear layer comprises—and preferably consists of—a transparent polymer film, preferably a transparent polyvinylchloride film. Such embodiments provide good abrasion resistance properties to the panels.

In a preferred embodiment of any one of the first, the second, the third, the fourth, the fifth, the sixth, the seventh, the eighth, the ninth or the tenth aspect of the invention, the wear layer comprises a transparent lacquer layer, e.g. an acrylic lacquer layer or a polyurethane acrylic lacquer layer, more preferably a UV-cured acrylic lacquer layer or a UV-cured polyurethane acrylic lacquer layer. Such embodiments provide good abrasion resistance properties to the panels.

In a preferred embodiment of any one of the first, the second, the third, the fourth, the fifth, the sixth, the seventh, the eighth, the ninth or the tenth aspect of the invention, the panel comprises an embossed surface. Such embodiments allow to provide an even more realistic natural stone or tile imitation.

In a preferred embodiment of any one of the first, the second, the third, the fourth, the fifth, the sixth, the seventh, the eighth, the ninth or the tenth aspect of the invention, the substrate comprises—and preferably consists of—at least one polymer substrate layer comprising fillers. More preferably, the polymer substrate layer is a thermoplastic polymer layer, more preferably a polyvinyl chloride polymer layer.

When fillers are used, preferably the fillers comprise or consist of mineral fillers, e.g. selected from one or more than one of chalk, lime, or stone; or the fillers comprise wood or cellulose particles or fibers.

In a preferred embodiment of any one of the first, the second, the third, the fourth, the fifth, the sixth, the seventh, the eighth, the ninth or the tenth aspect of the invention, the substrate comprises a mineral binder, optionally selected from gypsum, magnesium oxide, Sorel cement, or Portland cement. The substrate comprises fillers optionally selected from wood dust, wood fiber, or wood particles. In preferred such embodiments, the decor layer comprises a printed paper sheet, more preferably wherein the printed paper sheet is impregnated with melamine resin. In preferred embodiments, the wear layer comprises one or more paper layers impregnated with a polymer, more preferably wherein the paper layers are impregnated with melamine resin.

In a preferred embodiment of any one of the first, the second, the third, the fourth, the fifth, the sixth, the seventh, the eighth, the ninth or the tenth aspect of the invention, the substrate comprises a medium density fiberboard (MDF) panel or a high density fiberboard (HDF) panel. Optionally, one or more than one or all panel edges comprise bevels, preferably the bevels are pressed bevels. In preferred such embodiments, the decor layer comprises a printed paper sheet, more preferably wherein the printed paper sheet is impregnated with melamine resin. In preferred embodiments, the wear layer comprises one or more paper layers impregnated with a polymer, more preferably wherein the paper layers are impregnated with melamine resin.

Embodiments wherein the bevels are pressed bevels are preferred, as the decor layer follows the shape of the bevel edge, which is combination with the grout imitation as in the different aspects of the invention, contributes to a very realistic grouting imitation.

In a preferred embodiment of any one of the first, the second, the third, the fourth, the fifth, the sixth, the seventh, the eighth, the ninth or the tenth aspect of the invention, the back of the panel comprises a base layer, more preferably a cushioning base layer. Such embodiments allow to provide panels with improved acoustics. E.g. less noise is generated when walking on such floor panels.

In a preferred embodiment of any one of the first, the second, the third, the fourth, the fifth, the sixth, the seventh, the eighth, the ninth or the tenth aspect of the invention, the panel thickness is between 3.2 and 7 mm; more preferably the panel thickness is less than 4.5 mm.

In a preferred embodiment of any one of the first, the second, the third, the fourth, the fifth, the sixth, the seventh, the eighth, the ninth or the tenth aspect of the invention, the decor layer provides a stone or a tile imitation. Such embodiments allow to provide panels that are a realistic imitation of a stone or tile.

In a preferred embodiment of any one of the first, the second, the third, the fourth, the fifth, the sixth, the seventh, the eighth, the ninth or the tenth aspect of the invention, the panel is rectangular, whether oblong or square. Preferably, the shortest panel edge is at least 300 mm long.

In a preferred embodiment of any one of the first, the second, the third, the fourth, the fifth, the sixth, the seventh, the eighth, the ninth or the tenth aspect of the invention, the panel is square, and the length of the sides of the panels is more than 300 mm, more preferably more than 400 mm and even more preferably more than 500 mm. Such embodiments allow to provide large square panels that imitate natural stone or a tile; and optionally having mechanical locking means for floating installation of the panels, e.g. as floor covering, while showing a realistic imitation of grouting.

The eleventh aspect of the invention is a package of panels, comprising a plurality of panels as in any embodiment of any one of the first, second, third, fourth, fifth, sixth, seventh, eighth, ninth or tenth aspect of the invention. The panels are stacked onto each other; and the package comprises a casing around the stacked panels.

A further aspect of the invention is a covering—e.g. a floor covering, a wall covering or a ceiling covering—comprising panels as in any embodiment of any aspect of the invention.

MODE(S) FOR CARRYING OUT THE INVENTION

Figure 1:
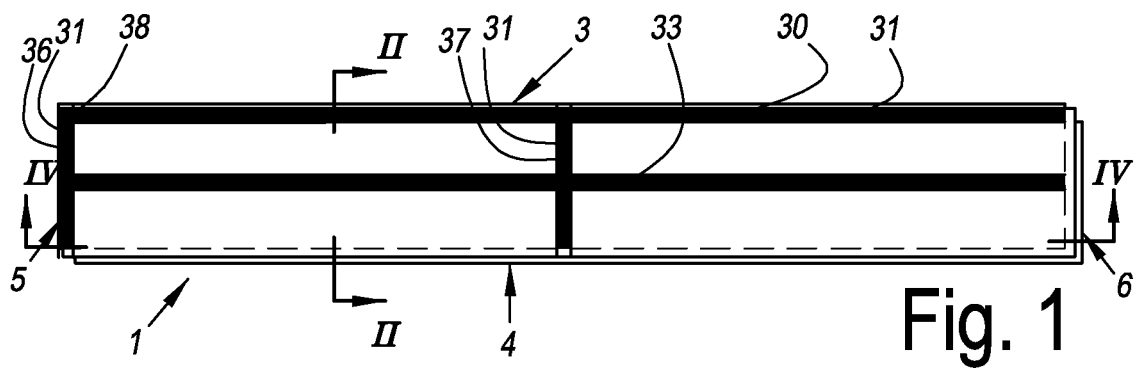
FIG. 1 shows an example of a panel according to the first aspect of the invention.

FIGS. 1-9 illustrate the first aspect of the invention. FIG. 1 shows an example of a panel according to the first aspect of the invention. The panel 1 is rectangular and oblong. The panel 1 comprises a first pair of opposite edges 3, 4 and a second pair of opposite edges 5, 6. The male edge 3 comprises a recess 30. The second male edge 5 comprises a second recess 36. A central recess 33 is provided parallel with and in the middle of the first pair of opposite edges 3, 4. A second central recess is provided parallel with and in the middle of the second pair of opposite edges 5, 6. The recess 30, the second recess 36, the central recess 33 and the second central recess 37 are provided with a lacquer layer 31 that in installed condition of a plurality of such panels will imitate a grouting. The recess 30, the second recess 36, the central 33 and the second central recess 37 each have in this example the same width; and their lacquer layers 31 have the same composition.

The panel edge where the recess 30 is provided joins the panel edge where the second recess 33 is provided in a joint 38. In the joint, the lacquer layer 31 of the recess 30 continues without interruption into the lacquer layer 31 of the second recess 36.

Figure 2:
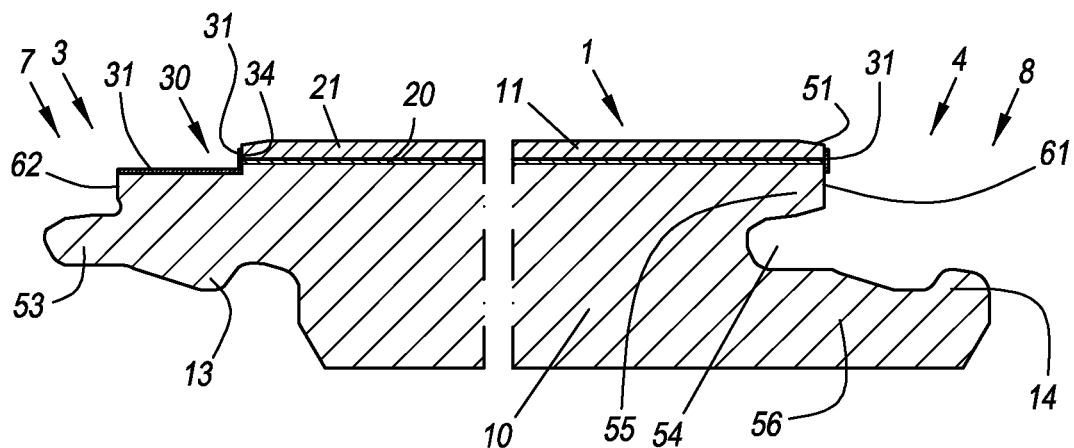
FIG. 2 shows a cross section according to II-II of the panel of FIG. 1.
Figure 3:
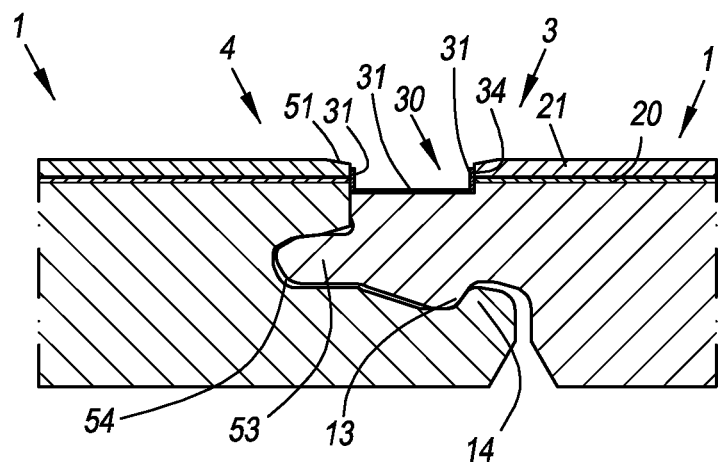
FIG. 3 shows two panels as in FIG. 1 coupled at their first pair of opposite edges.

FIG. 2 shows a cross section according to II-II of the panel of FIG. 1. FIG. 3 shows two panels as in FIG. 1 coupled at their first pair of opposite edges. The panel 1 comprises a substrate 10 and a top layer 11. The top layer 11 comprises a decor layer 20 and a wear layer 21. The panel is provided at a first pair of opposite edges 3, 4 with coupling parts 7, 8, cooperating which each other, substantially in the form of male coupling parts 7 and female coupling parts 8, for coupling two such panels at their first pair of opposite edges 3, 4 to each other in a floor, wall or ceiling covering. The male coupling part 7 is provided at the male edge 3 of the first pair of opposite edges. The female coupling part 8 is provided at the female edge 4 of the first pair of opposite edges.

The male coupling part 7 provided at the male edge 3 comprises a tongue 53 extending in the direction parallel with the panel surface. The female edge 4 comprises a groove 54 providing the female coupling part 8. The groove is bordered by an upper lip 55 and a lower lip 56. The lower lip extends further than the upper lip. The lower lip 56 comprises a locking element 13. The bottom of the tongue 53 comprises a locking element 14. In coupled condition of two such panels 1 at their first pair of opposite edges 3,4, the locking element of the lower lip 13 contacts the locking element of the tongue 14 thereby establishing a locking of the coupled panels at their first pair of opposite edges in the direction perpendicular to the coupled edges and parallel with the surface of the coupled panels. It is preferred when this locking is established with pretension. The locking element 13 of the lower lip 13 is provided distally from the distal end of the upper lip 55.

The coupling parts of the first pair of opposite edges 3, 4 are configured such that a first such panel can be coupled with its male edge into the female edge of a second such panel by means of an angling movement and by means of a substantially horizontal sliding movement with snap action.

The female edge 4 comprises a first closing plane 61, and the male edge 3 comprises a second closing plane 62. In coupled condition of two such panels at their first pair of opposite edges the first closing plane of the first such panel contacts the second closing plane of the second such panel thereby providing a contact surface between the two coupled such panels, wherein the contact surface is substantially perpendicular to the surface of the coupled panels.

The surface of the male edge 3 is provided with a recess 30. The recess 30 extends deeper into the panel than the location of the decor layer 20. The recess is provided with a lacquer layer 31; to imitate a grouting in installed condition of the panels. In the embodiment shown, part of the side edge 34 of the recess 30 is provided with the lacquer layer 30. This hides the decor layer 20 from view at the male edge.

In the example shown, the recess 30 extends in the direction parallel with the surface of the panel and perpendicular to the first pair of opposite edges 3, 4 in proximal direction to at least vertically above the locking element 14 of the lower lip 56 that will contact the locking element 13 of the tongue 53 in coupled condition of two such panels at their first pair of opposite edges 3, 4.

The female edge 4 of the first pair of opposite edges 3, 4 is over a section provided with a lacquer layer 31. The lacquer layer on this female edge hides the decor layer 20 from view at the female edge 4. This way, the lacquer layers at the side edge 34 of the recess and at the female edge 4 contribute to a more realistic grout imitation of coupled panels. It is preferred that each of the lacquer layers mentioned have the same composition.

Optionally, one or all of mentioned lacquer layers 31 comprise sand and/or particles preferably having a particle size larger than 20 µm.

A configuration shown in FIG. 2 for the first pair of opposite edges of the panel 1 can also be provided at the second pair of opposite edges.

Figure 4:
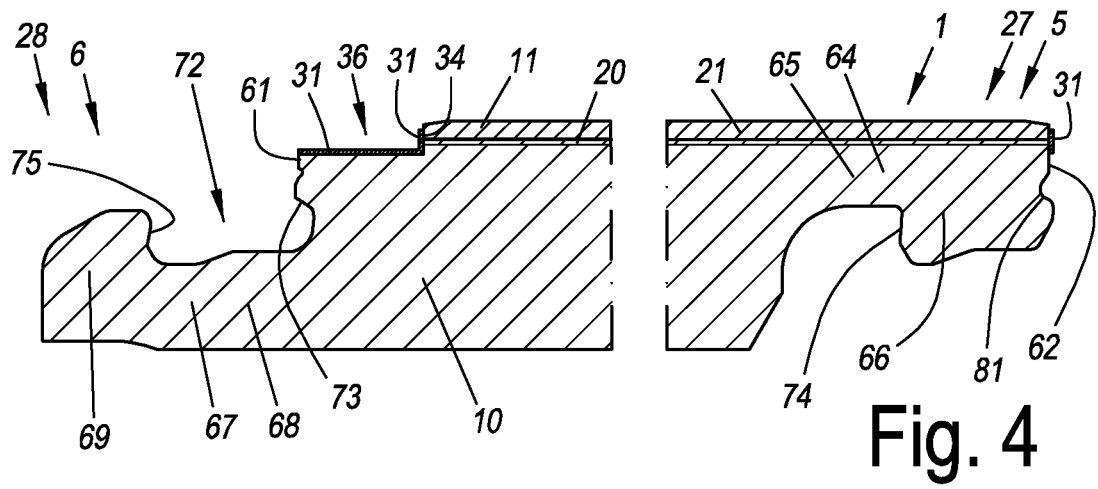
FIG. 4 shows a cross section according to IV-IV of the panel of FIG. 1.
Figure 5:
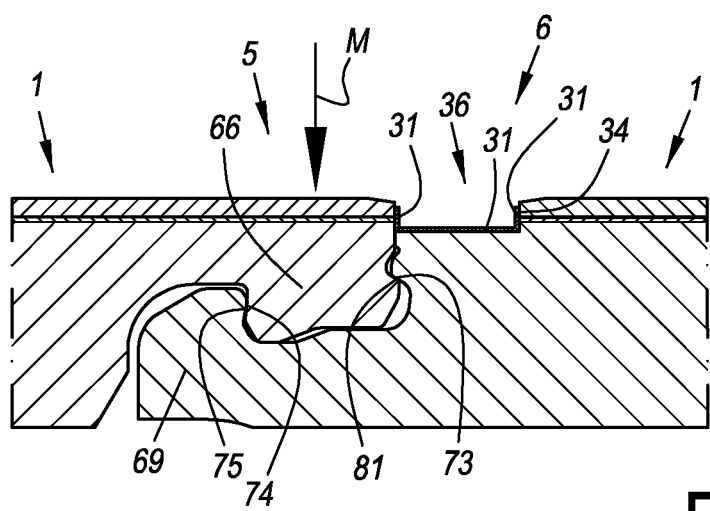
FIG. 5 shows two panels as in FIG. 1 coupled at their second pair of opposite edges.

FIG. 4 shows a cross section according to Iv-Iv of the panel of FIG. 1. FIG. 5 shows two panels as in FIG. 1 coupled at their second pair of opposite edges 5, 6. The panel 1 comprises a second pair of opposite edges 5, 6. The panel is provided at the second pair of opposite edges with second coupling parts 27, 28, cooperating which each other, substantially in the form of second male coupling parts 27 and second female coupling parts 28, for coupling two such panels at their second pair of opposite edges 5, 6 to each other in a floor, wall or ceiling covering. The second male coupling part 27 is provided at the second male edge 5 of second pair of opposite edges. The second female coupling part 28 is provided at the second female edge 6 of the panel. The second coupling parts are provided with second mechanical locking means which prevent the drifting apart of two such panels coupled at their second pair of opposite edges into the direction perpendicular to the surface of the coupled panels as well as into the direction perpendicular to the respective coupled edges in the plane parallel to the coupled panels.

The second male edge 5 comprises a second downward-directed upper hook-shaped part 64. The second downward-directed upper hook-shaped part 64 comprises a lip 65 with a second downward-directed locking element 66 which forms the second male coupling part 27.

The second female edge 6 comprises a second upward-directed lower hook-shaped part 67. The second upward-directed lower hook-shaped part 67 comprises a lip 68 with a second upward-directed locking element 69, which, proximally thereof, defines the second female coupling part 28 in the form of a second coupling recess 72. The second male coupling part and the second female coupling part are configured such that two such panels can be coupled to each other at their respective second pair of opposite edges by means of a movement M substantially perpendicular to the surface of the panels to be coupled in this way.

The edges of the second pair of opposite edges 5,6 are provided with mechanical locking means such that in coupled condition of a first such panel to another such panel at their second pair of opposite edges, a locking perpendicularly to the surface of the panels is provided at the distal end of the second downward-directed locking element 66 of the panel. To this end, the locking means comprise a second undercut 73 at the second female edge 6. The second undercut 73 is provided for interacting with a locking element 81 at the distal end of the second downward-directed locking element 66 of the coupled panel, thereby establishing a locking perpendicularly to the surface of the panels at the distal end of the second downward-directed locking element of the panel.

The proximal end of the second downward-directed locking element 66 comprises a third inclined contact surface 74. The proximal end of the second upward-directed locking element 69 comprises a fourth inclined contact surface 75. In coupled condition of two such panels coupled at their second pair of opposite edges, the third inclined contact surface 74 of the first such panel contacts the fourth inclined contact surface 75 of the third such panel; thereby establishing a locking of the coupled panels in the direction perpendicular to the surface of the coupled panels. Preferably, this locking is established with pretension.

The second pair of opposite edges are configured such that in coupled condition of two such panels at their second pair of opposite edges, no locking in the direction perpendicular to the surface of the coupled panels is provided at the distal end of the upward-directed locking element 69.

The second female edge 6 comprises a first closing plane 61, and the second male edge 5 comprises a second closing plane 62. In coupled condition of two such panels at their second pair of opposite edges the first closing plane of the first such panel contacts the second closing plane of the second such panel thereby providing a contact surface between the two coupled such panels, wherein the contact surface is substantially perpendicular to the surface of the coupled panels.

The surface of the second female edge 6 is provided with a second recess 36. The second recess 36 extends deeper into the panel than the location of the decor layer 20. The second recess 36 is provided with a lacquer layer 31; to imitate a grouting in installed condition of the panels. In the embodiment shown, part of the side edge 34 of the second recess 36 is provided with the lacquer layer 30. This hides the decor layer 20 from view at the female edge 6.

The second male edge 5 of the second pair of opposite edges 5, 6 is over a section provided with a lacquer layer 31. The lacquer layer on this male edge hides the decor layer 20 from view at the male edge 5. This way, the lacquer layers at the side edge 34 of the second recess and at the second male edge 6 contribute to a more realistic grout imitation of coupled panels. It is preferred that each of the lacquer layers mentioned have the same composition. This also applies to the lacquer layers applied at the first pair of opposite edges as to the lacquer layers applied at the second pair of opposite edges.

Optionally, one or all of mentioned lacquer layers 31 comprise sand and/or particles preferably having a particle size larger than 20 µm.

A configuration shown in FIG. 4 for the second pair of opposite edges of the panel 1 can also be provided at the first pair of opposite edges.

Figure 6:
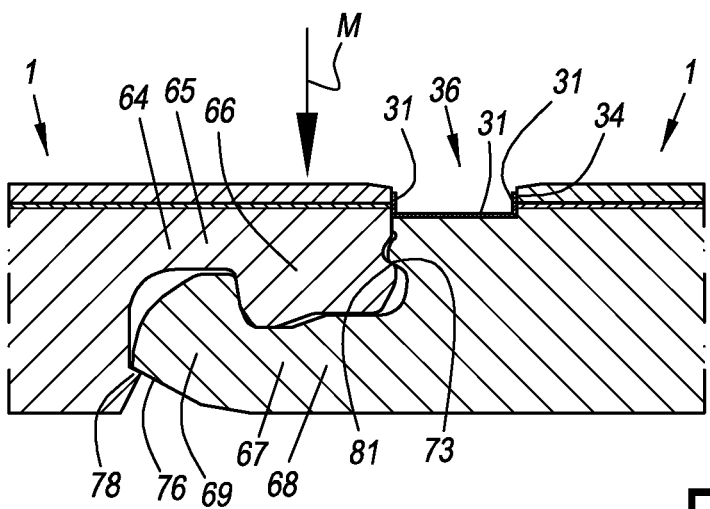
FIG. 6 shows—in the same view as FIG. 5—another embodiment of the first aspect of the invention.

FIG. 6 shows—in the same view as FIG. 5—another embodiment of the first aspect of the invention. The reference numerals in FIG. 6 have the same meaning as in FIG. 5. The difference between the panels of FIGS. 5 and 6 relates to the locking means that provide in coupled condition at the second pair of opposite edges 5, 6 for the locking in the direction perpendicular to the panel surface.

In the embodiment shown in FIG. 6, the edges of the second pair of panel edges are configured such that no locking in the direction perpendicular to the surface of the panels between panels coupled at their second pair of opposite edges 5, 6 is provided at the proximal end of the second upward-directed locking element 69 nor at the proximal end of the second downward-directed locking element 66.

In the same way as in the embodiment of FIG. 5, the locking means comprise a second undercut 73 at the second female edge 6. The second undercut 73 is provided for interacting with a locking element 81 at the distal end of the second downward-directed locking element 66 of the coupled panel, thereby establishing a locking perpendicularly to the surface of the panels at the distal end of the second downward-directed locking element of the panel.

In addition, the second pair of opposite edges 5, 6 of the embodiment shown in FIG. 6 are configured such that in coupled condition of two such panels at their second pair of opposite edges, a locking in the direction perpendicular to the surface of the coupled panels is provided at the distal end of the second upward-directed locking element 69. Embodiments can be provided wherein this locking is provided with contact, and embodiments can be provided wherein this locking is provided without contact. In the embodiment shown in FIG. 6, the distal end of the second upward-directed locking element 69 comprises an undercut 76. The bottom surface of this undercut 76 is provided for establishing a locking in the direction perpendicular to the surface of the coupled panels. To this end, the proximal end of the second male edge 5 comprises a second corresponding hook 78, provided for interacting with the undercut 76 at the distal end of the second upward-directed locking element 69 of the coupled panel for establishing a locking in the direction perpendicular to the surface of the coupled panels.

A configuration shown in FIG. 6 for the second pair of opposite edges of the panel 1 can also be provided at the first pair of opposite edges.

Figure 7:
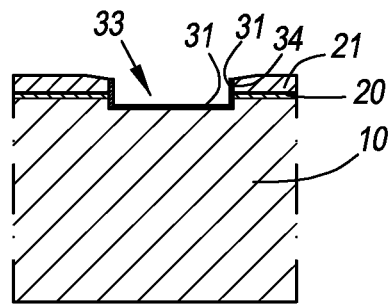
FIG. 7 shows an embodiment of the first aspect of the invention wherein a central recess is provided.

FIG. 7 shows an embodiment of a panel according to the first aspect of the invention wherein a central recess 33 is provided. The reference numerals have the same meaning as in other figures. This central recess 33 can be provided in the configuration as shown in the panel of FIG. 1. The central recess 33 extends deeper into the panel 1 than the location of the decor layer 20. The central recess 33 is provided with a lacquer layer 31. Optionally, this lacquer layer comprises sand and/or particles preferably having a particle size larger than 20 μm. As illustrated in FIG. 7, part of the side edges 34 of the central recess is provided with the lacquer layer 31, this way, the decor layer is not visible at the side edges 34 of the central recess 33.

Figure 8:
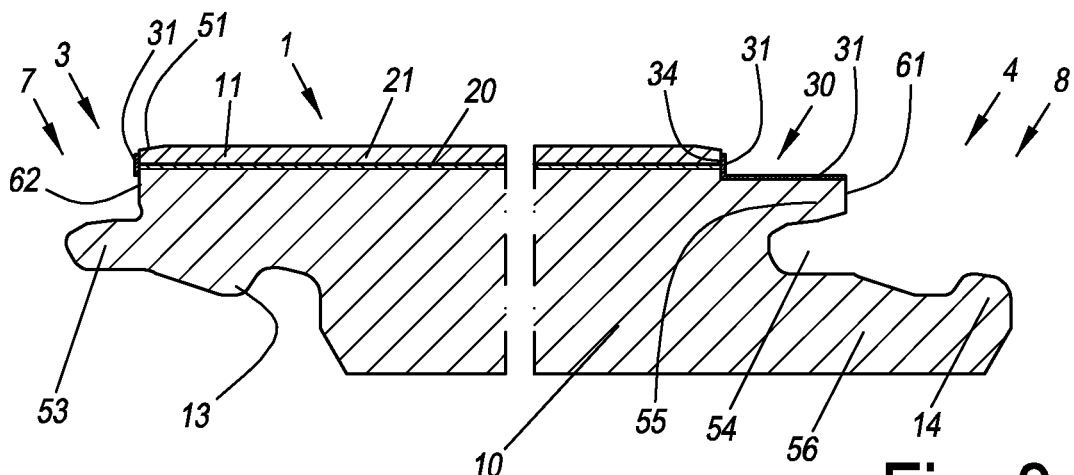
FIG. 8 shows, in the same view as FIG. 2, another embodiment of the first aspect of the invention.

FIG. 8 shows, in the same view as FIG. 2, another embodiment of the first aspect of the invention. The same reference numerals have the same meaning. The difference of the embodiment shown in FIG. 8 compared to the embodiment shown in FIG. 2 is that the recess 30 is provided at the female edge 4 instead of at the male edge 3. The recess extends in the direction parallel with the surface of the panel and perpendicular to the first pair of opposite edges 3, 4 in proximal direction to beyond the proximal end of the groove 54. The male edge 3 of the first pair of opposite edges 3, 4 is over a section provided with a lacquer layer 31. The lacquer layer on this male edge hides the decor layer 20 from view at the male edge 3, contributing to a more realistic grouting imitation in coupled condition of the panels at their first pair of opposite edges 3, 4. The configuration of FIG. 8 is described for the first pair of opposite edges, but can also be provided at the second pair of opposite edges of a panel.

Figure 9:
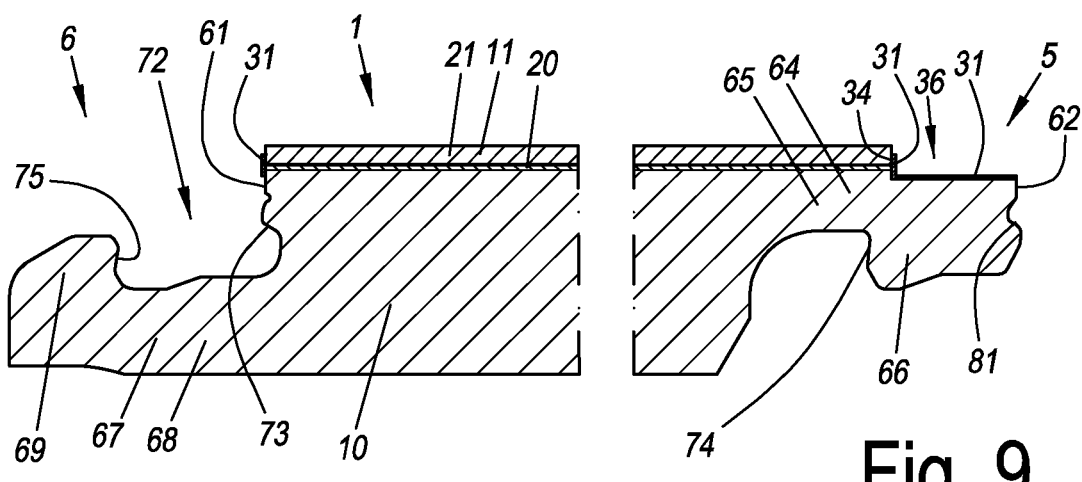
FIG. 9 shows, in the same view as FIG. 4, another embodiment of the first aspect of the invention.

FIG. 9 shows, in the same view as FIG. 4, another embodiment of the first aspect of the invention. The panel configuration at the second pair of opposite edges 5, 6 is similar to the configuration of FIG. 4. The same reference numerals have the same meaning. The difference between the embodiment of FIG. 9 and the embodiment of FIG. 4 is that the second recess 36 is in FIG. 9 provided at the second male edge 5 instead of at the second female edge 6. The second female edge 6 of the second pair of opposite edges 5, 6 is over a section provided with a lacquer layer 31. The lacquer layer on this female edge hides the decor layer 20 from view at the female edge 6.

The configuration of FIG. 9 is described for the first pair of opposite edges, but can also be provided at the second pair of opposite edges of a panel.

Figure 10:
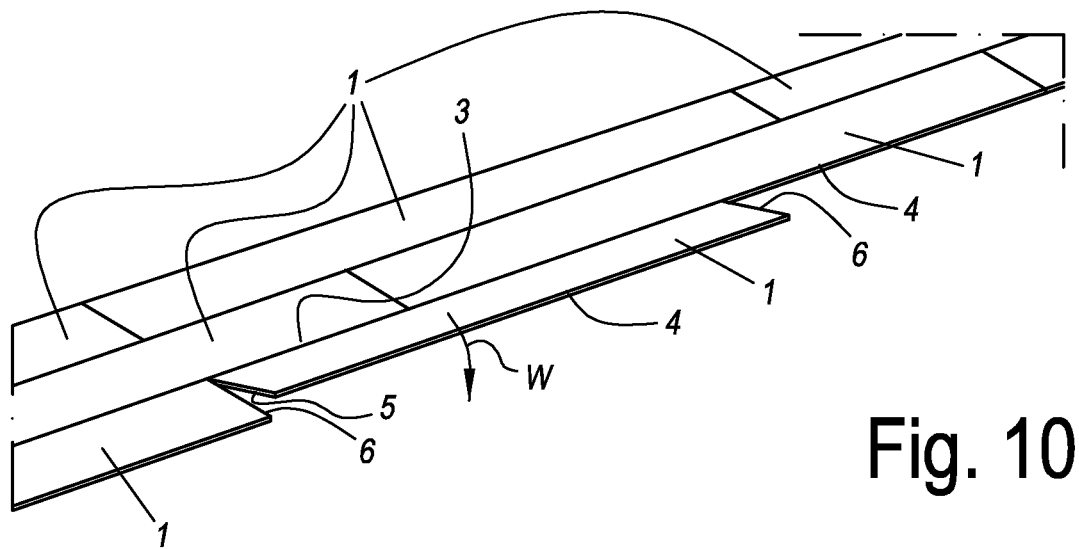
FIG. 10 illustrates the fold-own method of installation of panels.

FIG. 10 illustrates the fold-down method of installation of panels, e.g. panels according to the first, third, fifth or sixth aspect of the invention. The panels 1 comprise a first pair of opposite edges 3, 4 and a second pair of opposite edges 5, 6. The edges are configures such that the male edge 3 of first pair of opposite edge can be coupled by means of an angling movement W into the female edge 4 of an already installed such panel. As an example, the first pair of opposite edges 3, 4 of FIG. 2 allow such coupling by means of an angling movement W.

In the same angling movement W, the male edge 5 of the second pair of opposite edges can be coupled via a downward movement to the female edge 6 of the second pair of opposite edges of an already installed panel.

Figure 11:
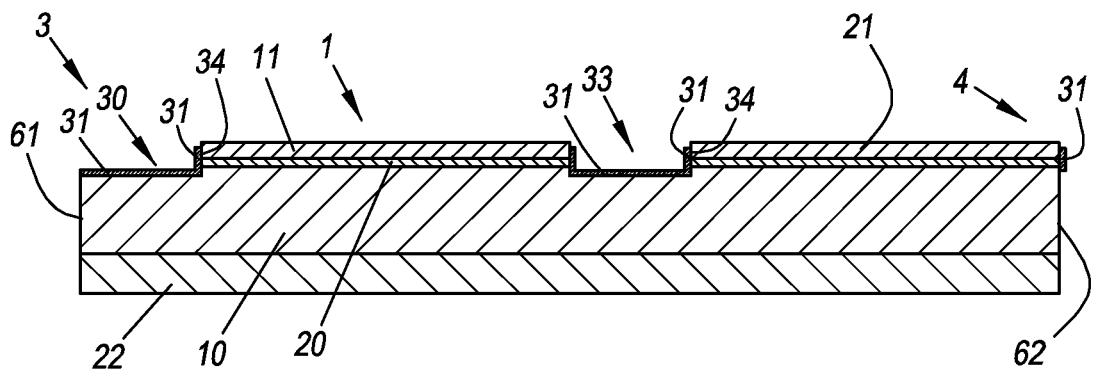
FIG. 11 shows an example of a panel according to the second aspect of the invention.
Figure 12:
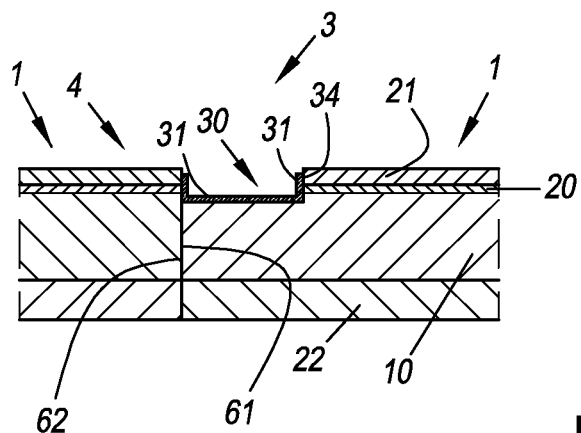
FIG. 12 shows two panels as in FIG. 11, in installed condition.

FIGS. 11 and 12 illustrate panels 1 according to the second aspect of the invention. Unless otherwise provided, the reference numerals have the same meaning as in FIGS. 1-9. The difference of the panel 1 shown in FIG. 11—and in installed condition in FIG. 12—compared to the panels illustrated in FIGS. 1-9 is that the panel does not comprise coupling parts. The panel comprises a first pair of opposite edges 3, 4. The first pair of opposite edges comprises a first edge 3 and a second edge 4. The first edge 3 is provided for facing—and preferably for contacting—the second edge 4 of a second such panel 1 when installing a plurality of such panels in a covering. The panel can be glued onto a surface to form a covering of this surface. The second edge 4 comprises a first closing plane 61, and the first edge 3 comprises a second closing plane 62.

The panel 1 of FIG. 11 comprises a central recess 33, provided parallel with the recess and parallel with the first pair of opposite edges 3, 4. In the example shown, the central recess 33 is provided at the middle between the first pair of opposite edges 3, 4. The central recess 33 extends deeper into the panel than the location of the decor layer. The central recess 33 extends the same depth as the recess 30. The central recess is provided with a lacquer layer 31, optionally comprising sand and/or particles preferably having a particle size larger than 20 μm. Part of the side edges 34 of the recess 30 and of the central recess 33 are provided with the lacquer layer 31, this way, the decor layer 20 is not visible at these side edges.

A section of the second edge 4 is provided with a lacquer layer 31.

FIG. 12 shows two panels as shown in FIG. 11 in installed condition at their first pair of opposite edges 3, 4. The panels can be installed by gluing them to the subfloor. The first closing plane 61 of the second edge 1 contacts the second closing plane 62 of the other such panel; thereby providing a contact surface between the two coupled panels. The contact surface is substantially perpendicular to the surface of the installed panels.

After installation of the panels, the lacquer layers 31 in the recesses, at the side edges of the recesses and a the section of the second edge 4 provide a realistic imitation of grouting, while no grouting is required after installation of the panels.

Figure 20:
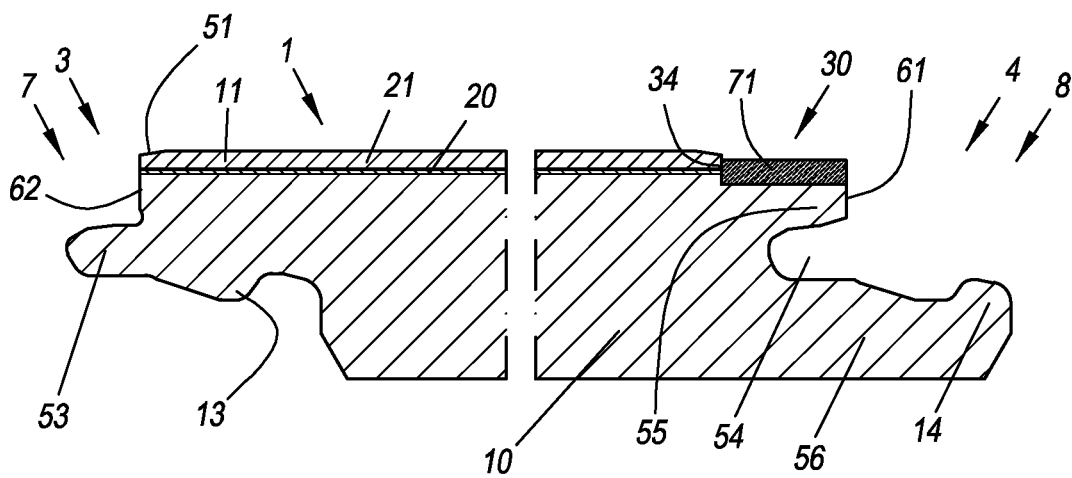
FIG. 20 shows, in the same view as FIG. 14, another embodiment of the first aspect of the invention.
Figure 21:
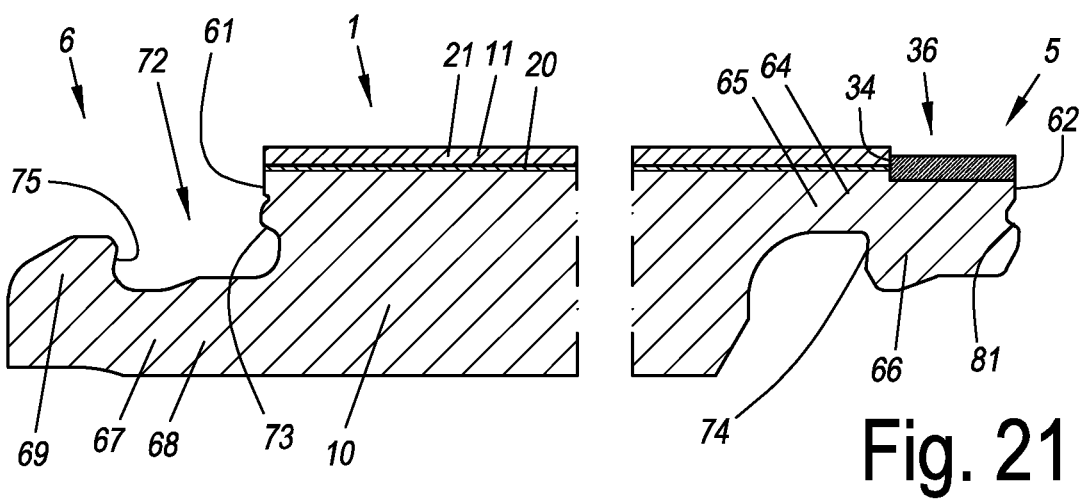
FIG. 21 shows, in the same view as FIG. 16, another embodiment of the first aspect of the invention.
Figure 22:
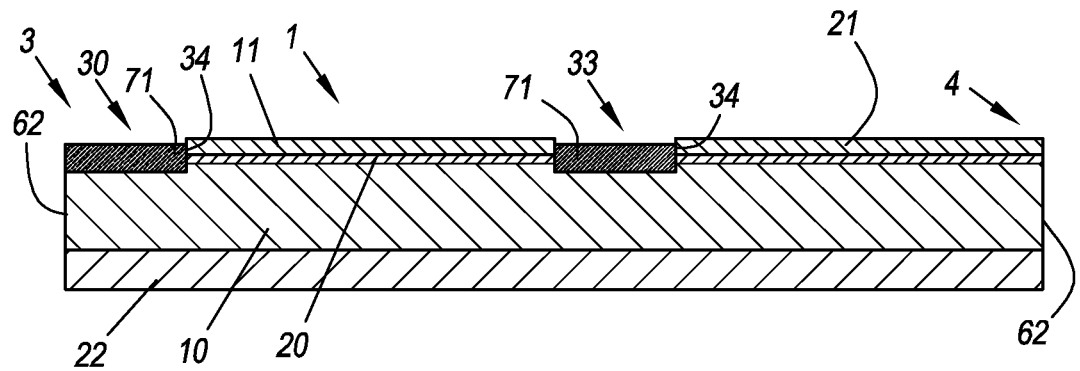
FIG. 22 shows a panel according to an embodiment of the fourth aspect of the invention.
Figure 23:
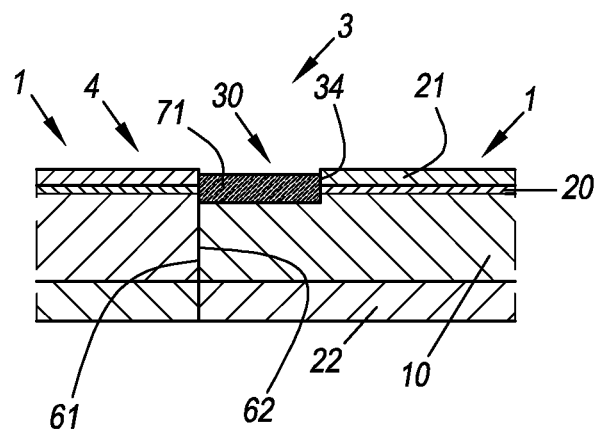
FIG. 23 shows two panels as in FIG. 22, in installed condition.

FIGS. 13-21 illustrate the third aspect of the invention, in the same way as FIGS. 1-9 illustrate the first aspect of the invention. FIGS. 22-23 illustrate the fourth aspect of the invention, in the same way as FIGS. 11-12 illustrate the second aspect of the invention. The reference numerals in FIGS. 13-23 have the same meaning as in the corresponding FIGS. 1-9 and 11-12.

Figure 13:
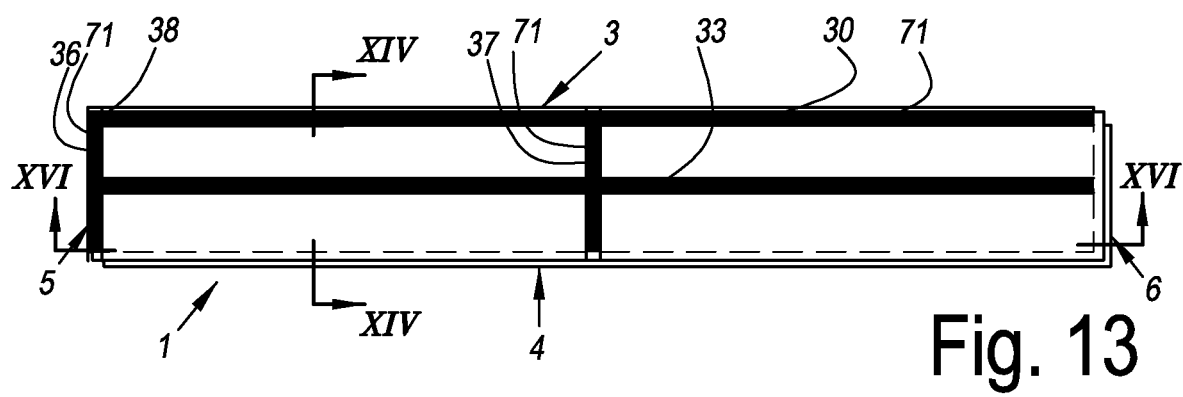
FIG. 13 shows an embodiment of a panel according to the third aspect of the invention.
Figure 14:
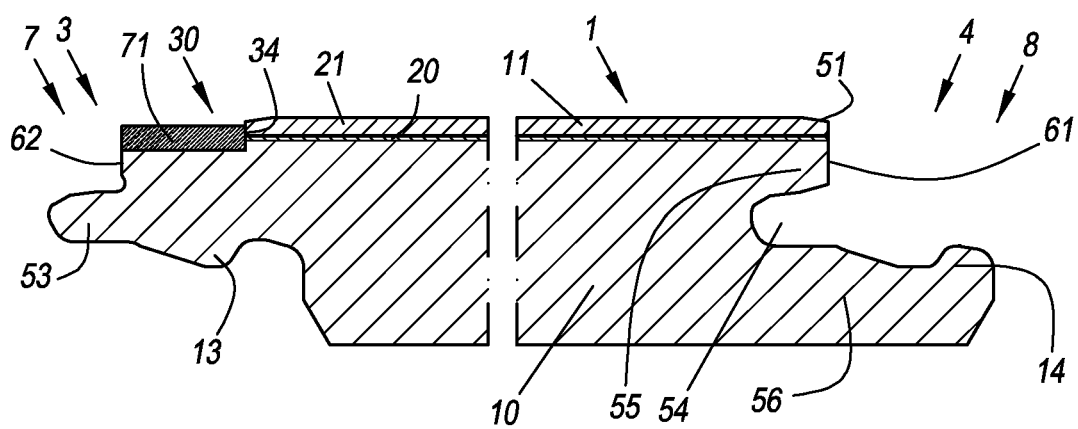
FIG. 14 shows a cross section according to XIV-XIV of the panel of FIG. 13.
Figure 15:
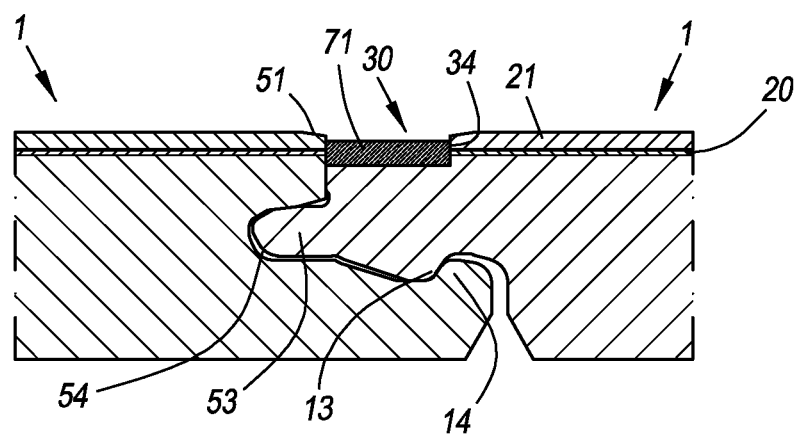
FIG. 15 shows two panels as in FIG. 13 coupled at their first pair of opposite edges.
Figure 16:
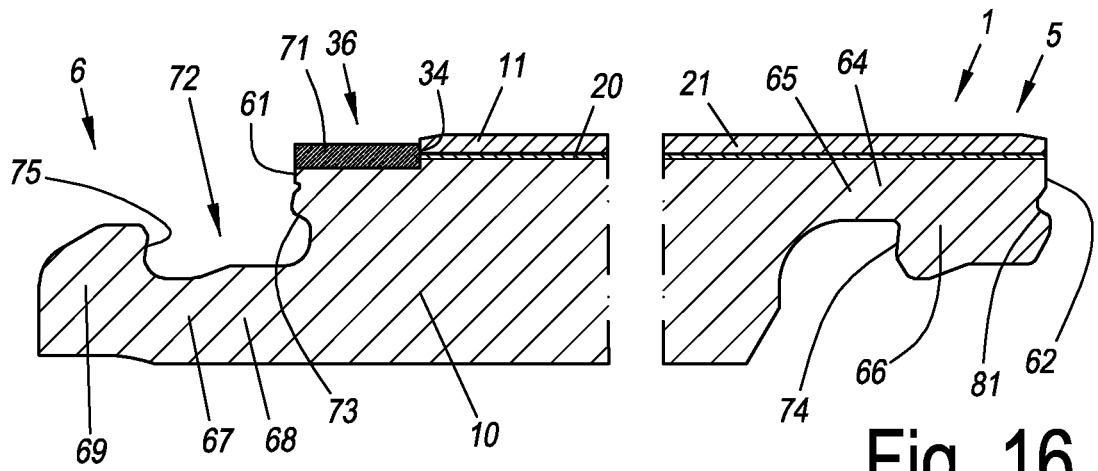
FIG. 16 shows a cross section according to XVI-XVI of the panel of FIG. 13.

FIG. 13 shows an embodiment of a panel according to the third aspect of the invention. FIG. 14 shows a cross section according to XIV-XIV of the panel of FIG. 13. FIG. 15 shows two panels as in FIG. 13 coupled at their first pair of opposite edges. FIG. 16 shows a cross section according to XVI-XVI of the panel of FIG. 13.

Figure 17:
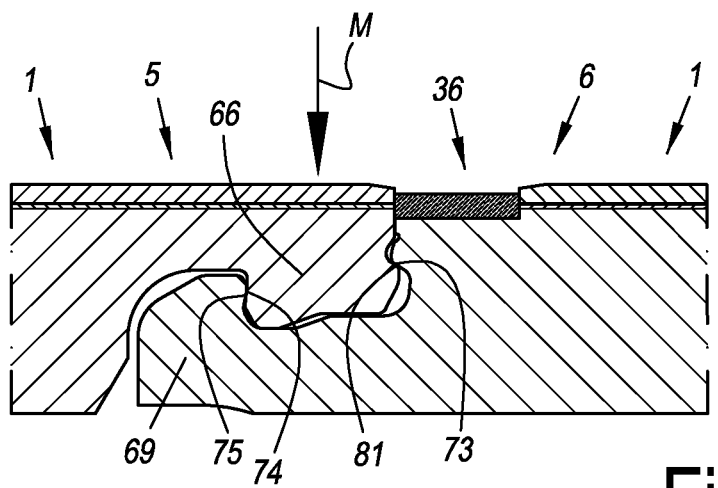
FIG. 17 shows two panels as in FIG. 13 coupled at their second pair of opposite edges.
Figure 18:
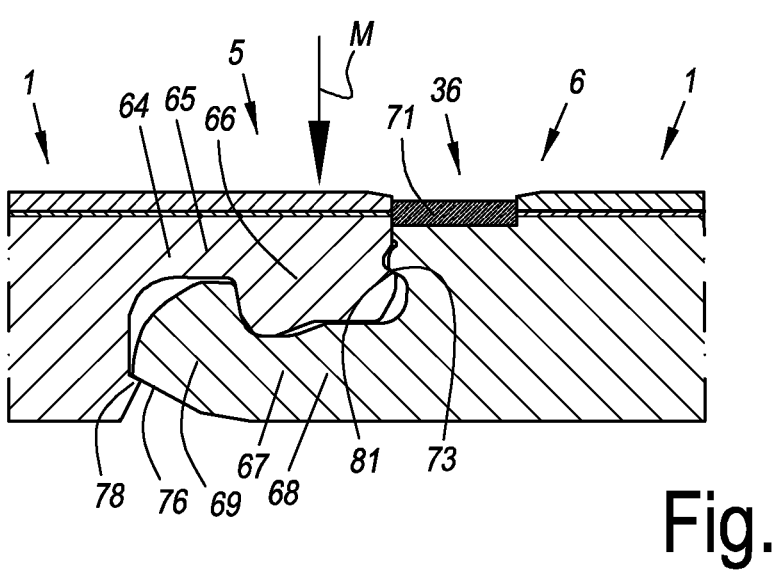
FIG. 18 shows—in the same view as FIG. 17—another embodiment of the third aspect of the invention.
Figure 19:
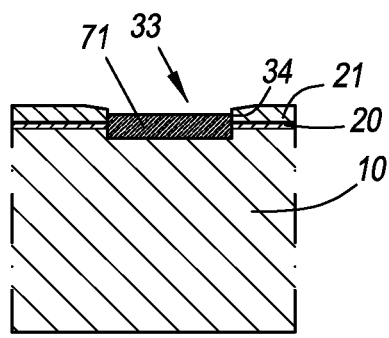
FIG. 19 shows an embodiment of the third aspect of the invention wherein a central recess is provided.

FIG. 17 shows two panels as in FIG. 13 coupled at their second pair of opposite edges. FIG. 18 shows—in the same view as FIG. 17—another embodiment of the third aspect of the invention. FIG. 19 shows an embodiment of the third aspect of the invention wherein a central recess is provided. FIG. 20 shows, in the same view as FIG. 14, another embodiment of the first aspect of the invention. FIG. 21 shows, in the same view as FIG. 16, another embodiment of the first aspect of the invention.

FIG. 22 shows a panel according to an embodiment of the fourth aspect of the invention. FIG. 23 shows two panels as in FIG. 22, in installed condition.

The difference between FIGS. 13-21 illustrating the third aspect of the invention and FIGS. 1-9 illustrating the first aspect of the invention is that instead of the recess 30, the second recess 36, the central recess 33 or the second recess 36 being provided with a lacquer layer (which has reference numeral 31 in FIGS. 1-9); the recess 30, the second recess 36, the central recess 33 or the second recess 36 comprise a polymer filling material 71. The polymer filling material 71 fills the recess or second recess or central recess of second central recess at least partially, wherein the polymer filling material 71 extends vertically from the position below the location of the decor layer 20 to the location vertically above the location of the decor layer 20 in the panel 1. This way, the decor layer 20 at the edge against which the edge comprising the recess (and thus the polymer filling material 71) is coupled or aligned or touching is hidden from view. In preferred embodiments of the third and the fourth aspect of the invention, the thickness of the polymer filling material 71 is more than 400 µm, more preferably more than 500 µm, more preferably more than 700 µm.

The difference between FIGS. 11 and 12 illustrating the second aspect of the invention and FIGS. 22 and 23 illustrating the fourth aspect of the invention is that instead of the recess 30 and the central recess 33 being provided with a lacquer layer (which has reference numeral 31 in FIGS. 11-12); the recess 30 and the central recess 33 comprise a polymer filling material 71. The polymer filling material 71 fills the recess 30 and the central recess 33 at least partially, wherein the polymer filling material 71 extends vertically from the position below the location of the decor layer 20 to the location vertically above the location of the decor layer 20 in the panel 1. This way, the decor layer 20 at the edge against which the edge comprising the recess (and thus the polymer filling material 71) is coupled or aligned or touching is hidden from view. In preferred embodiments of the third and the fourth aspect of the invention, the thickness of the polymer filling material 71 is more than 400 µm, more preferably more than 500 µm, more preferably more than 700 µm.

FIGS. 24-33 illustrate the fifth aspect of the invention.

Figure 24:
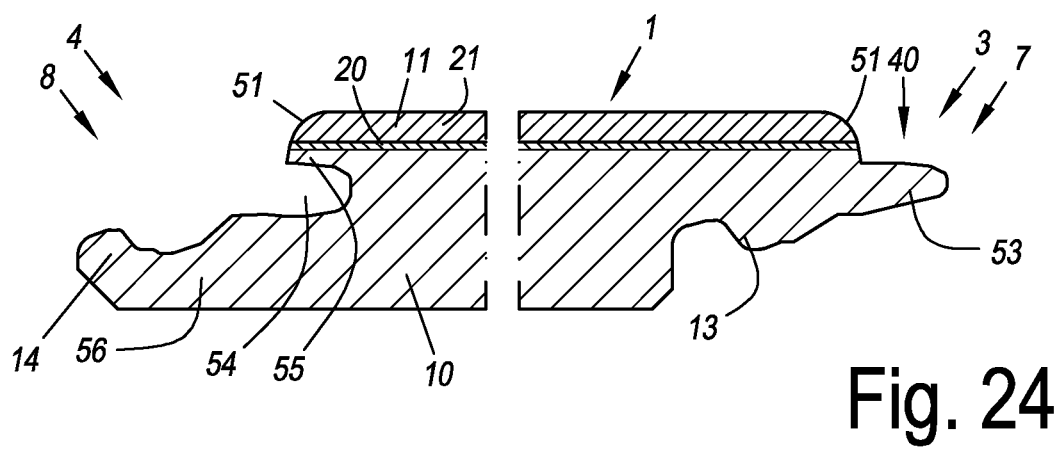
FIG. 24 shows a cross section of a panel according to an embodiment of the fifth aspect of the invention.
Figure 25:
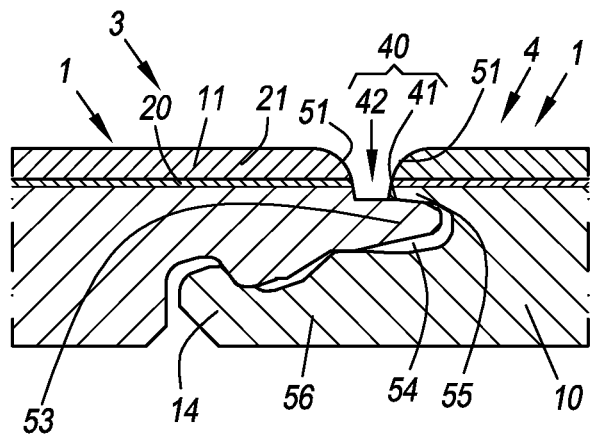
FIG. 25 shows two panels as in FIG. 24 in coupled condition.

FIG. 24 shows a cross section of a panel 1 according to an embodiment of the fifth aspect of the invention. FIG. 25 shows two panels as in FIG. 24 in coupled condition at their first pair of opposite edges 3, 4.

The panel 1 of FIGS. 24 and 25 comprises a substrate 10 and a top layer 11. The top layer 11 comprises a decor layer 20 and a wear layer 21. The panel 1 is provided at a first pair of opposite edges 3, 4 with coupling parts 7, 8 cooperating which each other, substantially in the form of male coupling parts 7 and female coupling parts 8, for coupling two such panels at their first pair of opposite edges 3, 4 to each other in a floor, wall or ceiling covering. The male coupling part 7 is provided at the male edge 3 of the first pair of opposite edges. The female coupling part 8 is provided at the female edge 4 of the first pair of opposite edges.

The male coupling part 7 provided at the male edge 3 comprises a tongue 53 extending in the direction parallel with the panel surface. The female edge 4 comprises a groove 54 providing the female coupling part 8. The groove is bordered by an upper lip 55 and a lower lip 56. The lower lip extends further than the upper lip. The lower lip 56 comprises a locking element 13. The bottom of the tongue 53 comprises a locking element 14. In coupled condition of two such panels 1 at their first pair of opposite edges 3,4, the locking element of the lower lip 13 contacts the locking element of the tongue 14 thereby establishing a locking of the coupled panels at their first pair of opposite edges in the direction perpendicular to the coupled edges and parallel with the surface of the coupled panels. It is preferred when this locking is established with pretension. The locking element 13 of the lower lip 13 is provided distally from the distal end of the upper lip 55.

The coupling parts of the first pair of opposite edges 3, 4 are configured such that a first such panel can be coupled with its male edge into the female edge of a second such panel by means of an angling movement and by means of a substantially horizontal sliding movement with snap action.

The male edge 3, and more specifically the tongue 53 which provides the male coupling part 7, comprises a section 40 the upper surface of which is provided below the surface of the floor panel and below the location of the decor layer 20. The visual appearance of said upper surface of said section differs over its full surface from the visual appearance of the decor layer 20. In coupled condition of a first such panel coupled at its male edge 3 onto the female edge 4 of a second such panel, the female edge 4 overlaps part of the upper surface of said section 40 of the male edge 3 of the first such panel such that part 41 of the upper surface of said section 40 of the male edge of the first such panel is hidden from view whereas part 42 of the upper surface of said section is visible in the view perpendicular to the surface of the coupled panels. The visible part provides a grout imitation in coupled condition of the panels.

The part of the upper surface of said section that is visible in the view perpendicular to the surface of the coupled panels is preferably at least 1.5 mm wide, more preferably at least 2 mm wide, more preferably at least 3 mm wide, more preferably more than 3.5 mm wide, and preferably less than 5 mm wide.

It is preferred when at least part of the—and preferably the complete—upper surface of said section 42 which is visible in the view perpendicular to the surface of the coupled panels is parallel with the surface of the floor panel. Such preferred embodiment increases the reality of the grout imitation that is provided.

The male edge 3 and the female edge 4 each comprise a bevel 51. These bevels 51 are convex bevels, and at least partially curve. The bevel 51 at the male edge 3 is substantially the mirror image of the bevel 51 at the female edge 4.

The configuration of the edges as shown in FIGS. 24 and 25 can also be used at the second pair of opposite edges of a panel.

Figure 26:
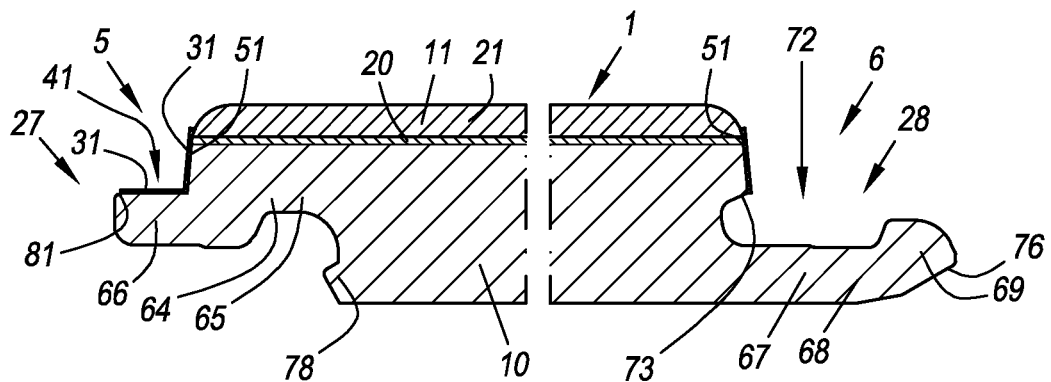
FIG. 26 shows a cross section at the second pair of opposite edges of a panel according an embodiment of the fifth aspect of the invention.
Figure 27:
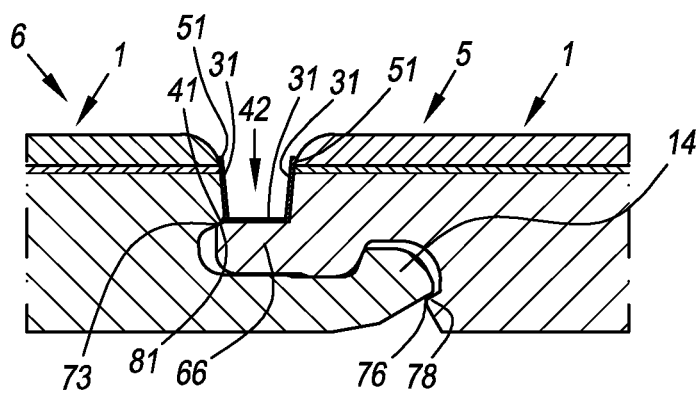
FIG. 27 shows two panels as in FIG. 26 in coupled condition.

FIG. 26 shows a cross section at the second pair of opposite edges of a rectangular—whether square or oblong—panel according an embodiment of the fifth aspect of the invention. FIG. 27 shows two panels as in FIG. 26 in coupled condition.

The panel 1 comprises a second pair of opposite edges 5, 6. The panel 1 is provided at the second pair of opposite edges 5, 6 with second coupling parts 27, 28, cooperating which each other, substantially in the form of second male coupling parts 27 and second female coupling parts 28, for coupling two such panels at their second pair of opposite edges to each other in a floor, wall or ceiling covering. The second male coupling part 27 is provided at the second male edge 5 of the second pair of opposite edges. The second female coupling part 28 is provided at the second female edge 6 of the panels.

The second male edge 5 comprises a second downward-directed upper hook-shaped part 64. The second downward-directed upper hook-shaped part 64 comprises a lip 65 with a second downward-directed locking element 66 which forms the second male coupling part 27.

The second female edge 6 comprises a second upward-directed lower hook-shaped part 67. The second upward-directed lower hook-shaped part 67 comprises a lip 68 with a second upward-directed locking element 69, which, proximally thereof, defines the second female coupling part 28 in the form of a second coupling recess 72. The second male coupling part and the second female coupling part are configured such that two such panels can be coupled to each other at their respective second pair of opposite edges by means of a movement M substantially perpendicular to the surface of the panels to be coupled in this way.

In the embodiment shown in FIGS. 26 and 27, the edges of the second pair of panel edges are configured such that no locking in the direction perpendicular to the surface of the panels between panels coupled at their second pair of opposite edges 5, 6 is provided at the proximal end of the second upward-directed locking element 69 nor at the proximal end of the second downward-directed locking element 66.

The locking means comprise a second undercut 73 at the second female edge 6. The second undercut 73 is provided for interacting with a locking element 81 at the distal end of the second downward-directed locking element 66 of the coupled panel, thereby establishing a locking perpendicularly to the surface of the panels at the distal end of the second downward-directed locking element of the panel.

The second pair of opposite edges 5, 6 of the embodiment shown in FIGS. 26 and 27 are configured such that in coupled condition of two such panels at their second pair of opposite edges, a locking in the direction perpendicular to the surface of the coupled panels is provided at the distal end of the second upward-directed locking element 69. Embodiments can be provided wherein this locking is provided with contact, and embodiments can be provided wherein this locking is provided without contact. In the embodiment shown in FIGS. 26 and 27, the distal end of the second upward-directed locking element 69 comprises an undercut 76. The bottom surface of this undercut 76 is provided for establishing a locking in the direction perpendicular to the surface of the coupled panels. To this end, the proximal end of the second male edge 5 comprises a second corresponding hook 78, provided for interacting with the undercut 76 at the distal end of the second upward-directed locking element 69 of the coupled panel for establishing a locking in the direction perpendicular to the surface of the coupled panels.

The downward-directed locking element 66 comprises a section 40 the upper surface of which is provided below the surface of the floor panel and below the location of the decor layer 20. In coupled condition of the first such panel coupled at its second male edge 5 onto the second female edge 6 of a third such panel, the second female edge of the third such panel overlaps part of the upper surface of said section 40 of the second male edge of the first such panel, such that part 41 of the upper surface of said section of the second male edge of the first such panel is hidden from view whereas part 42 of the upper surface of said section of the second male edge of the first such panel is visible in the view perpendicular to the surface of the coupled panels. The visible part provides a grout imitation in coupled condition of the panels. Preferably at least part of the—and preferably the complete—upper surface of said section 42 of the second male edge which is visible in the view perpendicular to the surface of the coupled first and third such panels is parallel with the surface of the panel.

The second male edge 5 and the second female edge 6 each comprise a bevel 51. These bevels are convex bevels, at least partially curved. Preferably, the bevel 51 at the second male edge is substantially the mirror image of the bevel 51 of the second female edge.

Part of the section 40 of the male edge the upper surface of which is provided below the surface of the floor panel and below the location of the decor layer, is provided with a lacquer layer 31.

The male edge 3 and the female edge 4 are provided with bevels 51. The bevels are partly provided with a same lacquer layer 31. These lacquer layers 31 on the bevels 51 extend from below the decor layer 20, in the example from the bottom of the bevels 51, to a position above the decor layer 20. This way, the decor layer is hidden from view in the bevels.

Alternative configurations for the locking means for locking the panels in the direction perpendicular to the surface of the panels are possible than shown in FIGS. 26 and 27. It is e.g. possible to use the configurations of the locking means of FIG. 5.

Figure 28:
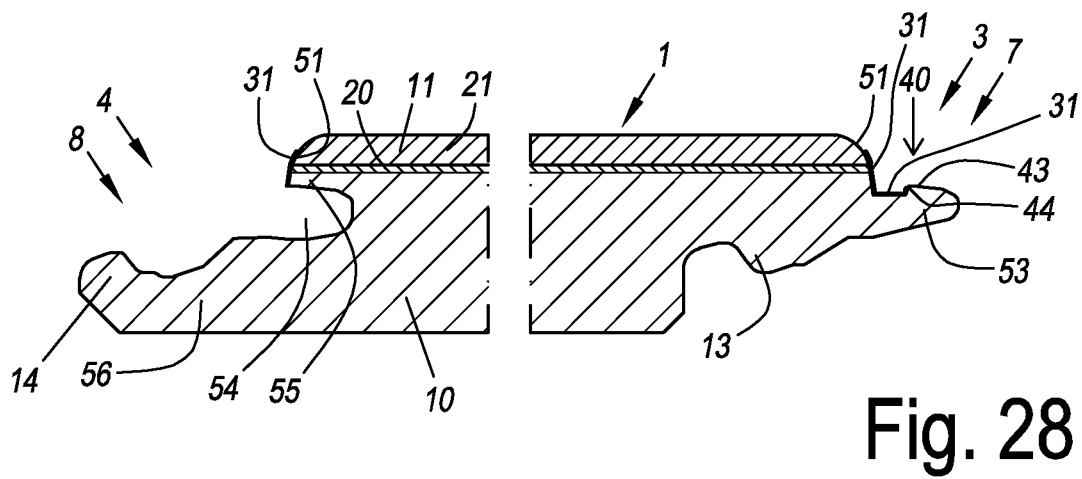
FIG. 28 shows a cross section of a panel according to an embodiment of the fifth aspect of the invention.
Figure 29:
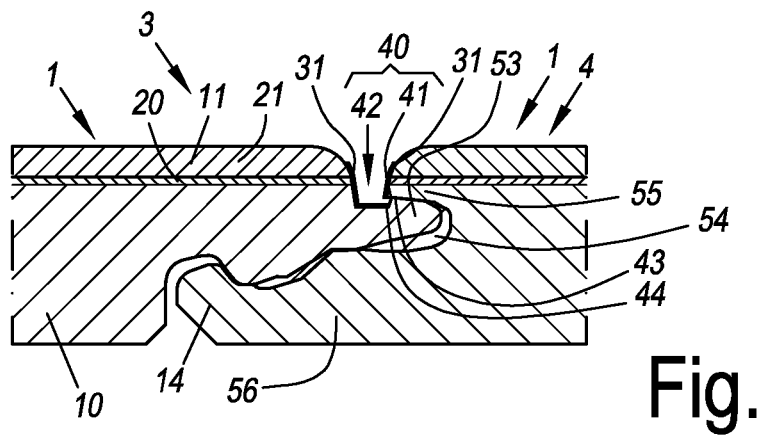
FIG. 29 shows two panels as in FIG. 28 in coupled condition.

FIG. 28 shows a cross section of a panel according to an embodiment of the fifth aspect of the invention, in a view similar to FIG. 24. FIG. 29 shows two panels as in FIG. 28 in coupled condition. The reference numerals have the same meaning as in FIGS. 24 and 25.

The male edge 3, and more specifically the tongue 53 which provides the male coupling part 7, comprises a section 40 the upper surface of which is provided below the surface of the floor panel and below the location of the decor layer 20. The visual appearance of said upper surface of said section differs over its full surface from the visual appearance of the decor layer 20. In coupled condition of a first such panel coupled at its male edge 3 onto the female edge 4 of a second such panel, the female edge 4 overlaps part of the upper surface of said section 40 of the male edge 3 of the first such panel such that part 41 of the upper surface of said section 40 of the male edge of the first such panel is hidden from view whereas part 42 of the upper surface of said section is visible in the view perpendicular to the surface of the coupled panels.

In the embodiment shown in FIGS. 28 and 29, the female edge 4 of the second such panel contacts the upper surface of said section 40 of the male edge 3 of the first such panel which is provided below the surface of the floor panel and below the location of the decor layer in a first zone 43 of the upper surface of the male coupling part. The upper surface of the tongue 53 comprises a second zone 44 less distal than the first zone 43, wherein the female edge 4 of the second such panel overlaps the second zone 44 without contacting it but such that the second zone 44 is hidden from view. This second zone 44 is distanced more from the surface of the floor panel than the first zone 43.

Part of the section 40 of the male edge the upper surface of which is provided below the surface of the floor panel and below the location of the decor layer, is provided with a lacquer layer 31. However, the first zone 43 does not comprise this lacquer layer, whereas the second zone 44 does comprise this lacquer layer at least in part.

The male edge 3 and the female edge 4 are provided with bevels 51. The bevels are partly provided with a same lacquer layer 31. These lacquer layers 31 on the bevels 51 extend from below the decor layer 20, in the example from the bottom of the bevels 51, to a position above the decor layer 20. This way, the decor layer is hidden from view in the bevels.

In a similar way as in FIG. 28, lacquer layers can be provided in the embodiment shown in FIG. 24, in the section 40 as well as on the bevels 51.

The configuration of the edges as shown in FIGS. 28 and 29 can also be used at the second pair of opposite edges of a panel.

Figure 30:
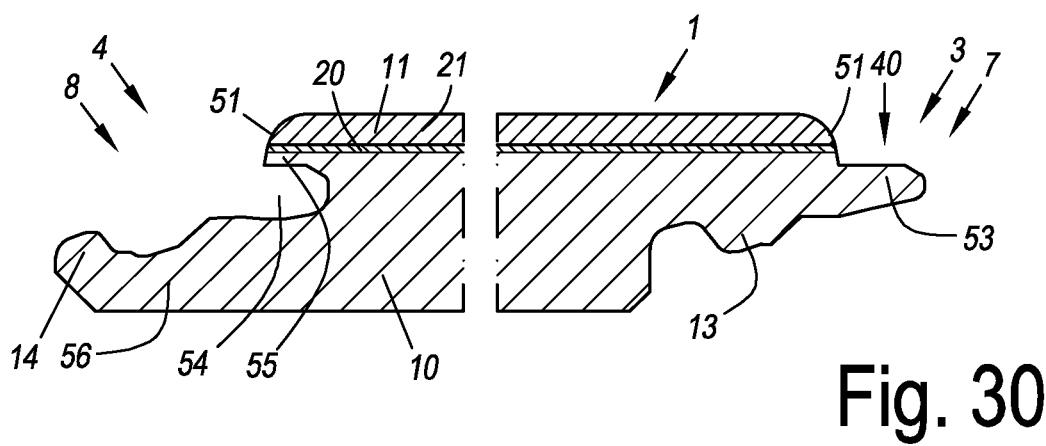
FIG. 30 shows a cross section of a panel according to an embodiment of the fifth aspect of the invention.
Figure 31:
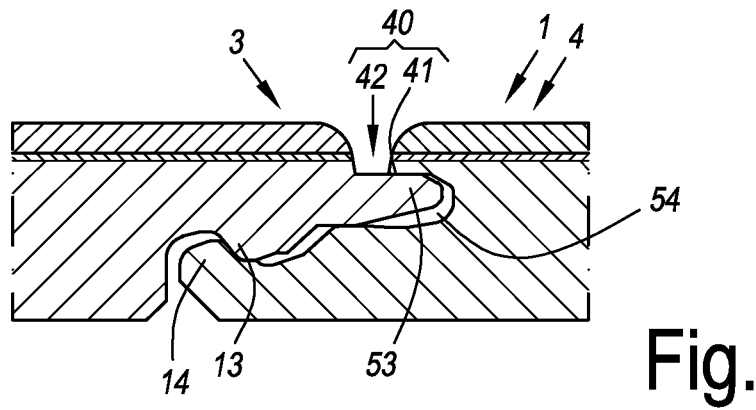
FIGS. 31 and 32 show two panels as in FIG. 30 in coupled condition.
Figure 32:
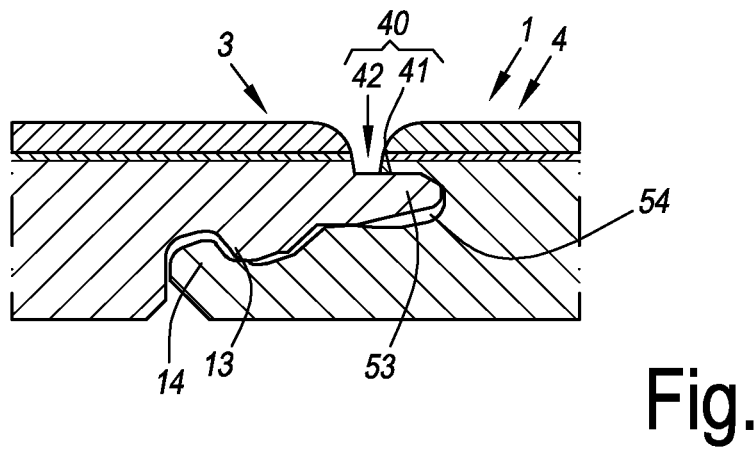

FIG. 30 shows a cross section of a panel according to an embodiment of the fifth aspect of the invention. FIGS. 31 and 32 show two panels as in FIG. 30 in coupled condition.

The panels of FIG. 30 are to a large extent similarly configured to the panels of FIG. 24. However, the coupling parts of the panel of FIG. 30 is explicitly configured such that in coupled condition of the panel with another such panel at their respective edges of the first pair of opposite edges 3, 4, said mechanical locking means which prevent the drifting apart of the locked panels in the direction perpendicular to the coupled edges and parallel with the surface of the coupled panels prevent this drifting apart while allowing a play in that direction of at least 0.2 mm; and preferably of less than 0.5 mm. FIGS. 31 and 32 illustrate the play by showing the panels coupled in two different play positions.

In the panel of FIG. 30, this allowing a play is at least in part made possible by the relative position in the direction perpendicular to the first pair of opposite edges parallel with the surface of the panels coupled at their first pair of opposite edges of the overlap of the female edge of the upper surface of said section of the male edge. More specifically, the overlapped section of the male edge is parallel with the surface of the panel.

Preferably, the overlap of the female edge over the male edge is provided where the male edge is parallel with the surface of the panel.

Figure 33:
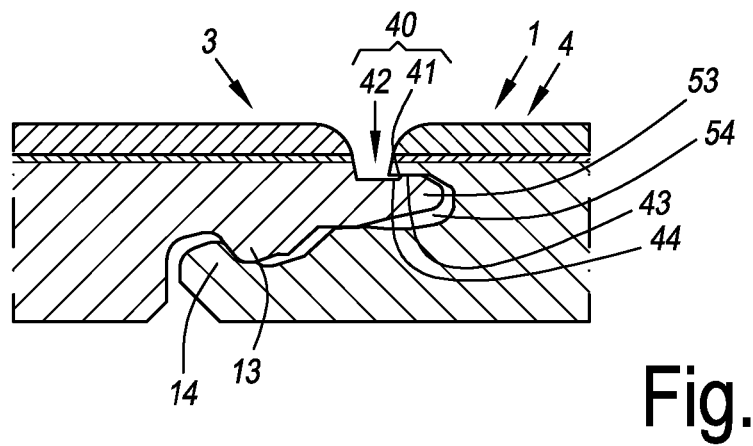
FIG. 33 shows panels according to an embodiment of the fifth aspect of the invention in coupled condition.

FIG. 33 shows panels according to an embodiment of the fifth aspect of the invention in coupled condition. The configuration of the panels is to a large extent similar as shown in FIGS. 30 and 31. The same reference numerals have the same meaning in FIG. 33 as in FIGS. 30 and 31. The difference in the embodiment in FIG. 33 is that in the embodiment shown in FIG. 33—in a similar way as shown in the embodiment of FIGS. 28 and 29—the female edge 4 of the second such panel contacts the upper surface of said section 40 of the male edge 3 of the first such panel which is provided below the surface of the floor panel and below the location of the decor layer in a first zone 43 of the upper surface of the male coupling part. The upper surface of the tongue 53 comprises a second zone 44 less distal than the first zone 43, wherein the female edge 4 of the second such panel overlaps the second zone 44 without contacting it but such that the second zone 44 is hidden from view. This second zone 44 is distanced more from the surface of the floor panel than the first zone 43.

Part of the section 40 of the male edge the upper surface of which is provided below the surface of the floor panel and below the location of the decor layer, is provided with a lacquer layer 31. However, the first zone 43 does not comprise this lacquer layer, whereas the second zone 44 does comprise this lacquer layer at least in part.

In embodiments of the fifth aspect of the invention, it is preferred when the distance from the surface of the panel of said section of the male coupling edge is substantially the same as the distance from the surface of the panel of said section of the second male edge.

In embodiments of the fifth aspect of the invention, it is preferred when the part of the upper surface of the section of the male edge which is visible in the view perpendicular to the surface of the coupled panels has substantially the same color as the part of the upper surface of the section of the second male edge which is visible in the view perpendicular to the surface of the coupled panels.

When in embodiments of the fifth aspect of the invention lacquer layers are provided at the first pair of opposite edges and at the second pair of opposite edges, there lacquer layers preferably have the same composition.

Each of these options increase the realism of the imitation of grouting in installed panels.

FIGS. 34-38 illustrate the sixth aspect of the invention.

Figure 34:
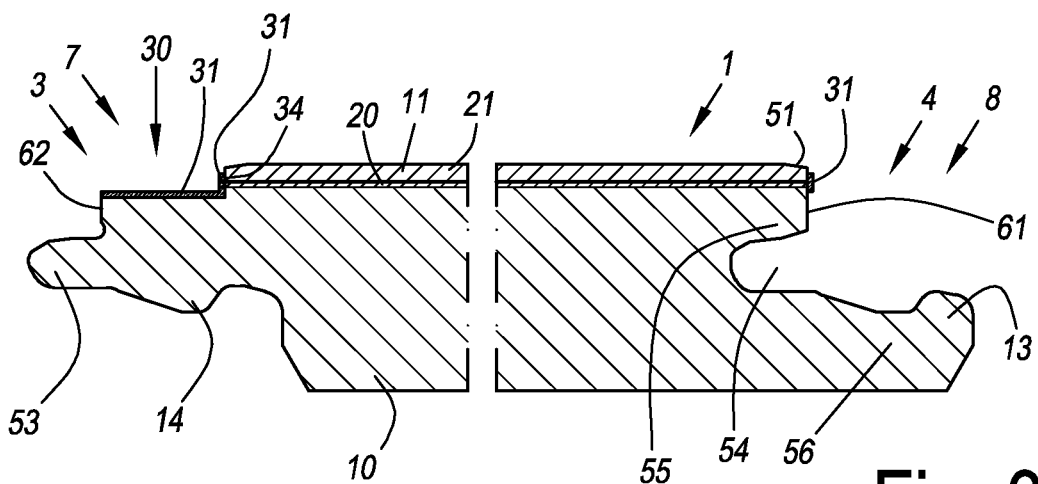
FIG. 34 illustrates the first pair of opposite edges of a panel according to an embodiment of the sixth aspect of the invention.
Figure 35:
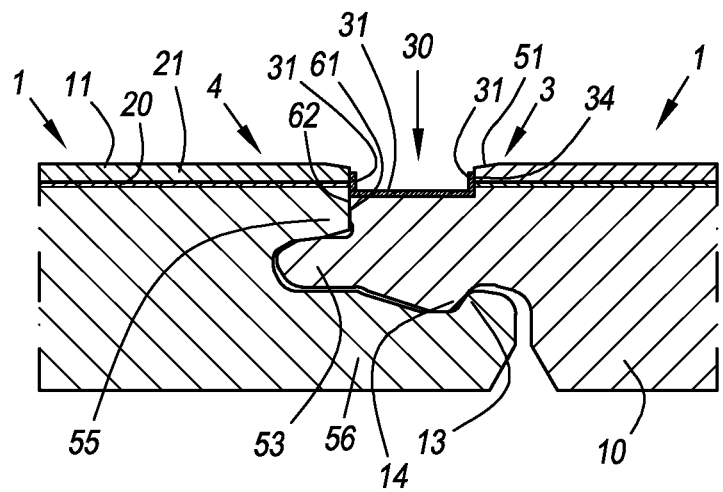
FIG. 35 shows two panels as in FIG. 34 coupled at their first pair of opposite edges.
Figure 36:
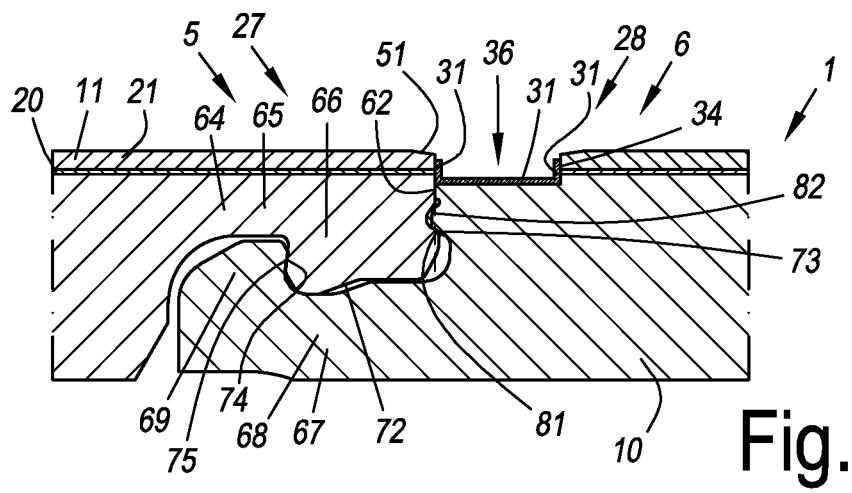
FIG. 36 shows panels according to an embodiment of the sixth aspect coupled at their second pair of opposite edges.

FIG. 34 illustrates the first pair of opposite edges of a panel 1 according to an embodiment of the sixth aspect of the invention. FIG. 35 shows two panels as in FIG. 34 coupled at their first pair of opposite edges. FIG. 36 shows panels according to an embodiment of the sixth aspect coupled at their second pair of opposite edges.

In combination, FIGS. 34, 35 and 36 illustrate an embodiment according to the sixth aspect of the invention.

The panel 1 comprises a substrate 10 and a top layer 11. The top layer comprises a decor layer 20 and a wear layer 21. The panel is provided at a first pair of opposite edges 3, 4 with coupling parts 7, 8 cooperating which each other, substantially in the form of a tongue 53 and a groove 54, for coupling two such panels at their first pair of opposite edges to each other in a floor, wall or ceiling covering. The tongue 53 is provided at the male edge 3 of the first pair of opposite edges. The tongue 53 extends at the male edge in the direction parallel with the panel surface. The groove 54 is provided at the female edge 4 of the first pair of opposite edges. The groove 54 is bordered by an upper lip 55 and a lower lip 56. The lower lip extends further than the upper lip.

The lower lip 56 comprises a locking element 13. The bottom of the tongue 53 comprises a locking element 14. In coupled condition of two such panels at their first pair of opposite edges 3, 4, the locking element 13 of the lower lip contacts the locking element 14 of the tongue thereby establishing a locking of the coupled panels at their first pair of opposite edges in the direction perpendicular to the coupled edges and parallel with the surface of the coupled panels. It is preferred that this locking is established with pretension. The locking element 13 of the lower lip 56 is provided distally from the distal end of the upper lip 55.

The coupling parts of the first pair of opposite edges 3, 4 are configured such that a first such panel can be coupled with its male edge 3 into the female edge 4 of a second such panel by means of an angling movement W (see FIG. 10 for the explanation of the angling movement W).

The surface of the male edge 3 is provided with a recess 30. The recess extends deeper into the panel than the location of the decor layer 20. In the example, the recess 30 extends in the direction parallel with the surface of the panel and perpendicular to the first pair of opposite edges 3, 4 in proximal direction to vertically above the locking element 13 of the lower lip 56 that will contact the locking element 14 of the tongue 53 in coupled condition of two such panels at their first pair of opposite edges 3, 4.

In the example shown, the recess 30 comprises a flat bottom, and a flank 34 proximally from the bottom.

The proximal end of the female edge 4 of the first pair of opposite edges 3, 4 comprises a first closing plane 61; and the distal end of the male edge 3 of the first pair of opposite edges comprises a second closing plane 62. In coupled condition of two such panels at their first pair of opposite edges 3, 4 the first closing plane 61 of the first such panel contacts the second closing panel 62 of the second such panel thereby providing a contact surface between the two coupled such panels, wherein the contact surface is substantially perpendicular to the surface of the coupled panels.

The panel 1 comprises a second pair of opposite edges 5, 6. The panel 1 is provided at the second pair of opposite edges 5, 6 with second coupling parts 27, 28, cooperating which each other, substantially in the form of second male coupling parts 27 and second female coupling parts 28, for coupling two such panels at their second pair of opposite edges to each other in a floor, wall or ceiling covering. The second male coupling part 27 is provided at the second male edge 5 of the second pair of opposite edges. The second female coupling part 28 is provided at the second female edge of the panels 6. The second coupling parts are provided with second mechanical locking means which prevent the drifting apart of two such panels coupled at their second pair of opposite edges 5, 6 into the direction perpendicular to the surface of the coupled panels as well as into the direction perpendicular to the respective coupled edges in the plane parallel to the coupled panels. The second male edge 5 comprises a downward-directed upper hook-shaped part 64. The downward-directed upper hook-shaped part comprises a lip 65 with a downward-directed locking element 66 which forms the second male coupling part 27. The second female edge 6 comprises an upward-directed lower hook-shaped part 67. The upward-directed lower hook-shaped part comprises a lip 68 with an upward-directed locking element 69, which, proximally thereof, defines the second female coupling part 28 in the form of a coupling recess 72. The second male coupling part and the second female coupling part are configured such that two such panels can be coupled to each other at their respective second pair of opposite edges by means of a movement M substantially perpendicular to the surface of the two such panels.

The coupling parts of the first pair of opposite edges 3, 4 and of the second coupling parts of the second pair of opposite edges 5, 6 are configured such that a plurality of such panels can be coupled into a covering using the fold-down method of installation.

The surface of the second female edge 6 is provided with a second recess 36. The second recess 36 extends deeper into the panel than the location of the decor layer 20. The second recess 36 comprises a flat bottom and a flank 34 proximally from the bottom.

When—as shown in the figures—the width of the second recess 36 is substantially the same as the width of the recess 30, this increases the realistic imitation of grouting by the recess and the second recess.

The first pair of opposite edges 3, 4 and/or the second pair of opposite edges 5, 6 are provided with bevels 51. In the examples shown, the bevels do not extend to below the location of the decor layer, however it is possible that bevels extend to below the location of the decor layer. It is also possible that the panel edges do not comprise bevels.

The proximal end of the second female edge 6 comprises a third closing plane 61. The distal end of the second male edge 5 comprises a fourth closing plane 62. In coupled condition of two such panels at their second pair of opposite edges 5, 6 the third closing plane 61 of a first such panel contacts the fourth closing plane 62 of another such panel thereby providing a contact surface between the so coupled panels. In the example, the contact surface is substantially perpendicular to the surface of the coupled panels.

The edges of the second pair of opposite edges 5, 6 are provided with mechanical locking means such that in coupled condition of a first such panel to a third such panel at their second pair of opposite edges, a contact zone is established between the mechanical locking means thereby providing a locking perpendicularly to the surface of the panels at the distal end of the downward-directed locking element of the panel 66. It is preferred when, as in the embodiments of FIGS. 36 (and also 37), the extension 82 of the contact surface intersects the contact zone between the mechanical locking means.

The locking means comprise an undercut 73 at the second female edge 6. The undercut interacts with the downward-directed locking element 66—more specifically with a locking element 81 of the downward-directed locking element 66—of the coupled panel, thereby providing a locking perpendicularly to the surface of the panels at the distal end of the downward-directed locking element 66 of the panel.

The proximal end of the downward-directed locking element 66 comprises a first inclined contact surface 74. The proximal end of the upward-directed locking element 69 comprises a second inclined contact surface 75. In coupled condition of two such panels at their second pair of opposite edges 5, 6, the first inclined contact surface 74 contacts the second inclined contact surface 75 of the other panel; thereby establishing a locking of the coupled panels in the direction perpendicular to the surface of the coupled panels. It is preferred when this locking is established with pretension.

The second pair of opposite edges 5, 6 of the embodiment shown in FIG. 36 are configured such that in coupled condition of two such panels at their second pair of opposite edges, no locking in the direction perpendicular to the surface of the coupled panels is provided at the distal end of the upward-directed locking element 69.

The cross section of the recess perpendicularly to the panel edge 3 where the recess 30 is provided is substantially the same as the cross section of the second recess 36 perpendicularly to the panel edge 6 where the second recess 36 is provided.

Preferably, the panel edge where the recess is provided joins the panel edge where the second recess is provided in a joint; wherein in the joint the recess continues without interruption into the second recess.

Figure 37:
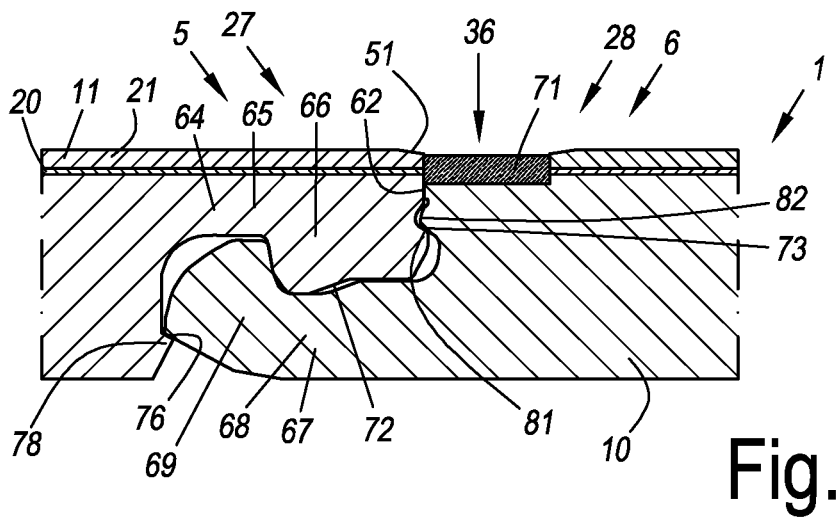
FIG. 37 shows panels according to another embodiment of the sixth aspect coupled at their second pair of opposite edges.

FIG. 37 shows panels according to another embodiment of the sixth aspect of the invention coupled at their second pair of opposite edges. The same reference numerals have the same meaning as in FIGS. 36 and 37. The embodiment of FIG. 37 differs to a certain extent in the way the locking in the direction perpendicular to the surface of the panels is established.

No locking in the direction perpendicular to the surface of the panels coupled at their second pair of opposite edges 5, 6 is provided at the proximal end of the upward-directed locking element 69 nor at the proximal end of the downward-directed locking element 66.

In a similar way as in the embodiment shown in FIG. 36, the locking means comprise an undercut 73 at the second female edge 6. The undercut interacts with the downward-directed locking element 66—more specifically with a locking element 81 of the downward-directed locking element 66—of the coupled panel, thereby providing a locking perpendicularly to the surface of the panels at the distal end of the downward-directed locking element 66 of the panel. The proximal end of the downward-directed locking element 66 comprises a first inclined contact surface 74. The proximal end of the upward-directed locking element 69 comprises a second inclined contact surface 75. In coupled condition of two such panels at their second pair of opposite edges 5, 6, the first inclined contact surface 74 contacts the second inclined contact surface 75 of the other panel; thereby establishing a locking of the coupled panels in the direction perpendicular to the surface of the coupled panels. It is preferred when this locking is established with pretension.

The second pair of opposite edges 5, 6 are configured such that in coupled condition of two such panels at their second pair of opposite edges, a locking in the direction perpendicular to the surface of the coupled panels is provided at the distal end of the upward-directed locking element 69. This locking can—according to specific embodiments—be provided with or without contact. The distal end of the upward-directed locking element 69 comprises an undercut 76. The bottom surface of the undercut 76 is provided for establishing a locking in the direction perpendicular to the surface of the coupled panels. The proximal end of the second male edge 5 comprises a corresponding hook 78, provided for interacting with the upward-directed locking element 69 of the coupled panel for establishing a locking in the direction perpendicular to the surface of the coupled panels.

Figure 38:
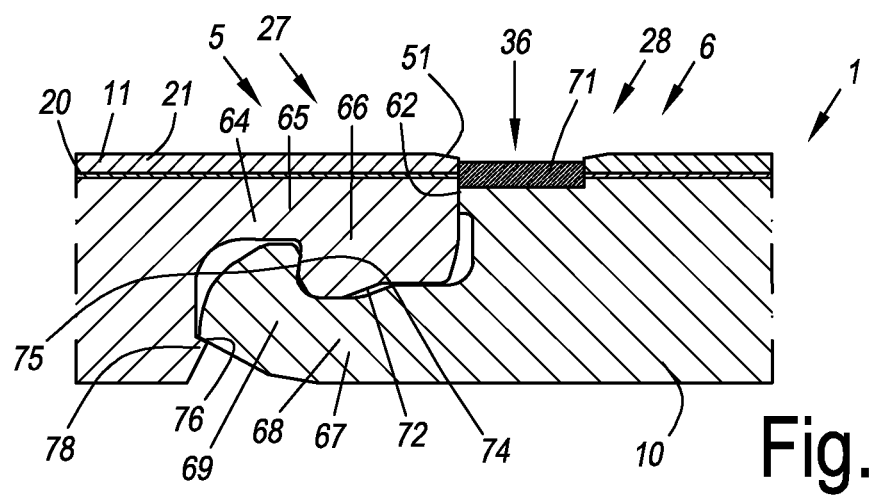
FIG. 38 shows panels according to another embodiment of the sixth aspect coupled at their second pair of opposite edges.

FIG. 38 shows panels according to another embodiment of the sixth aspect coupled at their second pair of opposite edges. The same reference numerals have the same meaning as in FIGS. 36 and 37.

A difference between the embodiment of the second pair of opposite edges 5, 6 shown in FIG. 38 compared to the embodiments shown in FIGS. 36 and 37 is that no locking is in the direction perpendicular to the surface of the coupled panels is established at the second pair of opposite edges 5, 6 between the distal end of the male edge 5 and the proximal end of the female edge 6.

The proximal end of the downward-directed locking element 66 comprises a first inclined contact surface 74. The proximal end of the upward-directed locking element 69 comprises a second inclined contact surface 75. In coupled condition of two such panels at their second pair of opposite edges 5, 6, the first inclined contact surface 74 contacts the second inclined contact surface 75 of the other panel; thereby establishing a locking of the coupled panels in the direction perpendicular to the surface of the coupled panels. It is preferred when this locking is established with pretension.

The second pair of opposite edges 5, 6 are configured such that in coupled condition of two such panels at their second pair of opposite edges, a locking in the direction perpendicular to the surface of the coupled panels is provided at the distal end of the upward-directed locking element 69. This locking can—according to specific embodiments—be provided with or without contact. The distal end of the upward-directed locking element 69 comprises an undercut 76. The bottom surface of the undercut 76 is provided for establishing a locking in the direction perpendicular to the surface of the coupled panels. The proximal end of the second male edge 5 comprises a corresponding hook 78, provided for interacting with the upward-directed locking element 69 of the coupled panel for establishing a locking in the direction perpendicular to the surface of the coupled panels.

The recess 30 and the second recess 36 can be provided with a lacquer layer 31, as shown in the embodiments shown in FIGS. 35 and 36. The lacquer layers are visible in coupled condition of the panels. The lacquer layers provide an imitation of a grouting. The flanks (or side edges) 34 of the recess 30 and of the second recess 36 are provided with the lacquer layer 31. The panel edges opposite to the edge comprising the recess 30 or the second recess 36 are over a section provided with a lacquer layer—the section covers the location of the decor layer at these edges, such that the decor layer is at the edge covered by the lacquer layer and no longer visible at these edges. These lacquer layers contribute to providing a grout imitation of coupled panels.

It is possible to fill at least partially the recess 30 and the second recess 36 with a polymer filling material 71, as is illustrated in the embodiments shown in FIGS. 37 and 38. The polymer filling material contributes to provide a very realistic grout imitation to the installed panels. The polymer filling materials extend vertically from the position below the location of the decor layer 20 to the location vertically above the location of the decor layer in the panel. The polymer filling materials 71 provides part of the panel edge on which the polymer filling material is.

FIGS. 39-43 show examples of panels according to the seventh aspect, the eighth aspect and the ninth aspect of the invention. These aspects are illustrated in these examples in combination, however, such combination is not essential for the invention. Each of these aspects can be provided separately, or in combination of two of these aspects, of in combination of all three of these aspects. Non-contradictory combinations with the other aspects of the invention are also possible.

Figure 39:
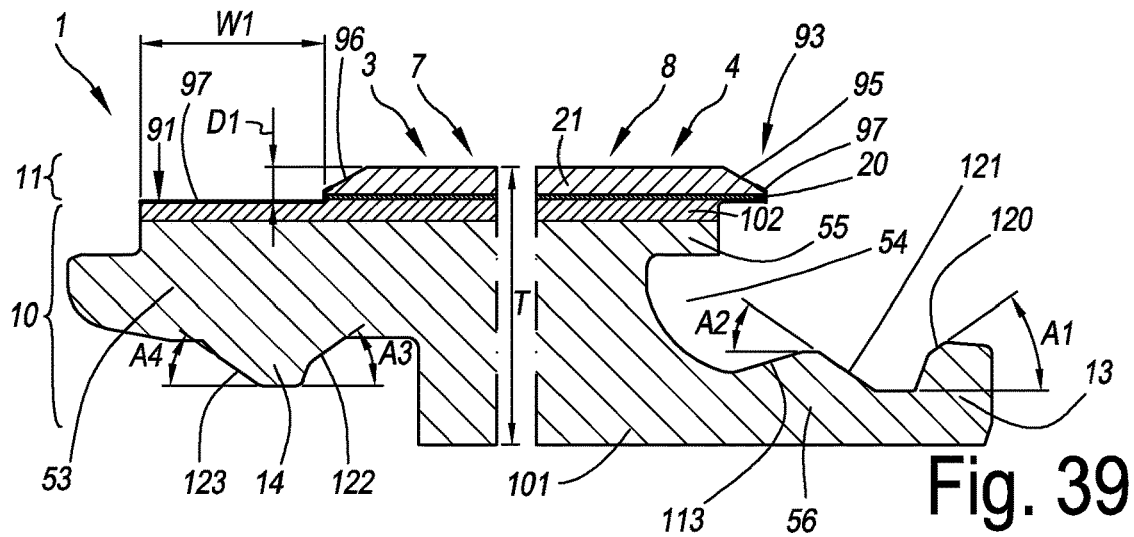
FIG. 39 shows an example of a panel according to the seventh aspect, the eighth aspect and the ninth aspect of the invention.
Figure 40:
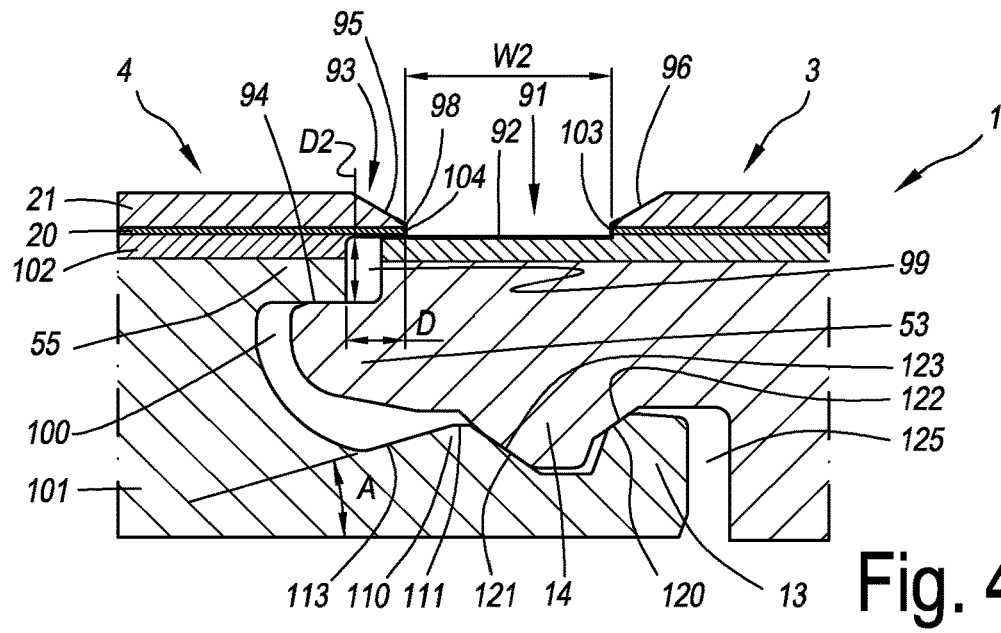
FIG. 40 shows two panels as shown in FIG. 39 in coupled condition at their first pair of opposite edges.

FIG. 39 shows an example of a panel according to the seventh aspect, the eighth aspect and the ninth aspect of the invention. FIG. 40 shows two panels as shown in FIG. 39 in coupled condition at their first pair of opposite edges.

The panel 1 of FIG. 39 comprises a substrate 10 and a top layer 11. The thickness T of the panel of the example shown is 5 mm. The top layer 11 comprises a decor layer 20 and a wear layer 21. The panel is provided at a first pair of opposite edges 3, 4 with coupling parts 7, 8, cooperating which each other, substantially in the form of male coupling parts 7 and female coupling parts 8, for coupling two such panels at their first pair of opposite edges 3, 4 to each other in a floor, wall or ceiling covering. The male coupling part 7 is provided at the male edge 3 of the first pair of opposite edges. The coupling parts are provided with mechanical locking means 13, 14 which prevent the drifting apart of two coupled panels into the direction perpendicular to the surface of the coupled panels as well as into the direction perpendicular to the respective coupled edges in the plane parallel to the coupled panels. The female coupling part 8 is provided at the female edge 4 of the first pair of opposite edges 3, 4. The male coupling part 7 comprises a tongue 53. The female coupling parts 8 comprises a groove 54 bordered by an upper lip 55 and a lower lip 56; wherein the lower lip 56 extends more distal than the upper lip 55. The lower lip 56 comprises a locking element 13. The bottom of the tongue 53 comprises a locking element 14. As shown in FIG. 40, in coupled condition of two such panels at their first pair of opposite edges, the locking element 13 of the lower lip contacts the locking element 14 of the tongue thereby establishing a locking of the coupled panels at their first pair of opposite edges in the direction perpendicular to the coupled edges and parallel with the surface of the coupled panels. Preferably this locking is established with pretension, which can be realized via overlapping contours of the related sections of the panel edges. In coupled condition of the male edge with the female edge of another such panel the upper surface of the tongue 53 contacts the bottom of the upper lip 55. In the example shown, this contact is substantially parallel with the panel surface. In an alternative embodiment, this contact can make an angle of less than 5° with the panel surface.

The panel 1 can be coupled to another such panel at their first pair of opposite edges 3,4, with its male edge 3 onto the female edge 4 of another such panel by means of an angling movement of the tongue 53 of the panel into the groove 54 of the another such panel.

The surface of the male edge 3 is provided with a recess 91. In the example shown, this recess 91 comprises at least a section 92 parallel with the panel surface.

The substrate 10 comprises a first layer 101 and a second layer 102, provided closer to the surface of the panel than the first layer 101. The composition of the first layer differs from the composition of the second layer. The second layer is made out of a more supple material than the first layer. The tongue 53 is provided in the first layer 101. The recess 91 extends into the second layer 102. The proximal border 103 of the recess extends substantially perpendicularly through the decor layer 20. In the example shown the depth D1 of the recess relative to the surface of the panel is 0.65 mm.

The upper lip 55 comprises a distal portion 93 extending from the panel edge. In the example shown this distal portion 93 extending from the panel edge is provided as a nose. The bottom surface of the distal portion 93 is provided in the substrate. In coupled condition of the female edge to the male edge of another such panel the distal portion 93 of the upper lip 55 of the female edge at least partially overlaps the recess 91 at the surface of the male edge. This overlap is provided with contact between the bottom of the distal portion 93 and the recess 91. In embodiments of the invention, this contact can be provided with pretension, e.g. by providing overlapping contours of the relevant sections of the panel edges. The overlap between the distal portion and the recess at the surface of the male edge is provided at a vertical distance D2 0.95 mm from the contact 94 between the upper surface of the tongue and the bottom surface of the upper lip.

The distal portion 93 comprises a bevel 95. The male edge 3 comprises a bevel 96 proximal from the recess 91.

The recess 91 is provided with a lacquer layer 97. The bevel 95 of the distal portion 93 is partially provided with a lacquer layer 97 such that in coupled condition of two such panels at their first pair of opposite edges 3, 4 the lacquer layer of the recess visually continues into the lacquer layer of the bevel 95 of the distal portion. The lacquer layer 97 on the recess 91 extends partially onto the bevel 96 provided at the male edge 3.

In the example shown, the recess 91 has a width W1 equal to 2.3 mm. The recess has in the coupled panels a visible width W2 equal to 2 mm.

In the example shown, the distal edge 98 of the distal portion 93 extends in the horizontal direction over a distance D equal to 0.86 mm from the female edge.

In coupled condition of the female edge 4 to the male edge 3 of another such panel, a gap 99 is provided which horizontally extends between the male edge and the female edge and vertically between the distal portion and the upper surface of the tongue, and a gap 100 is provided in horizontal direction between the distal end of the tongue and the proximal end of the female edge.

The distal border 104 of the distal portion extends substantially perpendicularly through the decor layer 20.

The lower lip 56 comprises at its upper side a protrusion 110 the highest point 111 of which is provided proximal from the locking element 13 and distal from the most distal point of the upper lip 55. The lower lip 56 comprises at its upper surface a concave section 112. This concave section 112 is concave from more proximal than the most distal point of the upper lip to more distal to the most distal point of the upper lip. This concave section is provided proximal from the highest point 111 of the protrusion. The concave section 112 is sufficiently large and configured such that the distal end of the tongue 53 can dive into and subsequently emerge from the concave section when coupling the male edge of the panel by means of the angling movement.

The concave section 112 comprises a distal flank 113 having an angle A with the bottom of the panel over at least 50% of the distal flank of at least 10° and preferably less than 25°. This distal flank 113 extends from proximal from to distal of the most distal end of the upper lip 55. In the example shown, the angle A equals 15°.

The locking element 13 of the lower lip 56 comprises a first contact surface 120, provided at the proximal side of the locking element 13. This first contact surface 120 has an included angle A1 equal to 35° with the bottom of the panel. The lower lip 56 also comprises an inclined surface, inclined from the bottom of the panel upwards in proximal direction of the panel. This inclined surface comprises a second contact surface 121 having an included angle A2 equal to 35° with the bottom of the panel. The bottom of the tongue 53 comprises a third contact surface 122, which has has an angle A3 equal to 35° with the bottom of the panel. The bottom of the tongue 53 comprises a fourth contact surface 123 which has an angle A4 equal to 35° with the bottom of the panel. The third contact surface 122 and the fourth contact surface 123 are provided at opposite sides of the locking element 14, which protrudes downwards from the tongue 53. Other preferred values for the angles A1, A2, A3 and A4 are for instance 25° and 30°.

In coupled condition of two such panels—which is shown in FIG. 40—the first contact surface 120 contacts the third contact surface 122 of the other panel. The second contact surface 121 contacts the fourth contact surface 123 of the other panel.

The gaps 99, 100 provided in horizontal direction between the distal end of the male edge 3 and the edge of the female edge 4 the other panel allow to accommodate expansion of the male edge towards the female edge of the other panel in coupled condition of the panels. A gap 125 is provided in horizontal direction between the distal end of the female edge 4 of panel and the edge of the male edge 3 of the other panel allowing to accommodate an expansion of the female edge towards the male edge of the other panel in coupled condition of the panels.

Figure 41:
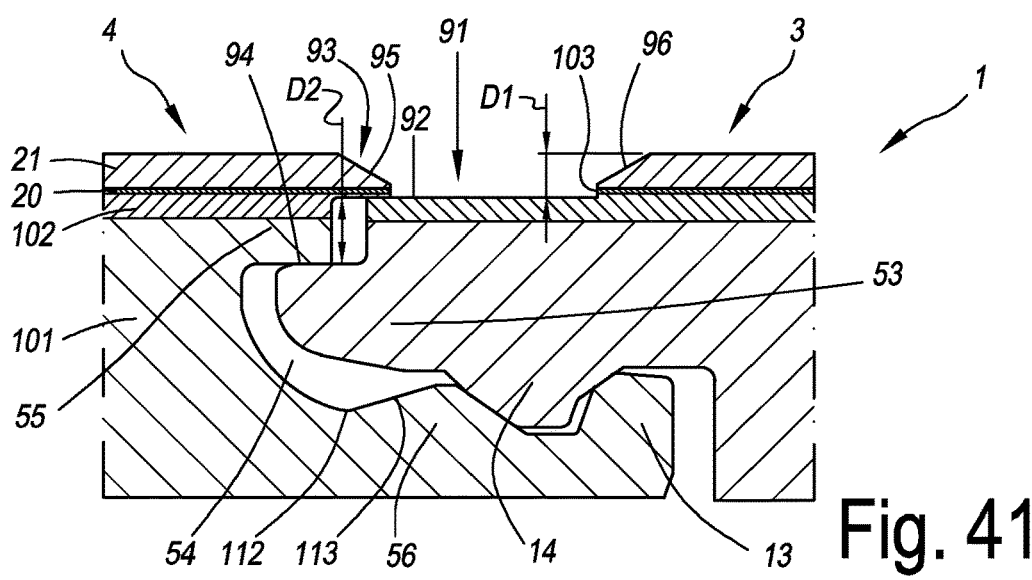
FIG. 41 shows another example of panels according to the seventh aspect, the eighth aspect and the ninth aspect of the invention in coupled condition at their first pair of opposite edges.

FIG. 41 shows another example of panels according to the seventh aspect, the eighth aspect and the ninth aspect of the invention in coupled condition at their first pair of opposite edges. The reference numbers have the same meaning as in FIGS. 39 and 40. No lacquer layer is provided in the recess 91.

Figure 42:
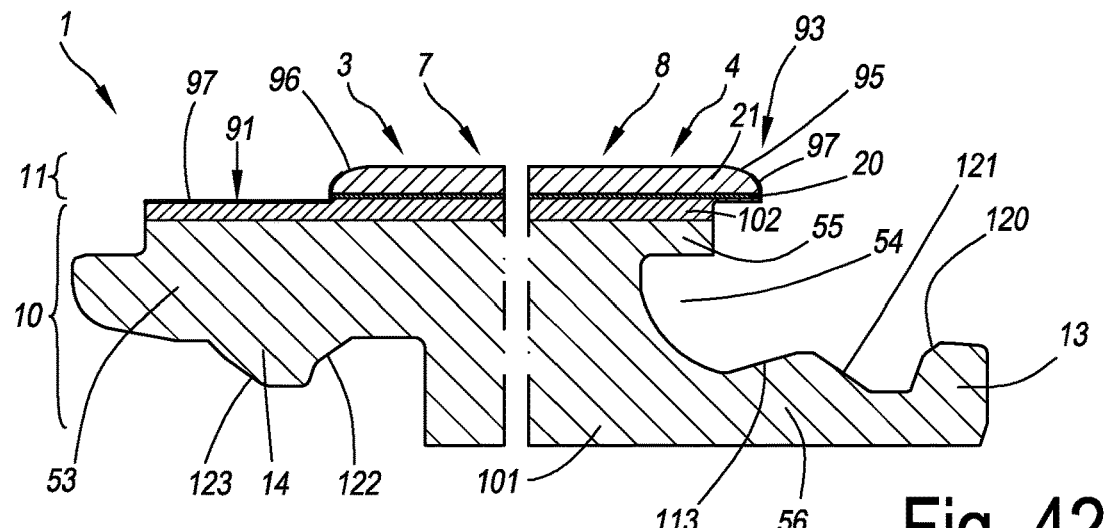
FIGS. 42 and 43 show examples of panels according to the seventh aspect, the eighth aspect and the ninth aspect of the invention.
Figure 43:
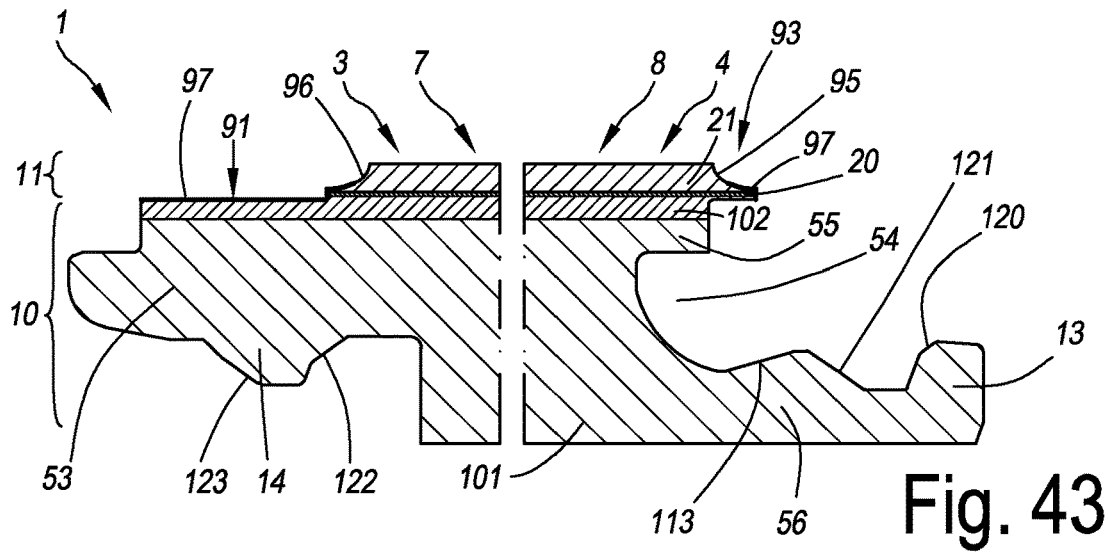

FIGS. 42 and 43 show two other examples of panels according to the seventh aspect, the eighth aspect and the ninth aspect of the invention. The reference numbers have the same meaning as in the FIGS. 39-41. In the example shown in FIG. 42, the bevels 95, 96 at both panel edges are rounded bevels which are convex. In the example shown in FIG. 43, the bevels 95, 96 at both panel edges are rounded bevels which are concave. FIGS. 42 and 43 show examples wherein lacquer layers 97 have been applied, these lacquer layers 97 are not essential for the invention.

Figure 44:
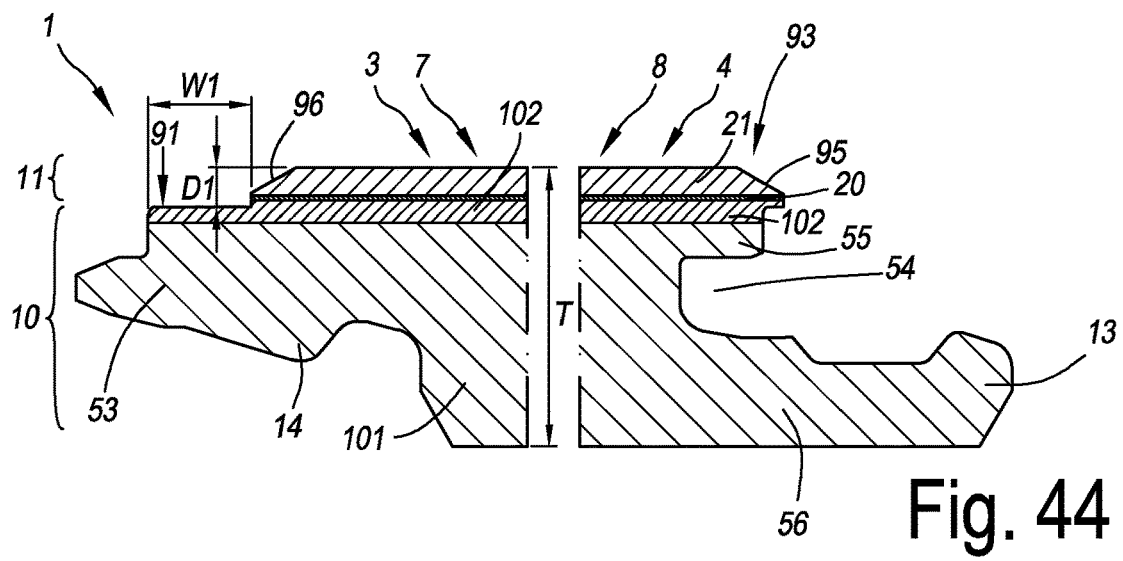
FIG. 44 shows the first pair of opposite edges of a panel at least according to the seventh aspect of the invention.
Figure 45:
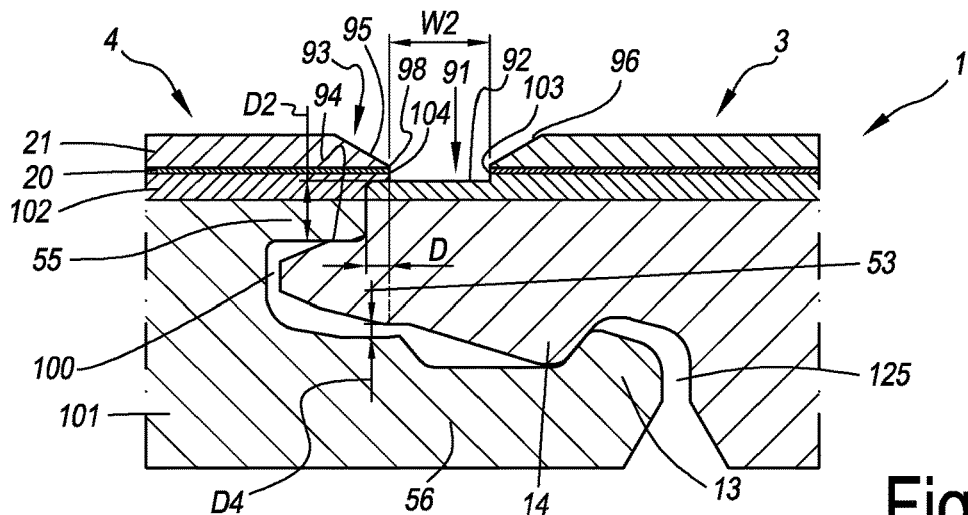
FIG. 45 shows two panels according to FIG. 44 coupled to each other at their first pair of opposite edges.

FIG. 44 shows the first pair of opposite edges of a panel at least according to the seventh aspect of the invention. FIG. 45 shows two panels according to FIG. 44 coupled to each other at their first pair of opposite edges.

The panel 1 of FIG. 44 comprises a substrate 10 and a top layer 11. The thickness T of the panel of the example shown is 5 mm. The top layer 11 comprises a decor layer 20 and a wear layer 21. The panel is provided at a first pair of opposite edges 3, 4 with coupling parts 7, 8, cooperating which each other, substantially in the form of male coupling parts 7 and female coupling parts 8, for coupling two such panels at their first pair of opposite edges 3, 4 to each other in a floor, wall or ceiling covering. The male coupling part 7 is provided at the male edge 3 of the first pair of opposite edges. The coupling parts are provided with mechanical locking means 13, 14 which prevent the drifting apart of two coupled panels into the direction perpendicular to the surface of the coupled panels as well as into the direction perpendicular to the respective coupled edges in the plane parallel to the coupled panels. The female coupling part 8 is provided at the female edge 4 of the first pair of opposite edges 3, 4. The male coupling part 7 comprises a tongue 53. The female coupling parts 8 comprises a groove 54 bordered by an upper lip 55 and a lower lip 56; wherein the lower lip 56 extends more distal than the upper lip 55. The lower lip 56 comprises a locking element 13. The bottom of the tongue 53 comprises a locking element 14. As shown in FIG. 45, in coupled condition of two such panels at their first pair of opposite edges, the locking element 13 of the lower lip contacts the locking element 14 of the tongue thereby establishing a locking of the coupled panels at their first pair of opposite edges in the direction perpendicular to the coupled edges and parallel with the surface of the coupled panels. Preferably this locking is established with pretension, which can be realized via overlapping contours of the related sections of the panel edges. In coupled condition of the male edge with the female edge of another such panel the upper surface of the tongue 53 contacts the bottom of the upper lip 55. In the example shown, this contact is substantially parallel with the panel surface. In an alternative embodiment, this contact can make an angle of less than 5° with the panel surface.

The panel 1 can be coupled to another such panel at their first pair of opposite edges 3,4, with its male edge 3 onto the female edge 4 of another such panel by means of an angling movement of the tongue 53 of the panel into the groove 54 of the another such panel.

The surface of the male edge 3 is provided with a recess 91. In the example shown, this recess 91 comprises at least a section 92 parallel with the panel surface.

The substrate 10 comprises a first layer 101 and a second layer 102, provided closer to the surface of the panel than the first layer 101. The composition of the first layer differs from the composition of the second layer. In preferred embodiments, the second layer is made out of a more supple material than the first layer. The tongue 53 is provided in the first layer 101. The recess 91 extends into the second layer 102, but not into the first layer 101. The proximal border 103 of the recess extends substantially perpendicularly through the decor layer 20. In the example shown the depth D1 of the recess relative to the surface of the panel is 0.65 mm.

The upper lip 55 comprises a distal portion 93 extending from the panel edge. In the example shown this distal portion 93 extending from the panel edge is provided as a nose. The bottom surface of the distal portion 93 is provided in the substrate. In coupled condition of the female edge to the male edge of another such panel the distal portion 93 of the upper lip 55 of the female edge at least partially overlaps the recess 91 at the surface of the male edge. This overlap is provided with contact between the bottom of the distal portion 93 and the recess 91. In embodiments of the invention, this contact can be provided with pretension, e.g. by providing overlapping contours of the relevant sections of the panel edges. The overlap between the distal portion and the recess at the surface of the male edge is provided at a vertical distance D2 0.95 mm from the contact 94 between the upper surface of the tongue and the bottom surface of the upper lip.

The distal portion 93 comprises a bevel 95. The male edge 3 comprises a bevel 96 proximal from the recess 91.

In the example shown, the recess 91 has a width W1 equal to 2.3 mm. The recess has in the coupled panels a visible width W2 equal to 2 mm.

In the example shown, the distal edge 98 of the distal portion 93 extends in the horizontal direction over a distance D equal to 0.86 mm from the female edge.

In coupled condition of the female edge 4 to the male edge 3 of another such panel a gap 100 is provided in horizontal direction between the distal end of the tongue and the proximal end of the female edge.

The recess 91 extends into the substrate 10.

The distal border 104 of the distal portion extends substantially perpendicularly through the decor layer 20. In the example shown, the distal border 104 of the distal portion 93 extends substantially perpendicularly through the panel over a distance of less than the thickness of the decor layer plus 0.15 mm.

The proximal border 103 of the recess 91 extends substantially perpendicularly through the decor layer. The proximal border 103 of the recess 91 extends substantially perpendicularly through the panel over a distance less than the thickness of the decor layer plus 0.15 mm; and preferably over a distance less than 0.25 mm.

In coupled conditions, a gap 125 is provided in horizontal direction between the distal end of the female edge 4 of panel and the edge of the male edge 3 of the other panel, allowing to accommodate an expansion of the female edge towards the male edge of the other panel in coupled condition of the panels.

As shown in FIG. 45, in coupled condition of the female edge 4 to the male edge 3 of another such panel, the distal end of the upper lip 55 below the distal portion 93 contacts the male edge 3 of the another such panel over the full height of the distal end of the upper lip below this distal portion. This contact of the distal end of the upper lip below the distal portion is provided at a section of this distal end of the upper lip substantially perpendicular to the surface of the panel.

FIG. 45 illustrates the optional feature wherein in coupled condition of two panels at their first pair of opposite edges 3, 4 the minimum distance D4 at the female edge 4 proximal from the distal border 104 of the distal portion 93 perpendicular to the panel surface between the lower lip 56 and the tongue 53 is at least 0.1 mm. In the example shown the distance D4 is 0.18 mm.

Figure 46:
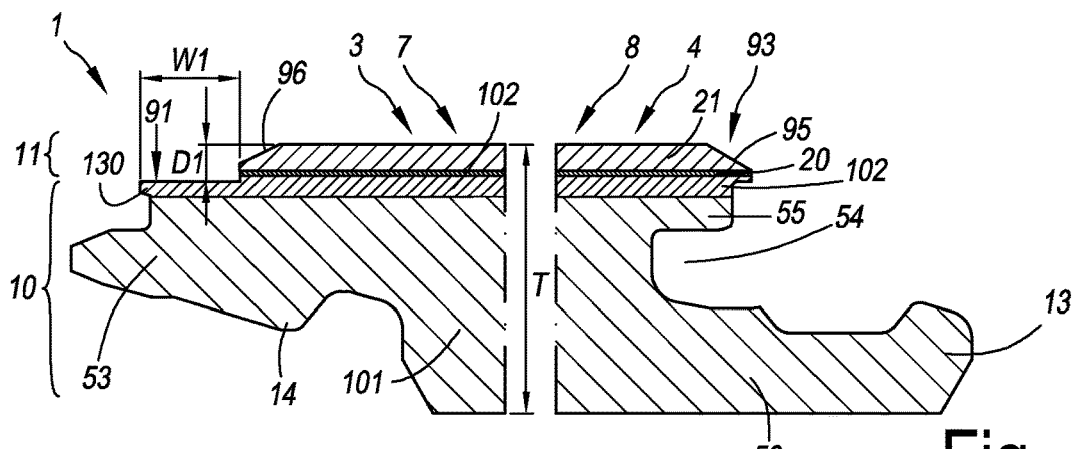
FIG. 46 shows the first pair of opposite edges of a panel at least according to the seventh aspect of the invention.
Figure 47:
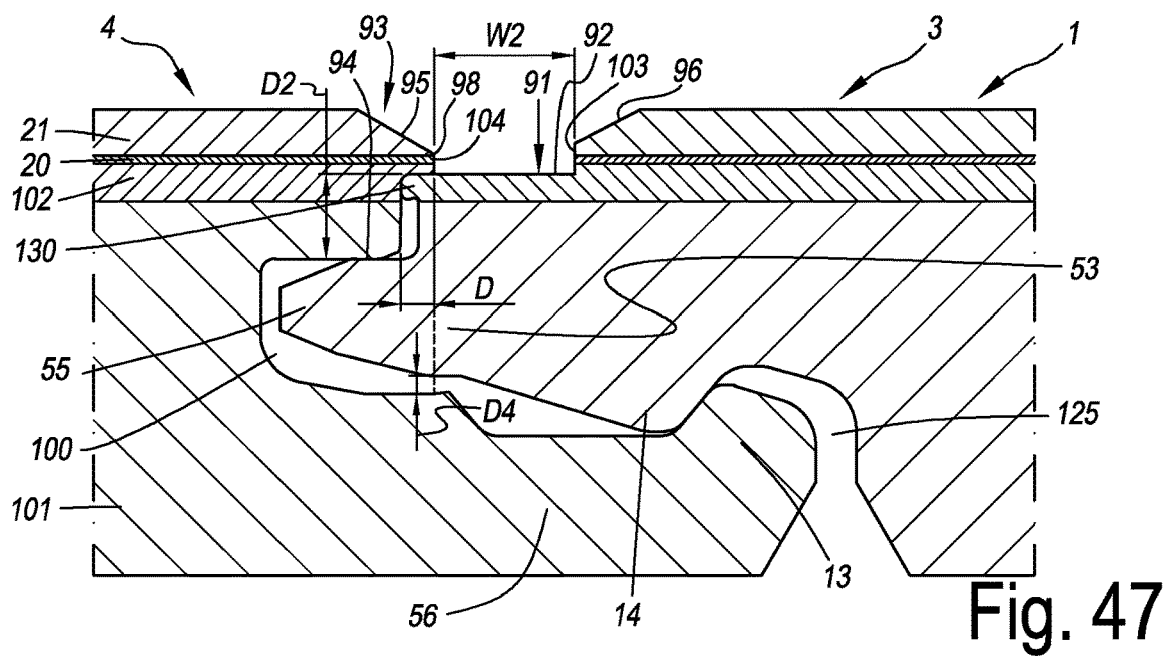
FIG. 47 shows two panels according to FIG. 46 coupled to each other at their first pair of opposite edges.

FIG. 46 shows the first pair of opposite edges of a panel at least according to the seventh aspect of the invention. FIG. 47 shows two panels according to FIG. 46 coupled to each other at their first pair of opposite edges.

The panel of FIGS. 46 and 47 is to a large extent similar to the panel shown in FIGS. 46 and 47. The reference numbers in FIGS. 46 and 47 have the same meaning as the same reference numbers of FIGS. 44 and 45.

The panel of FIGS. 46 and 47 comprises a lip 130 protruding from the male edge. The lip 130 is provided in the second layer 102 of the substrate. This second layer 102 is more supple than the first layer 101 of the substrate.

In coupled condition of two such panels at their first pair of opposite edges, contact is made between the distal end of the upper lip 55 below the distal portion 93 of the one panel on the one hand, and on the other hand the lip 130 protruding from the male edge 3 of the other panel. The male edge 3 and the female edge 4 are configured such that when coupling two such panels at the first pair of opposite edges, the protruding lip 130 overlaps the female edge in the direction parallel with the panel surface and perpendicular to the coupled edges over at least 0.05 mm—and preferably over at least 0.10 mm. This way, in coupled condition the protruding lip 130 contacts the female edge of the other panel with pretension. As the protruding lip is made out of the supple material of the second layer 102 of the substrate, the protruding lip will somewhat bulge or bend during coupling, assuring a reliable contact between both panel edges.

FIG. 47 illustrates the optional feature wherein in coupled condition of two panels at their first pair of opposite edges 3, 4 the minimum distance D4 at the female edge 4 proximal from the distal border 104 of the distal portion 93 perpendicular to the panel surface between the lower lip 56 and the tongue 53 is at least 0.1 mm. In the example shown the distance D4 is 0.18 mm.

Figure 48:
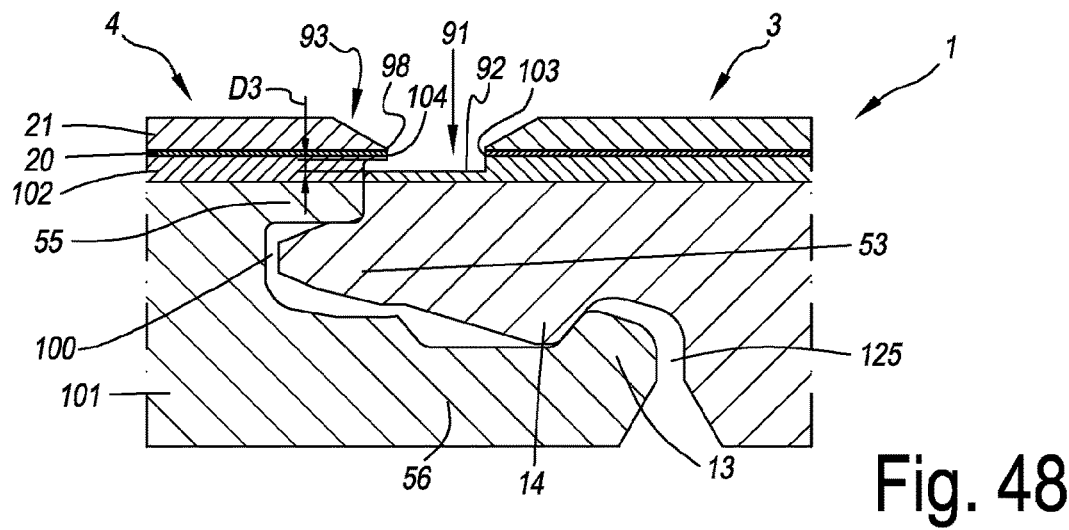
FIG. 48 shows an embodiment of panels at least according to the seventh aspect of the invention coupled at their first pair of opposite edges.

FIG. 48 shows an embodiment of panels at least according to the seventh aspect of the invention. The panels shown in FIG. 48 coupled at their first pair of opposite edges 3, 4 are to a large extent similar to the panels shown in FIGS. 44 and 45. The reference numerals in FIG. 48 have the same meaning as the corresponding reference numerals in FIGS. 44 and 45. The panel of FIG. 48 differs from the panel shown in 44 and 45 in that instead of contact between the bottom of the distal portion and the recess in coupled condition of the panels, the overlap of the distal portion 93 with the recess 91 is provided with a gap D3 between the bottom of the distal portion 93 and the bottom of the recess 91. The gap D3 preferably is at least 0.1 mm and preferably less than 0.3 mm and more preferably at maximum 0.2 mm.

Figure 49:
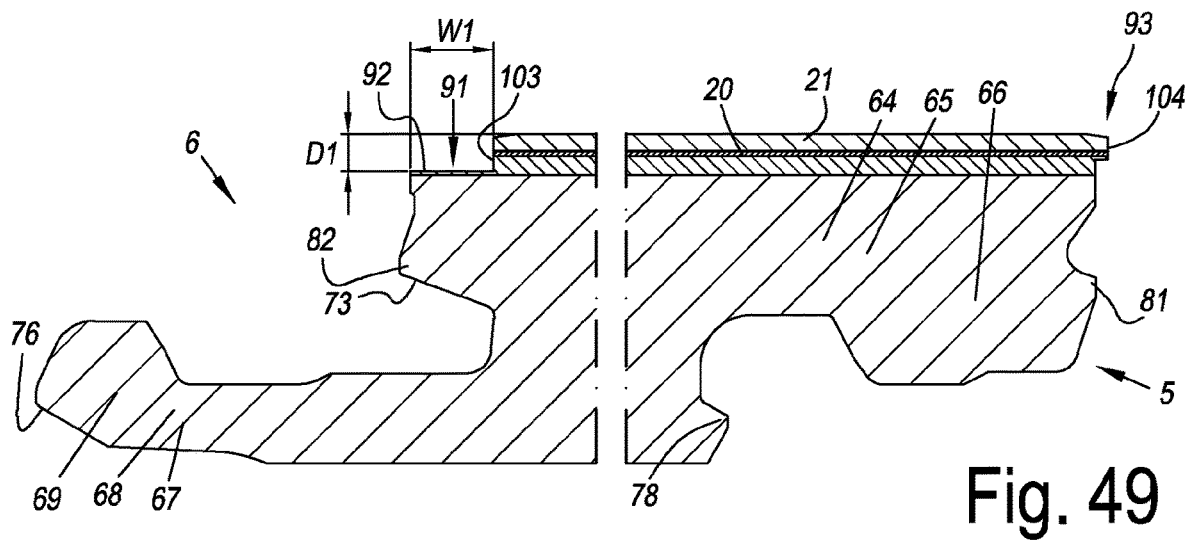
FIG. 49 shows a panel according to the tenth aspect of the invention.
Figure 50:
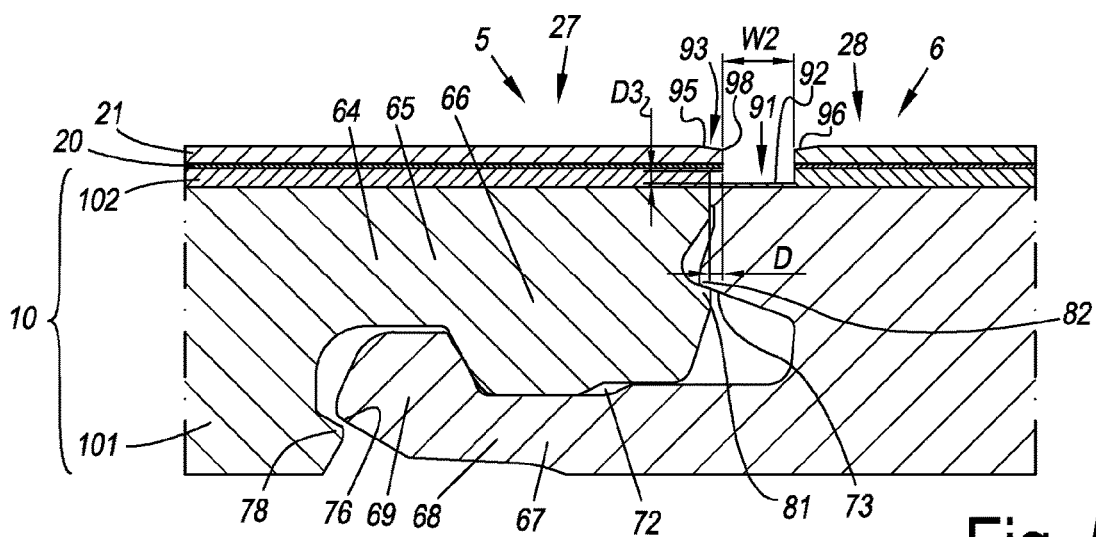
FIG. 50 shows two panels as in FIG. 49 in coupled condition at their second pair of opposite edges.

FIG. 49 shows a panel according to the tenth aspect of the invention. FIG. 50 shows two panels as in FIG. 49 in coupled condition at their second pair of opposite edges 5, 6. The panel comprises a substrate 10 and a top layer 11. The top layer comprises a decor layer 20 and a wear layer 21. The panel comprises a second pair of opposite edges 5, 6. The panel is provided at the second pair of opposite edges with second coupling parts 27, 28 cooperating which each other, substantially in the form of second male coupling parts 27 and second female coupling parts 28, for coupling two such panels at their second pair of opposite edges to each other in a floor, wall or ceiling covering. The second male coupling part 27 is provided at the second male edge 5 of the second pair of opposite edges. The second female coupling part 28 is provided at the second female edge of the panels 6. The second coupling parts are provided with second mechanical locking means which prevent the drifting apart of two such panels coupled at their second pair of opposite edges 5, 6 into the direction perpendicular to the surface of the coupled panels as well as into the direction perpendicular to the respective coupled edges in the plane parallel to the coupled panels. The second male edge 5 comprises a downward-directed upper hook-shaped part 64.

The downward-directed upper hook-shaped part comprises a lip 65 with a downward-directed locking element 66 which forms the second male coupling part 27. The second female edge 6 comprises an upward-directed lower hook-shaped part 67. The upward-directed lower hook-shaped part comprises a lip 68 with an upward-directed locking element 69, which, proximally thereof, defines the second female coupling part 28 in the form of a coupling recess 72. The second male coupling part and the second female coupling part are configured such that two such panels can be coupled to each other at their respective second pair of opposite edges by means of a movement substantially perpendicular to the surface of the two such panels being coupled.

The second male coupling part 27, the second female part 28 and their locking means are in the embodiment of FIGS. 49 and 50 configured in the same way as the panel shown in FIG. 37. The reference numbers of FIGS. 49 and 50 corresponding with the reference numbers shown in FIG. 37 have the same meaning.

The surface of the second female edge 6 is provided with a recess 91. In the example shown, the recess 91 comprises a section 92 parallel with the panel surface. The downward-directed upper hook-shaped part 64 comprises a distal portion 93 extending from the second male edge 5. The bottom surface of the distal portion is provided in the substrate 10. The recess 91 at the surface of the second female edge 6 extends into the substrate 10. In the example shown, the substrate 10 comprises a first layer 101 and a second layer 102. The second 102 layer is provided closer to the surface of the panel than the first layer 101. The composition of the first layer differs from the composition of the second layer. In the example shown, the second layer is made out of a more supple material than the first layer. In the example shown, the first layer 101 and the second layer 102 comprise polyvinyl chloride and fillers. In the example shown, the recess 91 at the surface of the second female edge 6 extends into the second layer 102, but not into the first layer 101.

In coupled condition of the second female edge 6 to the second male edge 5 of another such panel the distal portion 93 extending from the second male edge 5 overlaps the recess 91 at the surface of the second female edge 6. This overlap is provided with a gap D3 between the bottom of the distal portion and the bottom of the recess 91. The gap D3 between the bottom of the distal portion and the recess 91 is preferably at least 0.1 mm and preferably less than 0.3 mm and more preferably at maximum 0.2 mm.

In the example shown in FIGS. 49 and 50, the distal portion 93 extending from the second male edge 5 comprises a bevel 95. The second female edge 6 comprises a bevel 96 proximal from the recess 91.

In the example shown, the recess 91 at the surface of the second female edge 6 has a width W1 of at least 2 mm—and preferably of at least 2.3 mm —; and the recess 91 at the surface of the second female edge 6 has in the coupled panels a visible width W2 of at least 1.5 mm, more preferably of at least 2 mm.

The distal edge 98 of the distal portion 93 extending from the second male edge 5 extends in horizontal direction over at least a distance D 0.25 mm and preferably of at least 0.7 mm from the second male edge.

The proximal border 103 of the recess 91 at the surface of the second female edge 6 extends substantially perpendicularly through the decor layer 20. The proximal border 103 of the recess 91 at the surface of the second female edge 6 extends substantially perpendicularly through the panel over a distance less than the thickness of the decor layer plus 0.15 mm; and preferably over a distance less than 0.25 mm.

The bottom surface of the distal portion 93 extending from the second male edge 5 is provided in the substrate 10. The distal border 104 of the distal portion extending from the second male edge 5 extends substantially perpendicularly through the decor layer 20. The distal border 104 of the distal portion 93 extending from the second male edge 5 extends substantially perpendicularly through the panel over a distance of less than the thickness of the decor layer plus 0.15 mm; and preferably over a distance less than 0.25 mm.

The depth D1 of the recess 91 at the surface of the second female edge 6 relative to the surface of the panel is preferably at least 0.4 mm, more preferably at least 0.5 mm. The depth D1 of the recess 91 at the surface of the second female edge 6 relative to the surface of the panels is preferably less than 2 mm, more preferably less than 1.5 mm.

Figure 51:
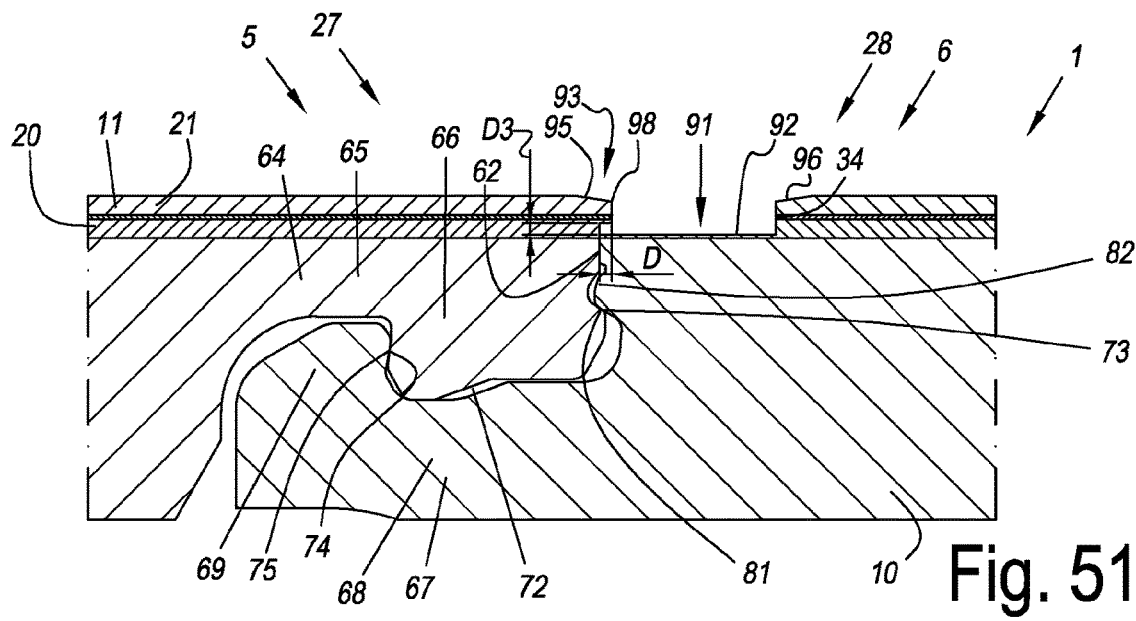
FIGS. 51 and 52 show embodiments of the tenth aspect of the invention in the same view as FIG. 50.
Figure 52:
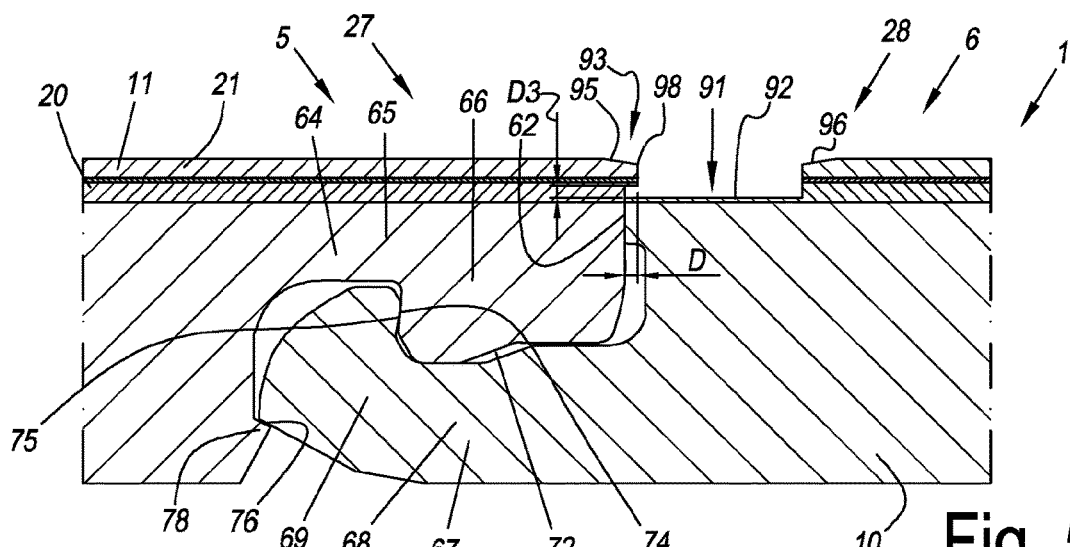

FIGS. 51 and 52 show embodiments of the tenth aspect of the invention in the same view as FIG. 50. The panels shown in FIGS. 51 and 52 differ from the embodiment shown in FIGS. 49 and 50 in the configuration of the second male coupling part 27 and the second female coupling part 28 and their locking means.

The configuration of the second male coupling part 27 and the second female coupling part 28 and their locking means of the embodiment of FIG. 51 is similar to the configuration shown in FIG. 36. The corresponding reference numerals have the same meaning.

The configuration of the second male coupling part 27 and the second female coupling part 28 and their locking means of the embodiment of FIG. 52 is similar to the configuration shown in FIG. 38. The corresponding reference numerals have the same meaning.

Figure 53:
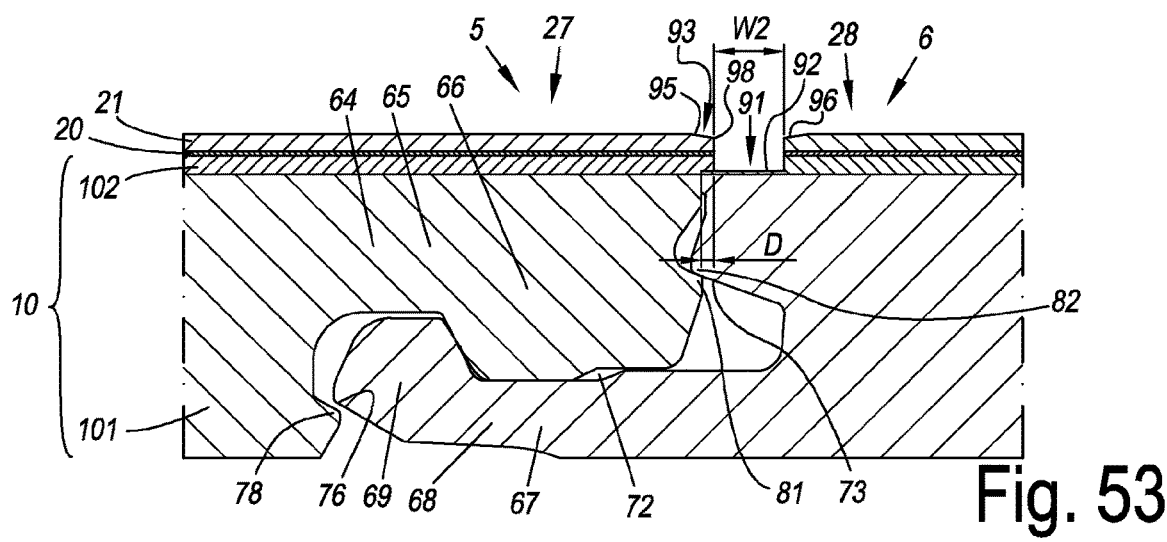
FIG. 53 shows an embodiment of the tenth aspect of the invention in the same view as FIG. 50.

FIG. 53 shows an embodiment of the tenth aspect of the invention in the same view as FIG. 50. The panel of FIG. 53 is to a large extent similar to the panel shown in FIG. 50. However, instead of the overlap being provided as in FIG. 50 with a gap between the bottom of the distal portion and the bottom of the recess, the overlap in FIG. 53 is provided with contact between the bottom of the distal portion and the recess. Reference numerals in FIG. 53 have the same meaning as in FIG. 50.

Panels configured at their first pair of opposite edges 3, 4 as shown in FIGS. 39-48 can advantageously be configured at their second pair of opposite edges 5,6 as illustrated in FIGS. 49-53, which enables installation of the panels according to the fold-down method illustrated in FIG. 10.

The invention claimed is:

1. A panel, comprising a substrate and a top layer,
wherein the top layer comprises a decor layer and a wear layer,
wherein the panel is provided at a first pair of opposite edges with coupling parts, arranged for cooperating with each other, as male coupling parts and female coupling parts, for coupling two such panels at the first pair of opposite edges to each other in a floor, wall or ceiling covering;
wherein the male coupling part is provided at a male edge of the first pair of opposite edges;
wherein the female coupling part is provided at a female edge of the first pair of opposite edges;
wherein the coupling parts are provided with mechanical locking means arranged to prevent a drifting apart of two coupled panels into a direction perpendicular to a surface of the coupled panels as and into a direction perpendicular to respective coupled edges of the two coupled panels in a plane parallel to the coupled panels;
wherein the male coupling part, comprises a section of an upper surface provided below the surface of the panel and below a location of the decor layer,
wherein said upper surface of said section is provided with a substantially uniform color;
wherein a visual appearance of said upper surface of said section differs over a full surface thereof from the visual appearance of a decor layer,
wherein in a coupled condition of a first such panel coupled at the male edge thereof onto the female edge of a second such panel, the female edge overlaps part of the upper surface of said section of the male edge of the first such panel such that part of the upper surface of said section of the male edge of the first such panel is hidden from view whereas part of the upper surface of said section is visible in the view perpendicular to the surface of the coupled panels,
wherein the part of the upper surface of said section that is visible in the view perpendicular to the surface of the coupled panels is at least 1.5 mm wide.

2. The panel as in claim 1, wherein at least part of the or an entirety of the upper surface of said section is visible in the view perpendicular to a surface of the coupled panels parallel with a surface of the panel.

3. The panel as in claim 1, wherein the female edge of the second such panel contacts the upper surface of said section of the male edge of the first such panel provided below the surface of the panel and below the location of the decor layer in a first zone of the upper surface of the male coupling part; and
wherein the upper surface of the male edge, of the male coupling part, comprises a second zone less distal than the first zone,
wherein the female edge of the second such panel overlaps the second zone without contacting it but such that the second zone is hidden from view.

4. The panel as in claim 3, wherein the panel comprises a second pair of opposite edges;
wherein the panel is provided at the second pair of opposite edges with second coupling parts, arranged for cooperating with each other, substantially as second male coupling parts and second female coupling parts, for coupling two such panels at the second pair of opposite edges to each other in a floor, wall or ceiling covering;
wherein the second male coupling part is provided at a second male edge of second pair of opposite edges;
wherein the second female coupling part is provided at the second female edge of the panels;
wherein the second coupling parts are provided with second mechanical locking means arranged to prevent the drifting apart of two such panels coupled at the second pair of opposite edges into the direction perpendicular to the surface of the coupled panels and into the direction perpendicular to the respective coupled edges in the plane parallel to the coupled panels;
wherein the second male edge, the second male coupling part, comprises a section the upper surface provided below the surface of the panel and below the location of the decor layer,
wherein said upper surface of said section of said second male edge is provided with a substantially uniform color;
wherein the visual appearance of said upper surface of said section of said second male edge differs over a full surface thereof from the visual appearance of the decor layer, wherein in coupled condition of the first such panel coupled at the second male edge onto the second female edge of a third such panel, the second female edge of the third such panel overlaps part of the upper surface of said section of the second male edge of the first such panel, such that part of the upper surface of said section of the second male edge of the first such panel is hidden from view whereas part of the upper surface of said section of the second male edge of the first such panel is visible in the view perpendicular to the surface of the coupled panels, wherein the part of the upper surface of said section of the second male edge that is visible in the view perpendicular to the surface of the coupled panels is at least 1.5 mm wide.

5. The panel as in claim 4, wherein the coupling parts at the second pair of opposite edges are configured such that in coupled condition of the panel with another such panel at the respective edges of the second pair of opposite edges, said mechanical locking means arranged to prevent the drifting apart of the locked panels in the direction perpendicular to the second pair of opposite edges and parallel with the surface of the coupled panels prevent said drifting apart while allowing a play in the direction perpendicular to the second pair of opposite edges of at least 0.2 mm.

6. The panel as in claim 5, wherein said allowing said play in the direction perpendicular to the second pair of opposite edges and parallel with the surface of the coupled panels is at least in part made possible by an elastic deformation of at least one of the second female coupling part; or wherein said play does not require an elastic deformation of at least one of the coupling parts; and/or wherein said allowing said play in the direction perpendicular to the second pair of opposite edges and parallel with the surface of the coupled panels is at least in part made possible by the relative position in the direction perpendicular to the first pair of opposite edges parallel with the surface of the panels coupled at the second pair of opposite edges of the overlap of the second female edge of the upper surface of said section of the second male edge.

7. The panel as in claim 1, wherein at least one recess is provided on the surface of the panel parallel with the first pair of opposite edges, wherein the at least one recess is bordered at both sides parallel with the first pair of opposite edges by a surface of the panel, wherein a bottom of the at least one recess has substantially a same color as the part of the upper surface of said section of the male edge visible in the view perpendicular to the surface of the coupled panels.

8. The panel as in claim 7, wherein at least part of the section of the male edge the upper surface provided below the surface of the panel and below the location of the decor layer, is provided with a lacquer layer; and wherein the male edge and the female edge are provided with bevels wherein the bevels are at least partly provided with a same lacquer layer, wherein said lacquer layer on the bevels extends from below the decor layer to a position above the decor layer.

9. The panel as in claim 8, wherein the lacquer layer comprises sand and/or particles having a particle size larger than 20 μm and wherein at least part of said sand and/or of said particles are present at a surface of the lacquer layer; creating a rough surface of the recess; and/or wherein the lacquer is an acrylate lacquer, a polyurethane lacquer or a polyurethane acrylate lacquer.

10. The panel as in claim 1, wherein the coupling parts at the first pair of opposite edges are configured such that in coupled condition of the panel with another such panel at respective edges of the first pair of opposite edges, said mechanical locking means arranged to prevent the drifting apart of the locked panels in the direction perpendicular to the coupled edges and parallel with the surface of the coupled panels prevent said drifting apart while allowing a play in the direction perpendicular to the coupled edges of at least 0.2 mm.

11. The panel as in claim 10, wherein said allowing said play is at least in part made possible by an elastic deformation of at least one of the coupling parts, of the female coupling part; or wherein said play does not require an elastic deformation of at least one of the coupling parts; and/or wherein said allowing a play is at least in part made possible by a relative position in the direction perpendicular to the first pair of opposite edges parallel with the surface of the panels coupled at the first pair of opposite edges of the overlap of the female edge of the upper surface of said section of the male edge;

wherein an overlapped section of the male edge is parallel with the surface of the panel.

12. The panel as in claim 1, wherein instead of the male edge, the female coupling part, comprises a section the upper surface provided below the surface of the panel and below the location of the decor layer, wherein said upper surface of said section is provided with a substantially uniform color;

wherein in coupled condition of a first such panel coupled at the male edge onto the female edge of a second such panel, instead of the female edge overlapping, it is the male edge that overlaps part of the upper surface of said section of the female edge of the first such panel such that part of the upper surface of said section of the female edge of the first such panel is hidden from view whereas part of the upper surface of said section is visible in the view perpendicular to the surface of the coupled panels.

13. A panel, comprising a substrate and a top layer, wherein the top layer comprises a decor layer and a wear layer, wherein the panel is provided at a first pair of opposite edges with coupling parts, arranged for cooperating with each other, substantially as male coupling parts and female coupling parts, for coupling two such panels at the first pair of opposite edges to each other in a floor, wall or ceiling covering;

wherein the male coupling part is provided at the male edge of the first pair of opposite edges;

wherein the female coupling part is provided at a female edge of the first pair of opposite edges;

wherein the coupling parts are provided with mechanical locking means arranged to prevent a drifting apart of two coupled panels into a direction perpendicular to a surface of the coupled panels and into a direction perpendicular to respective coupled edges of the two coupled panels in a plane parallel to the coupled panels;

wherein a surface of at least one of the male edge or the female edge is provided with a recess, wherein the recess extends deeper into the panel than a location of the decor layer;

wherein the recess is provided with a lacquer layer comprising sand and/or particles having a particle size larger than 20 µm;

wherein the lacquer layer of the recess is at least partially visible in coupled condition of the panel with another such panel at a respective first pair of opposite edges;

wherein a thickness of the lacquer layer is less than 200 µm, wherein at least part of a side edge of the recess is provided with said lacquer layer;

wherein the edge of the first pair of opposite edges opposite to the edge comprising the recess is at least over a section provided with a lacquer layer, wherein the lacquer layer at this edge contributes to providing a grout imitation of coupled panels.

14. The panel as in claim 13, wherein a surface of the lacquer layer comprises a section parallel with the surface of the panel.

15. The panel as in claim 13, wherein the recess extends into the substrate.

16. The panel as in claim 13, wherein the female edge comprises a first closing plane, wherein the male edge comprises a second closing plane, wherein in coupled condition of two such panels at the first pair of opposite edges the first closing plane of the first such panel contacts the second closing plane of the second such panel thereby providing a contact surface between the two coupled such panels, wherein the contact surface is substantially perpendicular to the surface of the coupled panels.

17. The panel as in claim 13, wherein the lacquer layer comprises sand and/or particles having a particle size larger than 20 µm, wherein at least part of said sand and/or of said particles are present at a surface of the lacquer layer; creating a rough surface of the recess and/or wherein the lacquer is an acrylate lacquer or a polyurethane lacquer or a polyurethane acrylate lacquer.

18. The panel as in any claim 13, wherein the recess provided with the lacquer layer is configured for providing a grout imitation in a covering comprising a plurality of such panels and/or wherein in coupled condition of two such panels at the first pair of opposite edges, a visible width of the lacquer layer of the recess is at least 1.5 mm.

19. The panel as in claim 13, wherein the panel comprises a second pair of opposite edges;

wherein the panel is provided at the second pair of opposite edges with second coupling parts, arranged for cooperating with each other, substantially as second male coupling parts and second female coupling parts, for coupling two such panels at the second pair of opposite edges to each other in a floor, wall or ceiling covering;

wherein the second male coupling part is provided at a second male edge of second pair of opposite edges;

wherein the second female coupling part is provided at a second female edge of the panels;

wherein the second coupling parts are provided with second mechanical locking means arranged to prevent a drifting apart of two such panels coupled at the second pair of opposite edges into the direction perpendicular to the surface of the coupled panels and into the direction perpendicular to the respective coupled edges in the plane parallel to the coupled panels;

wherein the surface of at least one of the second male edge or the second female edge is provided with a second recess, wherein the second recess extends deeper into the panel than the location of the decor layer;

wherein the second recess is provided with a lacquer layer comprising sand and/or particles having a particle size larger than 20 µm;

wherein the lacquer layer of the second recess is at least partially visible in coupled condition of the panel with another such panel at a respective second pair of opposite edges, wherein a thickness of the lacquer layer of the second recess is less than 200 µm, wherein at least part of a side edge of the second recess is provided with said lacquer layer, wherein the edge of the second pair of opposite edges opposite to the edge comprising the second recess is at least over a section provided with a lacquer layer, wherein the lacquer layer at this edge contributes to providing a grout imitation of coupled panels.

20. The panel as in claim 19, wherein a surface of the lacquer layer of the second recess comprises a section parallel with the surface of the panel.

21. The panel as in claim 19, wherein a surface of the lacquer layer of the recess and the surface of the lacquer layer of the second recess are provided at a same depth from the panel surface and/or wherein in coupled condition at the first pair of opposite edges of two such panels a visible width of the recess is the same as a visible width of the second recess in coupled condition at the second pair of opposite edges of two such panels.

22. The panel as in claim 19, wherein a panel edge of the panel where the recess is provided joins the panel edge where the second recess is provided in a joint;

wherein in the joint the lacquer layer of the recess continues without interruption into the lacquer layer of the second recess;

wherein the lacquer layers of the recess and of the second recess have a same composition.

* * * * *